US009173025B2

(12) United States Patent
Dickins et al.

(10) Patent No.: US 9,173,025 B2
(45) Date of Patent: Oct. 27, 2015

(54) COMBINED SUPPRESSION OF NOISE, ECHO, AND OUT-OF-LOCATION SIGNALS

(71) Applicant: Dolby Laboratories Licensing Corporation, San Francisco, CA (US)

(72) Inventors: Glenn N. Dickins, Como (AU); Timothy J. Neal, West Ryde (AU); Mark S. Vinton, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 181 days.

(21) Appl. No.: 13/964,037

(22) Filed: Aug. 9, 2013

(65) Prior Publication Data

US 2014/0126745 A1 May 8, 2014

Related U.S. Application Data

(63) Continuation of application No. PCT/US2012/024370, filed on Feb. 8, 2012.

(51) Int. Cl.
*H04B 15/00* (2006.01)
*H04R 3/00* (2006.01)
(Continued)

(52) U.S. Cl.
CPC ............ *H04R 3/002* (2013.01); *G10L 21/0208* (2013.01); *H04R 1/1083* (2013.01); (Continued)

(58) Field of Classification Search
CPC ........... H04R 2410/05; H04R 2225/43; H04R 2460/01; H04R 2410/01; H04R 2225/41; H04R 25/70; H04R 2227/001; H04R 25/353; G10L 21/0208; G10L 21/0364; G10L 15/20; G10L 2021/02082; G10L 25/78; G10K 11/175; G10K 11/002; H04M 9/082
USPC ........ 381/13, 58, 317, 318, 71.1, 71.14, 73.1, 381/94.1, 94.2, 94.3, 94.7, 94.8
See application file for complete search history.

(56) References Cited

U.S. PATENT DOCUMENTS 3,989,897 A 11/1976 Carver
4,185,168 A 1/1980 Graupe et al.
(Continued)

FOREIGN PATENT DOCUMENTS

EP 0669606 8/1995
EP 0727769 8/1996
(Continued)

OTHER PUBLICATIONS

U.S. Appl. No. 61/108,447, filed Oct. 24, 2008, Visser.
(Continued)

*Primary Examiner* — Paul S Kim
*Assistant Examiner* — Norman Yu
(74) *Attorney, Agent, or Firm* — Dov Rosenfeld; Inventek

(57) ABSTRACT

A system, a method, logic embodied in a computer-readable medium, and a computer-readable medium comprising instructions that when executed carry out a method. The method processes: (a) a plurality of input signals, e.g., signals from a plurality of spatially separated microphones; and, for echo suppression, (b) one or more reference signals, e.g., signals from or to be rendered by one or more loudspeakers and that can cause echoes. The method processes the input signals and one or more reference signals to carry out in an integrated manner simultaneous noise suppression and out-of-location signal suppression, and in some versions, echo suppression.

96 Claims, 18 Drawing Sheets

(51) Int. Cl.

| | |
|---|---|
| ***G10L 21/0208*** | (2013.01) |
| ***H04R 1/10*** | (2006.01) |
| ***H04R 3/02*** | (2006.01) |
| *G10K 11/16* | (2006.01) |
| *G10L 21/0216* | (2013.01) |
| *H04R 1/40* | (2006.01) |

(52) U.S. Cl.
CPC ....... *H04R 3/02* (2013.01); *G10L 2021/02082* (2013.01); *G10L 2021/02166* (2013.01); *H04R 1/406* (2013.01); *H04R 3/005* (2013.01); *H04R 2410/07* (2013.01); *H04R 2430/03* (2013.01); *H04R 2499/13* (2013.01)

(56) References Cited

U.S. PATENT DOCUMENTS

| | | | | |
|---|---|---|---|---|
| 4,941,187 | A | 7/1990 | Slater | |
| 5,579,404 | A | 11/1996 | Fielder et al. | |
| 5,648,955 | A | 7/1997 | Jensen et al. | |
| 5,659,622 | A | 8/1997 | Ashley | |
| 5,742,694 | A | 4/1998 | Eatwell | |
| 5,742,927 | A | 4/1998 | Crozier et al. | |
| 5,899,969 | A | 5/1999 | Fielder et al. | |
| 5,903,872 | A | 5/1999 | Fielder | |
| 5,913,190 | A | 6/1999 | Fielder et al. | |
| 5,913,191 | A | 6/1999 | Fielder | |
| 6,122,610 | A | 9/2000 | Isabelle | |
| 6,124,895 | A | 9/2000 | Fielder | |
| 6,246,760 | B1 | 6/2001 | Makino et al. | |
| 6,253,185 | B1 | 6/2001 | Arean et al. | |
| 6,351,731 | B1 * | 2/2002 | Anderson et al. | 704/233 |
| 6,415,253 | B1 | 7/2002 | Johnson | |
| 6,453,285 | B1 | 9/2002 | Anderson et al. | |
| 6,459,914 | B1 * | 10/2002 | Gustafsson et al. | 455/570 |
| 6,647,367 | B2 | 11/2003 | McArthur et al. | |
| 6,668,062 | B1 | 12/2003 | Luo et al. | |
| 6,717,991 | B1 | 4/2004 | Gustafsson | |
| 6,765,931 | B1 | 7/2004 | Rabenko et al. | |
| 6,766,292 | B1 | 7/2004 | Chandran et al. | |
| 6,839,666 | B2 | 1/2005 | Chandran et al. | |
| 7,020,291 | B2 | 3/2006 | Buck et al. | |
| 7,062,040 | B2 | 6/2006 | Faller | |
| 7,313,518 | B2 | 12/2007 | Scalart et al. | |
| 7,328,162 | B2 | 2/2008 | Liljeryd et al. | |
| 7,376,558 | B2 | 5/2008 | Gemello et al. | |
| 7,383,179 | B2 | 6/2008 | Alves et al. | |
| 7,454,010 | B1 | 11/2008 | Ebenezer | |
| 7,492,889 | B2 | 2/2009 | Ebenezer | |
| 7,499,855 | B2 | 3/2009 | Schweng | |
| 7,555,075 | B2 | 6/2009 | Pessoa et al. | |
| 7,558,729 | B1 | 7/2009 | Benyassine et al. | |
| 7,649,988 | B2 | 1/2010 | Suppappola et al. | |
| 7,756,700 | B2 | 7/2010 | Rose et al. | |
| 7,773,741 | B1 | 8/2010 | LeBlanc et al. | |
| 7,801,733 | B2 | 9/2010 | Lee et al. | |
| 7,835,407 | B2 | 11/2010 | LeBlanc et al. | |
| 2001/0036278 | A1 | 11/2001 | Polisset et al. | |
| 2003/0009325 | A1 | 1/2003 | Kirchherr et al. | |
| 2004/0054528 | A1 | 3/2004 | Hoya et al. | |
| 2004/0057574 | A1 | 3/2004 | Faller | |
| 2004/0078199 | A1 | 4/2004 | Kremer et al. | |
| 2005/0143989 | A1 | 6/2005 | Jelinek | |
| 2005/0288923 | A1 | 12/2005 | Kok | |
| 2006/0072768 | A1 | 4/2006 | Schwartz et al. | |
| 2006/0184363 | A1 | 8/2006 | McCree et al. | |
| 2006/0188104 | A1 | 8/2006 | De Poortere | |
| 2006/0270467 | A1 | 11/2006 | Song et al. | |
| 2007/0046540 | A1 | 3/2007 | Taenzer | |
| 2007/0047742 | A1 | 3/2007 | Taenzer et al. | |
| 2007/0047743 | A1 | 3/2007 | Taenzer et al. | |
| 2007/0050161 | A1 | 3/2007 | Taenzer et al. | |
| 2007/0050176 | A1 | 3/2007 | Taenzer et al. | |
| 2007/0050441 | A1 | 3/2007 | Taenzer et al. | |
| 2007/0076898 | A1 | 4/2007 | Sarroukh et al. | |
| 2007/0133825 | A1 | 6/2007 | Waller, Jr. | |
| 2007/0136053 | A1 | 6/2007 | Ebenezer | |
| 2007/0150268 | A1 * | 6/2007 | Acero et al. | 704/226 |
| 2008/0159559 | A1 | 7/2008 | Akagi et al. | |
| 2008/0162121 | A1 | 7/2008 | Son et al. | |
| 2008/0167866 | A1 | 7/2008 | Hetherington et al. | |
| 2008/0170706 | A1 | 7/2008 | Faller | |
| 2008/0192946 | A1 | 8/2008 | Faller | |
| 2008/0232607 | A1 | 9/2008 | Tashev et al. | |
| 2008/0288219 | A1 | 11/2008 | Tashev et al. | |
| 2008/0310643 | A1 | 12/2008 | Alves et al. | |
| 2008/0317259 | A1 | 12/2008 | Zhang et al. | |
| 2009/0010444 | A1 | 1/2009 | Goldstein et al. | |
| 2009/0012786 | A1 | 1/2009 | Zhang et al. | |
| 2009/0024387 | A1 | 1/2009 | Chandran et al. | |
| 2009/0034747 | A1 | 2/2009 | Christoph | |
| 2009/0055170 | A1 | 2/2009 | Nagahama | |
| 2009/0063143 | A1 | 3/2009 | Schmidt et al. | |
| 2009/0074209 | A1 | 3/2009 | Thompson et al. | |
| 2009/0076829 | A1 | 3/2009 | Ragot et al. | |
| 2009/0123003 | A1 | 5/2009 | Sibbald | |
| 2009/0129582 | A1 | 5/2009 | Chandran et al. | |
| 2009/0154380 | A1 | 6/2009 | LeBlanc | |
| 2009/0164212 | A1 | 6/2009 | Chan et al. | |
| 2009/0238373 | A1 | 9/2009 | Klein | |
| 2009/0240491 | A1 | 9/2009 | Reznik | |
| 2009/0254340 | A1 | 10/2009 | Sun et al. | |
| 2009/0262969 | A1 | 10/2009 | Short et al. | |
| 2009/0313009 | A1 | 12/2009 | Kovesi et al. | |
| 2010/0014695 | A1 | 1/2010 | Breithaupt et al. | |
| 2010/0017195 | A1 | 1/2010 | Villemoes | |
| 2010/0017204 | A1 | 1/2010 | Oshikiri et al. | |
| 2010/0023327 | A1 | 1/2010 | Jung et al. | |
| 2010/0023335 | A1 | 1/2010 | Szczerba et al. | |
| 2010/0076769 | A1 | 3/2010 | Yu | |
| 2010/0104113 | A1 | 4/2010 | Liu | |
| 2010/0121646 | A1 | 5/2010 | Ragot et al. | |
| 2010/0142718 | A1 | 6/2010 | Chin et al. | |
| 2010/0211385 | A1 | 8/2010 | Sehlstedt | |
| 2010/0241426 | A1 | 9/2010 | Zhang et al. | |
| 2010/0280824 | A1 | 11/2010 | Petit et al. | |
| 2010/0323652 | A1 | 12/2010 | Visser et al. | |
| 2011/0038489 | A1 | 2/2011 | Visser et al. | |

FOREIGN PATENT DOCUMENTS

| | | |
|---|---|---|
| EP | 1635331 | 3/2006 |
| EP | 1786236 | 9/2009 |
| EP | 2096629 | 9/2009 |
| FR | 2624675 | 6/1989 |
| GB | 643574 | 9/1950 |
| GB | 645343 | 11/1950 |
| GB | 2126851 | 3/1984 |
| GB | 2437868 | 11/2007 |
| JP | 2009-021741 | 1/2009 |
| JP | 2010-102199 | 5/2010 |
| KR | 100888049 | 3/2009 |
| KR | 100938282 | 1/2010 |
| KR | 20100045933 | 5/2010 |
| KR | 20100045934 | 5/2010 |
| KR | 20100114059 | 10/2010 |
| WO | WO 01/19005 | 3/2001 |
| WO | WO 01/73759 | 10/2001 |
| WO | WO 2004/111994 | 12/2004 |
| WO | WO 2006/111369 | 10/2006 |
| WO | WO 2006/111370 | 10/2006 |
| WO | WO 2008/115435 | 9/2008 |
| WO | WO 2008/115445 | 9/2008 |
| WO | WO 2009/043066 | 4/2009 |
| WO | WO 2009/066869 | 5/2009 |
| WO | WO 2009/092522 | 7/2009 |
| WO | WO 2009/095161 | 8/2009 |
| WO | WO 2009/097009 | 8/2009 |
| WO | WO 2009/109050 | 9/2009 |
| WO | WO 2010/048620 | 4/2010 |
| WO | WO 2010/069885 | 6/2010 |
| WO | WO 2010/092568 | 8/2010 |
| WO | WO 2010/105926 | 9/2010 |

(56) References Cited

FOREIGN PATENT DOCUMENTS

| | | |
|---|---|---|
| WO | WO 2010/127616 | 11/2010 |
| WO | WO 2012/107561 | 8/2012 |
| WO | WO 2012/109019 | 8/2012 |

OTHER PUBLICATIONS

U.S. Appl. No. 61/185,518, filed Jun. 9, 2009, Visser.
U.S. Appl. No. 61/240,318, filed Sep. 8, 2009, Visser.
Audone, B. et al, "The Use of Music Algorithm to Characterize Emissive Sources," Electromagnetic Compatibility, IEEE Transactions on, vol. 43, Issue, 4, pp. 688-693, 2001.
Avendano, C. et al, "STFT-Based Multi-Channel Acoustic Interference Suppressor", Proceedings 2001 IEEE International Conference on Acoustics, Speech, and Signal Processing, 2001, (ICASSP'01), vol. 1, pp. 625-628, 2002.
Boll, S. et al, "Suppression of Acoustic Noise in Speech Using Two Microphone Adaptive Noise Cancellation," IEEE Transactions on Acoustics, Speech, and Signal Processing, vol. 28, Issue 6, Dec. 1, 1980.
Campbell, "Adaptive Beamforming Using a Microphone Array for Hands-Free Telephony", Technical Report and M.S. Thesis, Bradley Department of Electrical and Computer Engineering, Virginia Polytechnic Institute and State University, Feb. 1999. Retrieved Jan. 24, 2011 at http://scholar.lib.vt.edu/theses/available/etd-022099-122645/.
Cohen et al, "An Integrated Real-Time Beamforming and Postfiltering System for Non-Stationary Noise Environments", EURASIP Journal on Applied Signal Processing, vol. 2003, Jan. 2003. Retrieved Jan. 24, 2011 at http://www.andreaelectronics.com/pdf_files/JASP.pdf.
Cohen et al, "Speech enhancement for non-stationary noise environments", Signal Processing, vol. 81, pp. 2403-2418, 2001.
Combined Acoustic Noise and Echo Canceller (CANEC), Retrieved Jan. 24, 2011 from the Web Archive of Mar. 27, 2008 at http://web.archive.org/web/20080327132154/http://www.dspalgorithms.com/products/canec.html. Therefore, retrieavable Mar. 2008 at http://www.dspalgorithms.com/products/canec.html.
Dam et al, "Multi-channel adaptive beamforming with source spectral and noise covariance matrix estimations", 2005 International Workshop on Acoustic Echo and Noise Control, High Tech Campus, Eindhoven, The Netherlands, 2005, retrieved Jun. 26, 2010 at iwaenc05.ele.tue.nl/proceedings/papers/S02-03.pdf.
Dickins et al, "On the spatial localization of a wireless transmitter from a multisensor receiver", 2nd International Conference on Signal Processing and Communication Systems, ICSPCS, 2008.
Dickins, "Applications of Continuous Spatial Models in Multiple Antenna Signal Processing", 2007, Australian National University: Canberra, downloaded on May 6, 2010 at http://thesis.anu.edu.au/public/adt-ANU20080702.222814/index.html.
Doblinger, "An Adaptive Microphone Array for Optimum Beamforming and Noise Reduction", in Proc. EUSIPCO 14th European Signal Processing Conference, Florence, Italy, Sep. 2006. Retrieved Jan. 24, 2011 at http://publik.tuwien.ac.at/files/pub-et_11270.pdf.
Faller et al, "Suppressing Acoustic Echo in a Spectral Envelope Space", IEEE Transactions on Speech and Audio Processing, vol. 13, No. 5, pp. 1048-1062, Sep. 2005.
Faller, C., "Perceptually Motivated Low Complexity Acoustic Echo Control," Convention Paper 5783, Presented at the 114th Convention of the Audio Engineering Society, Mar. 22-25, 2003, Amsterdam, The Netherlands.
Farrell et al, "Beamforming microphone arrays for speech enhancement," ICASSP-92, vol. 1, pp. 285-288, IEEE International Conference on Acoustics, Speech, and Signal Processing, 1992.
Favrot et al, "Perceptually Motivated Gain Filter Smoothing for Noise Suppression", Convention Paper, 123rd Convention of the Audio Engineering Society, Oct. 5-8, 2007 New York, NY, USA.
Favrot et al., "Acoustic Echo Control Based on Temporal Fluctuations of Short Time Spectra", in Proc. 11th International Workshop on Acoustic Echo and Noise Control, Sep. 14-17, 2008, Seattle, WA, USA. Retrieved Jan. 24, 2011 at http://deckard.engr.washington.edu/epp/iwaenc2008/proceedings/contents/papers/9049.pdf.
Goh et al, "Postprocessing method for suppressing musical noise generated by spectral subtraction", IEEE Trans. on Speech and Audio Processing, vol. 6, No. 3, pp. 287-292, 1998.
Habets et al, "Robust Early Echo Cancellation and Late Echo Suppression in the STFT Domain", in Proc. 11th International Workshop on Acoustic Echo and Noise Control, Sep. 14-17, 2008, Seattle, WA, USA. Retrieved Jan. 24, 2011 at http://deckard.engr.washington.edu/epp/iwaenc2008/proceedings/contents/papers/9034.pdf.
Heller et al, "A General Formulation of Modulated Filter Banks", IEEE Transactions on Signal Processing, vol. 47, No. 4, Apr. 1999.
Herbordt et al, "Joint Optimization of LCMV Beamforming and Acoustic Echo Cancellation for Automatic Speech Recognition," Proceedings IEEE International Conference on Acoustics, Speech, and Signal Processing, 2005, Mar. 18-23, 2005, vol. 3, pp. iii/77-iii/80, 2005.
Herbordt et al, "Joint optimization of LCMV beamforming and acoustic echo cancellation", European signal processing conference; EUSIPCO—2004, retrieved Oct. 18, 2009 from http://citeseerx.ist.psu.edu/viewdoc/download?doi=10.1.1.142.287&rep=repl&type=pdf.
Johnson, D. et al, "Array Signal Processing: Concepts and Techniques," Feb. 11, 1993, Edition 1.
Kallinger et al, "Study on combining multi-channel echo cancellers with beamformers", Proc. 2000 IEEE Intl. Conference on Acoustics, Speech, and Signal Processing, vol. 2, pp. II797-II800, 2000.
Kellerman, "Strategies for combining acoustic echo cancellation and adaptive beamforming microphone arrays", 1997 IEEE International Conference on Acoustics, Speech, and Signal Processing, Apr. 21-24, 1997, vol. 1, pp. 219-222, 1997.
Kuech et al., "Acoustic Echo Suppression Based on Separation of Stationary and Non-Stationary Echo Components", in Proc. 11th International Workshop on Acoustic Echo and Noise Control, Sep. 14-17, 2008, Seattle, WA, USA. Retrieved Jan. 24, 2011 at http://deckard.engr.washington.edu/epp/iwaenc2008/proceedings/contents/papers/9043.pdf.
Linhard et al, "Noise reduction with spectral subtraction and median filtering for suppression of musical tones", In Proc. of ESCA-NATO Workshop on Robust Speech Recognition for Unknown Communication Channels, pp. 159-162, Pont-a-Mousson, France, Apr. 1997.
Lukin et al, "Suppression of Musical Noise Artifacts in Audio Noise Reduction by Adaptive 2D Filtering", Convention Paper, 123rd Convention of the Audio Engineering Society, Oct. 5-8, 2007 New York, NY, USA.
Mabande et al, "Design of robust superdirective beamformers as a convex optimization problem", Proceedings, IEEE International Conference on Acoustics, Speech and Signal Processing, 2009. ICASSP 2009. pp. 77-80, 2009.
Martin, "Spectral Subtraction Based on Minimum Statistics", Proceedings of European Signal Processing Conference (EUSIPCO), Sep. 1994, pp. 1182-1185, 1994.
Martin, "Statistical Methods for the Enhancement of Noisy Speech", in International Workshop on Acoustic Echo and Noise Control (IWAENC2003), Sep. 2003, Kyoto, Japan, 2003.
Martin, R., "Spectral Subtraction Based on Minimum Statistics," In Proc. European Signal Processing Conference (EUSIPCO), pp. 1182-1185, 1994.
Moore, B. et al, "A Model for the Prediction of Thresholds, Loudness, and Partial Loudness," Journal of the Audio Engineering Society (AES), vol. 5, Issue 4, pp. 224-240, Apr. 1997.
Pulkki et al, "Directional audio coding—perception-based reproduction of spatial sound", International Workshop on the Principles and Applications of Spatial Hearing, Zao, Miyagi, Japan, Nov. 11-13, 2009.
Rabiner et al, "Applications of a Nonlinear Smoothing Algorithm to Speech Processing", IEEE Transactions on Acoustic, Speech, and Signal Processing, vol. ASSP-23, No. 6, pp. 552-557, Dec. 1975.
Roy, R. et al, "A Subspace Rotation Approach to Estimation, of Parameters of Cisoids in Noise," IEEE Transactions Acoustics Speech and Signal Processing, vol. 34, Issue 5, pp. 1340-1342, 1986.

(56) References Cited

OTHER PUBLICATIONS

Simmer et al, "Adaptive Microphone Arrays for Noise Suppression in the Frequency Domain", Second Cost 229 Workshop on Adaptive Algorithms in Communications, Bordeaux, 1992, retrieved Jun. 26, 2010 at http://www.ant.uni-bremen.de/sixcms/media.php/102/4975/COST_1992_simmer.pdf.

Stoica, P. et al, "Music, Maximum Likelihood, and Cramer-Rao Bound," IEEE Transactions Acoustic, Speech, and Signal Processing, vol. 37, Issue 5, pp. 720-741, 1989.

Unpublished U.S. Appl. No. 13/366,148, filed Feb. 3, 2012 to inventor Taenzer and titled "Vector Noise Cancellation".

Unpublished U.S. Appl. No. 13/366,160, filed Feb. 3, 2012 to inventors Taenzer et al and titled "Vector Noise Cancellation".

Van Trees, H. et al, Detection, Estimation, and Modulation Theory: Optium Array Processing, 2002, New York.

Wax, M. et al, "On Unique Localization of Multiple Sources by Passive Sensor Arrays," IEEE Transactions Acoustic, Speech and Signal Processing, vol. 37, Issue 7, pp. 996-1000, 1989.

Wittkop, T. et al, "Speech Processing for Hearing Aids: Noise Reduction Motivated by Models of Binaural Interaction," Acta Acustica, Editions De Physique, vol. 83, Issue 4, Jan. 1, 1997.

Yoon et al, "Robust Adaptive Beamforming Algorithm Using Instantaneous Direction of Arrival with Enhanced Noise Suppression Capability", in Processdings, IEEE International Conference on Acoustics, Speech and Signal Processing. ICASSP 2007,. 2007.

Pulsipher et al, "Reduction of nonstationary acoustic noise in speech using LMS adaptive noise cancelling", IEEE International Conference on Acoustics, Speech, and Signal Processing, Apr. 1979, pp. 204-207.

Widrow et al, "Adaptive Noise Cancelling: Principles and Applications", Proceedings of the IEEE, vol. 63, No. 12, Dec. 1975.

Boll, "Suppression of Acoustic Noise in Speech Using Spectral Subtraction", IEEE Transactions on Acoustics, Speech, and Signal Processing, vol. ASSP-27, No. 2, Apr. 1979.

International Preliminary Report on Patentability on PCT Application No. PCT/US2012/024370 mailed Jun. 24, 2013.

International Search Report and Written Opinion on PCT Application No. PCT/US2012/024372 mailed Jun. 5, 2012.

International Preliminary Report on Patentability on PCT Application No. PCT/US2012/024372 mailed May 13, 2013.

* cited by examiner

COMBINED SUPPRESSION OF NOISE, ECHO, AND OUT-OF-LOCATION SIGNALS

RELATED PATENT APPLICATIONS

The present application is a continuation of International Application No. PCT/US2012/024370, filed with filed with an international filing date of 8 Feb. 2012. International Application No. PCT/US2012/024370 claims priority of U.S. Provisional Application No. 61/441,611 filed 10 Feb. 2011. The contents of both Applications Nos. PCT/US2012/024370 and 61/441,611 are incorporated herein by reference in their entirety.

The present application is related to concurrently filed International Application No. PCT/US2012/024372 titled POST-PROCESSING INCLUDING MEDIAN FILTERING OF NOISE SUPPRESSION GAINS, that also claims priority of U.S. Provisional Application No. 61/441,611 filed 10 Feb. 2011. The contents of such Application No. PCT/US2012/024372 are incorporated herein by reference in their entirety.

The present application is related to the following U.S. provisional patent applications, each filed 10 Feb. 2011:

- U.S. Provisional Patent Application No. 61/441,396, titled "VECTOR NOISE CANCELLATION" to inventor Jon C. Taenzer.
- U.S. Provisional Patent Application No. 61/441,397, titled "VECTOR NOISE CANCELLATION" to inventors Jon C. Taenzer and Steven H. Puthuff.
- U.S. Provisional Patent Application No. 61/441,528, titled "MULTI-CHANNEL WIND NOISE SUPPRESSION SYSTEM AND METHOD" to inventor Jon C. Taenzer.
- U.S. Provisional Patent Application No. 61/441,551, titled "SYSTEM AND METHOD FOR WIND DETECTION AND SUPPRESSION" to inventors Glenn N. Dickins and Leif Jonas Samuelsson, such Provisional Patent Application No. 61/441,551 being referred to as the "Wind Detection/Suppression Application" herein.
- U.S. Provisional Patent Application No. 61/441,633, titled "SPATIAL ADAPTATION FOR MULTI-MICROPHONE SOUND CAPTURE" to inventor Leif Jonas Samuelsson.

FIELD OF THE INVENTION

The present disclosure relates generally to acoustic signal processing, and in particular, to processing of sound signals to suppress undesired signals such as noise, echoes, and out-of-location signals.

BACKGROUND

Acoustic signal processing is applicable today to improve the quality of sound signals such as from microphones. As one example, many devices such as handsets operate in the presence of sources of echoes, e.g., loudspeakers. Furthermore, signals from microphones may occur in a noisy environment, e.g., in a car or in the presence of other noise. Furthermore, there may be sounds from interfering locations, e.g., out-of-location conversation by others, or out-of-location interference, wind, etc. Acoustic signal processing is therefore an important area for invention.

Much of the prior art around the problem of acoustical noise reduction and echo suppression is concerned with the numerical estimation of parameters and statistically optimal suppression rules using such statistical criteria as minimum mean squared error (MMSE). Such approaches neglect the complexities of auditory perception, and thus assume that the MMSE criterion is well matched to the preference of a human listener.

Known processing methods and systems for dealing with noise, echo and spatial selectivity often concatenate different suppression systems based on different features. Each suppression systems is in some way optimized for its task or suppression function and acts directly on the signal passing through it before that signal is passed to the subsequent suppression system. Whilst this may reduce the design complexity, it creates results that leave much to be desired in terms of performance. For example, a spatial suppression system is likely to cause some level of modulation of the unwanted noise signal due to spatial uncertainties. If such a spatial suppression system is cascaded with a noise reduction system, the fluctuations in noise will increase uncertainty in the noise estimate and thus lower than performance. In such a simplistic concatenation, the spatial information is not available to the noise suppression, and thus some noise-like signals from the desired spatial location may be needlessly attenuated. Similar problems arise should the noise suppression occur first. This sort of problem is particularly prevalent with any two-input (two-channel) spatial suppression system. With only two sensors, as soon as there is more than one spatially discrete source present at a similar level, the estimation of spatial location becomes very noisy.

When the requirement for echo control is added, further problems arise. A dynamic suppression element prior to echo control can destabilize echo estimation. The alternative of having echo control first adds computational complexity. It is desirable to create a system that can retain a stable operation and avoid unnatural sounding output in the presence of voice, noise and echo, especially when the power in the desired signal is becomes low or comparable to the undesired signals.

In practice, a substantial amount of the performance, robustness and perceived quality of an audio processing system comes from heuristics, interrelated components and tuning.

DESCRIPTION OF EXAMPLE EMBODIMENTS

Overview

Figure 1:
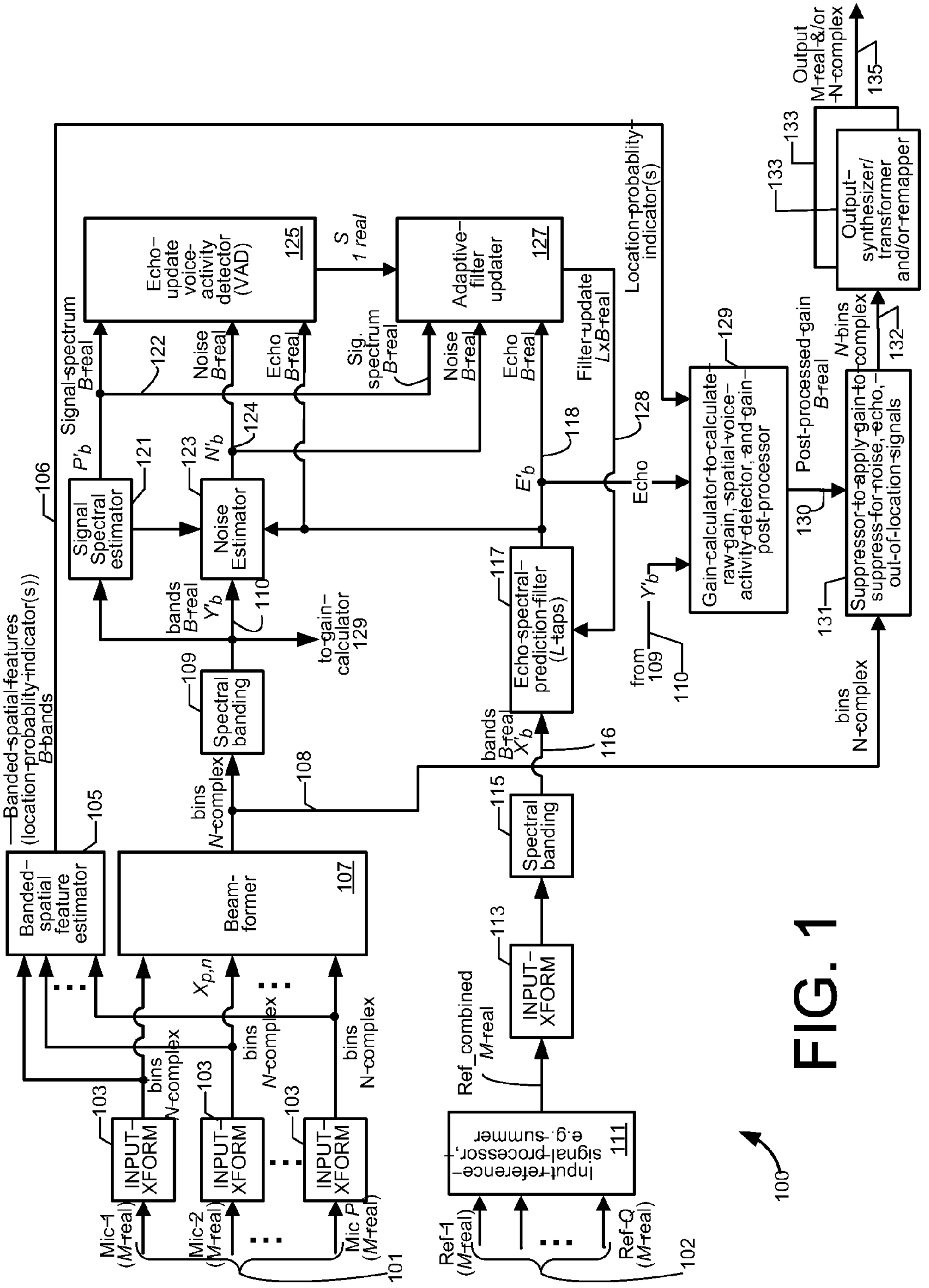
FIG. 1 shows a simplified block diagram of a system embodiment of the invention.

Embodiments of the present invention include a method, a system or apparatus, a tangible computer-readable storage medium configured with instructions that when executed by at least one processor of a processing system, cause processing hardware to carry out a method, and logic that can be encoded in one or more computer-readable tangible media and configured when executed to carry out a method. The method is to process a plurality of input signals, e.g., microphone signals to simultaneously suppress noise, out-of-location signals, and in some embodiments, echoes.

Embodiments of the invention process sampled data in frames of samples, frame-by-frame. The term "instantaneous" in the context of such processing frame-by-frame means for the current frame.

Particular embodiments include a system comprising an input processor to accept a plurality of sampled input signals and form a mixed-down banded instantaneous frequency domain amplitude metric of the input signals for a plurality of frequency bands. In one embodiment, the input processor includes input transformers to transform to frequency bins, a downmixer, e.g., beamformer to form a mixed-down, e.g., beamformed signal, and a spectral banding element to form frequency bands. In some embodiments the downmixing, e.g., beamforming is carried out prior to transforming, and in others, the transforming is prior to downmixing, e.g., beamforming.

One system embodiment includes a banded spatial feature estimator to estimate banded spatial features from the plurality of sampled input signals, e.g., after transforming, and in other embodiments, before transforming.

Versions of the system that include echo suppression include a reference signal input processor to accept one or more reference signals, a transformer and a spectral banding element to form a banded frequency domain amplitude metric representation of the one or more reference signals. Such versions of the system include a predictor of a banded frequency domain amplitude metric representation of the echo based on adaptively determined filter coefficients. To adaptively determine the filter coefficients, a noise estimator determines an estimate of the banded spectral amplitude metric of the noise. A voice-activity detector (VAD) uses the banded spectral amplitude metric of the noise, an estimate of the banded spectral amplitude metric of the mixed-down signal determined by a signal spectral estimator, and previously predicted echo spectral content to ascertain whether there is voice or not. In some embodiments, the banded signal is a sufficiently accurate estimate of the banded spectral amplitude metric of the mixed-down signal, so that signal spectral estimator is not used. The output of the VAD is used by an adaptive filter updater to determine whether or not to update the filter coefficients, the updating based on the estimates of the banded spectral amplitude metric of the mixed-down signal and of the noise, and the previously predicted echo spectral content.

The system further includes a gain calculator to calculate suppression probability indicators, e.g., as gains including, in one embodiment, an out-of-location signal probability indicator, e.g., out-of-location gain determined using two or more of the spatial features, and a noise suppression probability indicator, e.g., noise suppression gain determined using an estimate of noise spectral content. In some embodiments, the estimate of noise spectral content is a spatially-selective estimate of noise spectral content. In some embodiments that include echo suppression, the noise suppression probability indicator, e.g., suppression gain includes echo suppression. In one embodiment, the gain calculator further is to combine the raw suppression probability indicators, e.g., suppression gains to a first combined gain for each band. In some embodiments, the gain calculator further is to carry out post-processing on the first combined gains of the bands to generate a post-processed gain for each band. The post-processing includes depending on the version, one or more of: ensuring minimum gain, in some embodiments in a band dependent manner; in some embodiments ensuring there are no outlier or isolated gains by carrying out median filtering of the combined gain; and in some embodiments ensuring smoothness by carrying out time smoothing and, in some embodiments, band-to-band smoothing. In some embodiments that include the post-processing, such post-processing includes spatially-selective voice activity detecting using two or more of the spatial features to generate a signal classification, such that the post-processing is according to the signal classification.

In some embodiments, the gain calculator further calculates an additional echo suppression probability indicator, e.g., an echo suppression gain. In one embodiment this is combined with the other gains (prior to post-processing in embodiments that include post-processing) to form the first combined gain, which is a final gain. In another embodiment, the additional echo suppression probability indicator, e.g., suppression gain is combined, with the results of post-processing in embodiments that include post-processing, otherwise with the first combined gain to generate the final gain.

The system further includes a noise suppressor that interpolates the final gain to produce final bin gains and to apply the final bin gains to carry out suppression on the bin data of the mixed-down signal to form suppressed signal data. The system further includes one or both of: a) an output synthesizer and transformer to generate output samples in the time domain, and b) output remapping to generate output frequency bins suitable for use by a subsequent codec or processing stage.

Particular embodiments include a system comprising means for accepting a plurality of sampled input signals and forming a mixed-down banded instantaneous frequency domain amplitude metric of the input signals for a plurality of frequency bands. In one embodiment, the means for accepting and forming includes means for transforming to frequency bins, means for downmixing, e.g., for beamforming to form a mixed-down, e.g., beamformed signal, and means for banding to form frequency bands. In some embodiments the beamforming is carried out prior to transforming, and in other embodiments, the transforming is prior to downmixing, e.g., beamforming.

One system embodiment includes means for determining banded spatial features from the plurality of sampled input signals.

Some system embodiments that include echo suppression include means for accepting one or more reference signals and for forming a banded frequency domain amplitude metric representation of the one or more reference signals, and means for predicting a banded frequency domain amplitude metric representation of the echo. In some embodiments, the means for predicting includes means for adaptively determining echo filter coefficients coupled to means for determining an estimate of the banded spectral amplitude metric of the noise, means for voice-activity detecting (VAD) using the estimate of the banded spectral amplitude metric of the mixed-down signal, and means for updating the filter coefficients based on the estimates of the banded spectral amplitude metric of the mixed-down signal and of the noise, and the previously predicted echo spectral content. The means for updating updates according to the output of the means for voice activity detecting.

One system embodiment further includes means for calculating suppression probability indicators, e.g., suppression gains including an out-of-location signal gain determined using two or more of the spatial features, and a noise suppression probability indicator, e.g., noise suppression gain determined using an estimate noise spectral content. In some embodiments, the estimate of noise spectral content is a spatially-selective estimate of noise spectral content. In some embodiments that include echo suppression, the noise suppression probability indicator, e.g., suppression gain includes echo suppression. The calculating by the means for calculating includes combining the raw suppression probability indicators, e.g., suppression gains to form a first combined gain for each band. In some embodiments that include post-processing, the means for calculating further includes means for carrying out post-processing on the first combined gains of the bands to generate a post-processed gain for each band. The post-processing includes depending on the embodiment, one or more of: ensuring minimum gain, in some embodiments in a band dependent manner; in some embodiments ensuring there are no outlier or isolated gains by carrying out median filtering of the combined gain; and in some embodiments ensuring smoothness by carrying out time smoothing and, in some embodiments, band-to-band smoothing. In some embodiments that include post-processing, the means for post-processing includes means for spatially-selective voice activity detecting using two or more of the spatial features to generate a signal classification, such that the post-processing is according to the signal classification.

In some embodiments, the means for calculating includes means for calculating an additional echo suppression probability indicator, e.g., suppression gain. This is combined in some embodiments with gain(s) (prior to post-processing in embodiments that include post-processing) to form the first combined gain, with the post-processing first combined gain forming a final gain, and in other embodiments, the additional echo suppression probability indicator, e.g., suppression gain is combined with the results of post-processing in embodiments that include post-processing, otherwise with the first combined gain to generate a final gain.

One system embodiment further includes means for interpolating the final gain to bin gains and for applying the final bin gains to carry out suppression on the bin data of the mixed-down signal to form suppressed signal data. One system embodiment further includes means for applying one or both of: a) output synthesis and transforming to generate output samples, and b) output remapping to generate output frequency bins.

Particular embodiments include a processing apparatus comprising a processing system and configured to suppress undesired signals including noise and out-of-location signals, the processing apparatus configured to: accept a plurality of sampled input signals and form a mixed-down banded instantaneous frequency domain amplitude metric of the input signals for a plurality of frequency bands, the forming including transforming into complex-valued frequency domain values for a set of frequency bins. The processing apparatus is further configured to determine banded spatial features from the plurality of sampled input signals; to calculate a first set of suppression probability indicators, including an out-of-location suppression probability indicator determined using two or more of the spatial features, and a noise suppression probability indicator for each band determined using an estimate of noise spectral content; to combine the first set of probability indicators to determine a first combined gain for each band; and to apply an interpolated final gain determined from the first combined gain to carry out suppression on bin data of the mixed-down signal to form suppressed signal data. In some embodiments of the processing apparatus, the estimate of noise spectral content is a spatially-selective estimate of noise spectral content determined using two or more of the spatial features.

Particular embodiments include a method of operating a processing apparatus to suppress noise and out-of-location signals and in some embodiments echo. The method comprises: accepting in the processing apparatus a plurality of sampled input signals, and forming a mixed-down banded instantaneous frequency domain amplitude metric of the input signals for a plurality of frequency bands, the forming including downmixing, e.g., transforming into complex-valued frequency domain values for a set of frequency bins. In one embodiment, the forming includes transforming the input signals to frequency bins, downmixing, e.g., beamforming the frequency data, and banding. In alternate embodiments, the downmixing can be before transforming, so that a single mixed-down signal is transformed.

The method includes determining banded spatial features from the plurality of sampled input signals.

In embodiments that include simultaneous echo suppression, the method includes accepting one or more reference signals and forming a banded frequency domain amplitude metric representation of the one or more reference signals. The representation in one embodiment is the sum. Again in embodiments that include echo suppression, the method includes predicting a banded frequency domain amplitude metric representation of the echo using adaptively updated echo filter coefficients, the coefficients updated using an estimate of the banded spectral amplitude metric of the noise, previously predicted echo spectral content, and an estimate of the banded spectral amplitude metric of the mixed-down signal. The estimate of the banded spectral amplitude metric of the mixed-down signal is in one embodiment the mixed-down banded instantaneous frequency domain amplitude metric of the input signals, while in other embodiments, signal spectral estimation is used. The control of the update of the prediction filter in one embodiment further includes voice-activity detecting—VAD—using the estimate of the banded spectral amplitude metric of the mixed-down signal, the estimate of banded spectral amplitude metric of noise, and the previously predicted echo spectral content. The results of voice-activity detecting determine whether there is updating of the filter coefficients. The updating of the filter coefficients is based on the estimates of the banded spectral amplitude metric of the mixed-down signal and of the noise, and the previously predicted echo spectral content.

The method includes calculating raw suppression probability indicators, e.g., suppression gains including an out-of-location signal gain determined using two or more of the spatial features and a noise suppression probability indicator, e.g., as a noise suppression gain determined using an estimate of noise spectral content, and combining the raw suppression probability indicators, e.g., suppression gains to determine a first combined gain for each band. In some embodiments, the estimate of noise spectral content is a spatially-selective estimate of noise spectral content. The noise suppression probability indicator, e.g., suppression gain in some embodiments includes suppression of echoes, and its calculating also uses the predicted echo spectral content.

In some embodiments, the method further includes carrying out spatially-selective voice activity detection determined using two or more of the spatial features to generate a signal classification, e.g., whether the input audio signal is voice or not. In some embodiments, wind detection is used, such that the signal classification further includes whether the input audio signal is wind or not.

Some embodiments of the method further include carrying out post-processing on the first combined gains of the bands to generate a post-processed gain for each band. The post-processing includes in some embodiments one or more of: ensuring minimum gain, e.g., in a band dependent manner, ensuring there are no isolated or outlier gains by carrying out median filtering of the combined gain, and ensuring smoothness by carrying out time and/or band-to-band smoothing. In one embodiment, the post-processing is according to the signal classification.

In one embodiment in which echo suppression is included, the method includes calculating an additional echo suppression probability indicator, e.g., suppression gain. In one embodiment, the additional echo suppression gain is combined with the other raw suppression gains to form the first combined gain, and (post-processed if post-processing is included) first combined gain forms a final gain for each band. In other embodiments, the additional echo suppression gain is combined with the (post-processed if post-processing is included) first combined gain to generate a final gain for each band.

The method includes interpolating the final gain to produce final bin gains, and applying the final bin gains to carry out suppression on the bin data of the mixed-down signal to form suppressed signal data, and applying one or both of a) output synthesis and transforming to generate output samples, and b) output remapping to generate output frequency bins.

Particular embodiments include a method of operating a processing apparatus to suppress undesired signals, the undesired signals including noise. Particular embodiments also include a processing apparatus including a processing system, with the processing apparatus configured to carry out the method. The method comprises: accepting in the processing apparatus at least one sampled input signal; and forming a banded instantaneous frequency domain amplitude metric of the at least one input signal for a plurality of frequency bands, the forming including transforming into complex-valued frequency domain values for a set of frequency bins. The method further comprises calculating a first set of one or more suppression probability indicators, including a noise suppression probability indicator determined using an estimate of noise spectral content; combining the first set of probability indicators to determine a first combined gain for each band; and applying an interpolated final gain determined from the first combined gain to carry out suppression on bin data of the at least one input signal to form suppressed signal data. The noise suppression probability indicator for each frequency band is expressible as noise suppression gain function of the banded instantaneous amplitude metric for the band. For each frequency band, a first range of values of banded instantaneous amplitude metric values is expected for noise, and a second range of values of banded instantaneous amplitude metric values is expected for a desired input. The noise suppression gain functions for the frequency bands are configured to: have a respective minimum value; have a relatively constant value or a relatively small negative gradient in the first range; have a relatively constant gain in the second range; and have a smooth transition from the first range to the second range.

Particular embodiments include a method of operating a processing apparatus to suppress undesired signals. The method comprises: accepting in the processing apparatus at least one sampled input signal; forming a banded instantaneous frequency domain amplitude metric of the at least one input signal for a plurality of frequency bands, the forming including transforming into complex-valued frequency domain values for a set of frequency bins; calculating a first set of one or more suppression probability indicators, including a noise suppression probability indicator determined using an estimate of noise spectral content; and combining the first set of probability indicators to determine a first combined gain for each band. Some embodiments of the method further comprise carrying out post-processing on the first combined gains of the bands to generate a post-processed gain for each band, the post-processing including ensuring minimum gains for each band; and applying an interpolated final gain determined from the post-processed gain to carry out suppression on bin data of the at least one input signal to form suppressed signal data. In some versions, the post-processing includes one or more of: carrying out median filtering of gains; carrying out band-to-band smoothing of gains, and carrying out time smoothing of gains.

Particular embodiments include a method of operating a processing apparatus to process at least one sampled input signal, the method comprising: accepting in the processing apparatus at least one sampled input signal and forming a banded instantaneous frequency domain amplitude metric of the at least one input signal for a plurality of frequency bands, the forming including transforming into complex-valued frequency domain values for a set of frequency bins and banding to a plurality of frequency bands. The method further includes calculating a gain for each band in order to achieve noise reduction and/or, in the case that the banding is perceptual banding, one or more of perceptual domain-based leveling, perceptual domain-based dynamic range control, and perceptual domain-based dynamic equalization. In some embodiments, the method further comprises carrying out post-processing on the gains of the bands to generate a post-processed gain for each band; the post-processing including median filtering of the gains of the bands, and applying an interpolated final gain determined from the (post-processed if post-processing is included) gain to carry out noise reduction and/or, in the case that the banding is perceptual banding, one or more of perceptual domain-based leveling, perceptual domain-based dynamic range control, and perceptual domain-based dynamic equalization on bin data to form processed signal data. Some versions of the method further comprise carrying out at least one of voice activity detecting and wind activity detecting to a signal classification, wherein the median filtering depends on the signal classification.

Particular embodiments include a method of operating a processing apparatus to suppress undesired signals, the method comprising: accepting in the processing apparatus a plurality of sampled input signals; and forming a mixed-down banded instantaneous frequency domain amplitude metric of the input signals for a plurality of frequency bands, the forming including transforming into complex-valued frequency domain values for a set of frequency bins. The method further comprises determining banded spatial features from the plurality of sampled input signals; calculating a first set of suppression probability indicators, including an out-of-location suppression probability indicator determined using two or more of the spatial features, and a noise suppression probability indicator determined using an estimate of noise spectral content; combining the first set of probability indicators to determine a first combined gain for each band. The first combined gain, after post-processing if post-processing is included, forms a final gain for each band; and applying an interpolated final gain determined from the first combined gain. Interpolating the final gain produces final bin gains to apply to bin data of the mixed-down signal to form suppressed signal data. The estimate of noise spectral content is a spatially-selective estimate of noise spectral content determined using two or more of the spatial features. In some versions, the estimate noise spectral content is determined by a leaky minimum follower with a tracking rate defined by at least one minimum follower leak rate parameter. In particular versions, the at least one leak rate parameter of the leaky minimum follower are controlled by the probability of voice being present as determined by voice activity detecting.

Particular embodiments include a method of operating a processing apparatus to suppress undesired signals, the method comprising: accepting in the processing apparatus a plurality of sampled input signals; forming a mixed-down banded instantaneous frequency domain amplitude metric of the input signals for a plurality of frequency bands, the forming including transforming into complex-valued frequency domain values for a set of frequency bins; and determining banded spatial features from the plurality of sampled input signals. The method further comprises calculating a first set of suppression probability indicators, including an out-of-location suppression probability indicator determined using two or more of the spatial features, and a noise suppression probability indicator determined using an estimate of noise spectral content; accepting in the processing apparatus one or more reference signals; forming a banded frequency domain amplitude metric representation of the one or more reference signals; and predicting a banded frequency domain amplitude metric representation of an echo using adaptively determined echo filter coefficients. The method further includes determining a plurality of indications of voice activity from the mixed-down banded instantaneous frequency domain amplitude metric using respective instantiations of a universal voice activity detection method, the universal voice activity detection method controlled by a set of parameters and using: an estimate of noise spectral content, the banded frequency domain amplitude metric representation of the echo, and the banded spatial features, the set of parameters including whether the estimate of noise spectral content is spatially selective or not, which indication of voice activity an instantiation determines being controlled by a selection of the parameters, voice activity. The method further comprises combining the first set of probability indicators to determine a first combined gain for each band; and applying an interpolated final gain determined from the gain (post-processed, if post-processing is included) to carry out suppression on bin data of the mixed-down signal to form suppressed signal data. Different instantiations of the universal voice activity detection method are applied in different steps of the method. In some versions, the estimate of noise spectral content is a spatially-selective estimate of noise spectral content determined using two or more of the spatial features.

Particular embodiments include a tangible computer-readable storage medium configured with instructions that when executed by at least one processor of a processing system, cause processing hardware to carry out a method as described herein.

Particular embodiments include logic that can be encoded in one or more computer-readable tangible media to carry out a method as described herein.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Particular Example Embodiments

Described herein is a method of processing: (a) a plurality of input signals, e.g., signals from a plurality of spatially separated microphones; and, for echo suppression, (b) one or more reference signals, e.g., signals from or to be rendered by one or more loudspeakers and that can cause echoes. There typically is a source of sound, e.g., a human who is a source of human voice for the array of microphones. The method processes the input signals and one or more reference signals to carry out in an integrated manner simultaneous noise suppression, echo suppression, and out-of-location signal suppression. Also described herein is a system accepting the plurality of input signals and the one or more reference signals to process the input signals and one or more reference signals to carry out in an integrated manner simultaneous noise suppression, echo suppression, and out-of-location signal suppression. Also described herein is at least one storage medium on which are coded instructions that when executed by one or more processors of a processing system, cause processing a plurality of input signals, e.g., microphone signals and one or more reference signals, e.g., for or from one or more loudspeakers to carry out in an integrated manner simultaneous noise suppression, echo suppression, and out-of-location signal suppression.

Suppression in the Spectral Domain

Embodiments of the invention are described in terms of determining and applying a set of suppression probability indicators, expressed, e.g., as suppression gains for each of a plurality of spectral bands, applied to spectral values of signals at a number of frequency bands. The spectral values represent spectral content. In many of the embodiments described herein, the spectral content is in terms of the power spectrum. However, the invention is not limited to processing power spectral values. Rather, any spectral amplitude dependent metric can be used. For example, if the amplitude spectrum is used directly, such spectral content is sometimes referred to as spectral envelope. Thus, often, rather than using the phrase "power spectrum," the phrase "power spectrum (or other amplitude metric spectrum)" is used in the description.

List of Some Commonly Used Symbols

B: The number of spectral values, also called the number of bands. In one embodiment, the B bands are at frequencies whose spacing is monotonically non-decreasing. At least 90% of the frequency bands include contribution from more than one frequency bin, and in a preferred embodiment, each frequency band includes contribution from two or more frequency bins. In some particular embodiments, the bands are monotonically increasing in a log-like manner. In some particular embodiments, they are on a psycho-acoustic scale, that is, the frequency bands are spaced with a scaling related to psycho-acoustic critical spacing, such banding called "perceptually-banding" herein b: The band number from 1 to B.

$f_C(b)$: The center frequency of band b.

N: The number of frequency bins after transforming to the frequency domain.

M: The number of samples in a frame, e.g., the number of samples being windowed by a suitable window.

T: The time interval of the sound being sampled by a frame of M samples.

$f_0$: The sampling frequency for the M samples of a frame.

P: The number of input signals, e.g., microphone input signals.

Q: The number of reference inputs.

$X_{p,n}$ The N complex-valued frequency bins of the p'th input M sample frame of the P (microphone) input samples, denoted $x_{p,m}$, m=0, . . . M−1, with p=1, . . . P, in increasing frequency bin order n, n=0, . . . N−1.

$R'_b$ The banded covariance matrix of the P input signals formed, e.g., from the frequency bins $X_{p,n}$, and a weighting matrix $W_b$ with elements $w_{b,n}$.

$Y_n$ The N frequency bins of the mixed-down, e.g., beamformed signal (combined with noise and echo) of the most recent T-long frame (the current frame) of M samples. This is determined, e.g., by the downmixing e.g., beamforming the transformed signal bins of the inputs, or by downmixing e.g., beamforming in the sample domain, and transforming the mixed-down, e.g., beamformed signal samples.

$Y_b'$ The instantaneous (banded) spectral content, e.g., instantaneous spectral power (or other frequency domain amplitude metric) in the mixed-down, e.g., beamformed signal (combined with noise and echo) of the most recent T-long frame (the current frame) in frequency band b. This is determined, e.g., by banding into frequency bands the mixed-down, e.g., beamformed transformed signal bins.

$X_n$ The N frequency bins of the reference input of the most recent T-long frame (the current frame) of M samples obtained e.g., by transforming into frequency bands a signal representative of the one or more reference inputs.

$X_b'$ The reference input instantaneous spectral content, e.g., instantaneous power (or other frequency domain amplitude metric) of the most recent T-long frame (the current frame) in frequency band b. This is determined, e.g., by transforming and banding into frequency bands a signal representative of the one or more reference inputs.

$X_{b,l}'$: The reference input instantaneous power spectral contents, e.g., power (or other frequency domain amplitude metric), in band b for T-long frame index l, with l=0, . . . , L−1, representing a frame index of how many M input sample frames are in the past, that is, the l'th previous frame, with l=0 being the most recent T-long frame of M samples, so that $X_b'=X_{b,0}'$.

$E_b'$ The predicted echo spectral content, e.g., power spectrum (or other amplitude metric spectrum) in frequency band b.

$P_b'$ The signal estimated spectral content, e.g., power spectrum (or other amplitude metric spectrum) of the most recent frame (the current frame) in frequency band b, determined from the instantaneous banded power $Y_b'$. In some embodiments in which the banding is log-like designed with psycho-acoustics in mind, $Y_b'$ may be a sufficiently good estimate of $P_b'$.

$N_b'$ The noise estimate spectral content, e.g., power spectrum (or other amplitude metric spectrum) in frequency band b. This is used, e.g., for voice activity detection and for updating filter coefficients for the adaptive prediction of the echo spectral content.

S Voice activity as determined by a VAD. When S exceeds a threshold, the signal is assumed to be voice.

Description

FIG. 1 shows a block diagram of an embodiment of a system 100 that accepts a number of one or more denoted P of signal inputs 101, e.g., microphone inputs from microphones (not shown) at different respective spatial locations, the input signals denoted MIC 1, . . . , MIC P, and a number, denoted Q of reference inputs 102, denoted REF 1, . . . , REF Q, e.g., Q inputs 102 to be rendered on Q loudspeakers, or signals obtained from Q loudspeakers. The signals 101 and 102 are in the form of sample values. In some embodiments of the invention, P=1, i.e., there is only a single microphone inputs. When there is out-of-location signal suppression, P≥2, so that there are at least two signal inputs, e.g., microphone inputs. Similarly, in some embodiments, e.g., in some embodiments where there is no echo suppression, Q=0, so that there are no reference inputs. When there is echo suppression, Q≥1. The system 100 shown in FIG. 1 carries out in an integrated manner simultaneous noise suppression and out-of-location signal suppression, and in some embodiments also simultaneous echo suppression.

One such embodiment includes a system 100 comprising an input processor 103, 107, 109 to accept a plurality of sampled input signals and form a mixed-down banded instantaneous frequency domain amplitude metric 110 of the input signals 101 for a plurality B of frequency bands. In one embodiment, the input processor 103, 107, 109 includes input transformers 103 to transform to frequency bins, a downmixer, e.g., beamformer 107 to form a mixed-down, e.g., beamformed signal 108, denoted $Y_n$, n=0, . . . , N−1, and a spectral banding element 109 to form frequency bands denoted $Y_b'$, b=1, . . . , B. In some embodiments the beamforming is carried out prior to transforming, and in others, as shown in FIG. 1, the transforming is prior to downmixing, e.g., beamforming.

One system embodiment includes a banded spatial feature estimator 105 to estimate banded spatial features 106 from the plurality of sampled input signals, e.g., after transforming, and in other embodiments, before transforming.

Versions of system 100 that include echo suppression include a reference signal input processor 111 to accept one or more reference signals, a transformer 113 and a spectral banding element 115 to form a banded frequency domain amplitude metric representation 116 of the one or more reference signals. Such versions of system 100 include a predictor 117 of a banded frequency domain amplitude metric representation of the echo 118 based on adaptively determined filter coefficients. To adaptively determine the filter coefficients, a noise estimator 123 determines an estimate of the banded spectral amplitude metric of the noise 124. A voice-activity detector (VAD) 124 uses the banded spectral amplitude metric of the noise 124, an estimate of the banded spectral amplitude metric of the mixed-down signal 122 determined by a signal spectral estimator 121, and previously predicted echo spectral content 118 to produce a voice detection output. In some embodiments, the banded signal 110 is a sufficiently accurate estimate of the banded spectral amplitude metric of the mixed-down signal 122, so that signal spectral estimator 121 is not used. The results of the VAD 125 are used by an adaptive filter updater 127 to determine whether to update the filter coefficients 128 based on the estimates of the banded spectral amplitude metric of the mixed-down signal 122 (or 110) and of the noise 124, and the previously predicted echo spectral content 118.

System 100 further includes a gain calculator 129 to calculate suppression probability indicators, e.g., as gains including, in one embodiment, an out-of-location signal probability indicator, e.g., gain determined using two or more of the spatial features 106, and a noise suppression probability indicator, e.g., gain determined using spatially-selective noise spectral content. In some embodiments that include echo suppression, the noise suppression gain includes echo suppression. In one embodiment, the gain calculator 129 further is to combine the raw suppression gains to a first combined gain for each band.

In some embodiments, gain calculator 129 further is to carry out post-processing on the first combined gains of the bands to generate a post-processed gain 130 for each band. The post-processing includes depending on the embodiment, one or more of: ensuring minimum gain, in some embodiments in a band dependent manner; in some embodiments ensuring there are no outlier or isolated gains by carrying out median filtering of the combined gain; and in some embodiments ensuring smoothness by carrying out time smoothing and, in some embodiments, band-to-band smoothing. In some embodiments, the post-processing includes spatially-selective voice activity detecting using two or more of the spatial features 106 to generate a signal classification, such that the post-processing is according to the signal classification.

In some embodiments, the gain calculator 129 further calculates an additional echo suppression gain. In one embodiment this is combined with the other gains (prior to post-processing, if post-processing is included) to form the first combined gain. In another embodiment, the additional echo suppression gain is combined with the first combined gain (after post-processing, if post-processing is included) to generate a final gain for each band.

System 100 further includes a noise suppressor 131 to apply the gain 130 (after post-processing, if post-processing is included) to carry out suppression on the bin data of the mixed-down signal to form suppressed signal data 132. System 100 further includes in 133 one or both of: a) an output synthesizer and transformer to generate output samples, and b) output remapping to generate output frequency bins.

System embodiments of the invention include a system comprising: means for accepting 103 a plurality of sampled input signals 101 and forming 103, 107, 109 a mixed-down banded instantaneous frequency domain amplitude metric 110 of the input signals 101 for a plurality of frequency bands. In one embodiment, the means for accepting and forming includes means 103 for transforming to frequency bins, means 107 for beamforming to form a mixed-down, e.g., beamformed signal, and means for banding (109) to form frequency bands. In some embodiments the beamforming is carried out prior to transforming, and in others, the transforming is prior to downmixing, e.g., beamforming.

One system embodiment includes means for determining 105 banded spatial features 106 from the plurality of sampled input signals.

The system embodiments that include echo suppression include means for accepting 213 one or more reference signals and for forming 215, 217 a banded frequency domain amplitude metric representation 116 of the one or more reference signals, and means for predicting 117, 123, 125, 127 a banded frequency domain amplitude metric representation of the echo 118. In some embodiments, the means for predicting 117, 123, 125, 127 includes means for adaptively determining 125, 127 echo filter coefficients 128 coupled to means for determining 123 an estimate of the banded spectral amplitude metric of the noise 124, means for voice-activity detecting (VAD) using the estimate of the banded spectral amplitude metric of the mixed-down signal 122, and means for updating 127 the filter coefficients 128. The output of the VAD is coupled to means for updating and determined if the means for updating updates the filter coefficients. The filter coefficients are updated based on the estimates of the banded spectral amplitude metric of the mixed-down signal 122 and of the noise 124, and the previously predicted echo spectral content 118;

One system embodiment further includes means for calculating 129 suppression gains including an out-of-location signal gain determined using two or more of the spatial features 106, and a noise suppression gain determined using spatially-selective noise spectral content. In some embodiments that include echo suppression, the noise suppression gain includes echo suppression. The calculating of the means for calculating 129 includes combining the raw suppression gains to a first combined gain for each band.

In some embodiments, the means for calculating 129 further includes means for carrying out post-processing on the first combined gains of the bands to generate a post-processed gain 130 for each band. The post-processing includes in some embodiments one or more of ensuring minimum gain, e.g., in a band dependent manner, ensuring there are no isolated gains by carrying out median filtering of the combined gain, and ensuring smoothness by carrying out time and/or band-to-band smoothing. In some embodiments, the means for post-processing includes means for spatially-selective voice activity detecting using two or more of the spatial features 106 to generate a signal classification, such that the post-processing is according to the signal classification.

In some embodiments, the means for calculating 129 includes means for calculating an additional echo suppression gain. This is combined in some embodiments with gain(s) (prior to post-processing, if post-processing is included) to form the first combined gains of the bands to be used as a final gain for each band, and in other embodiments the additional echo suppression gain in each band is combined with the first combined gains (post-processed, if post-processing is included) to generate a final gain for each band.

One system embodiment further includes means 131 for interpolating the final gains to final bin gains and applying the final bin gains to carry out suppression on the bin data of the mixed-down signal to form suppressed signal data 132. One system embodiment further includes means 133 for applying one or both of: a) output synthesis and transforming to generate output samples 135, and b) output remapping to generate output frequency bins 135 (note the same reference numeral is used for both an output sample generator, and an output frequency bin generator).

Figure 2:
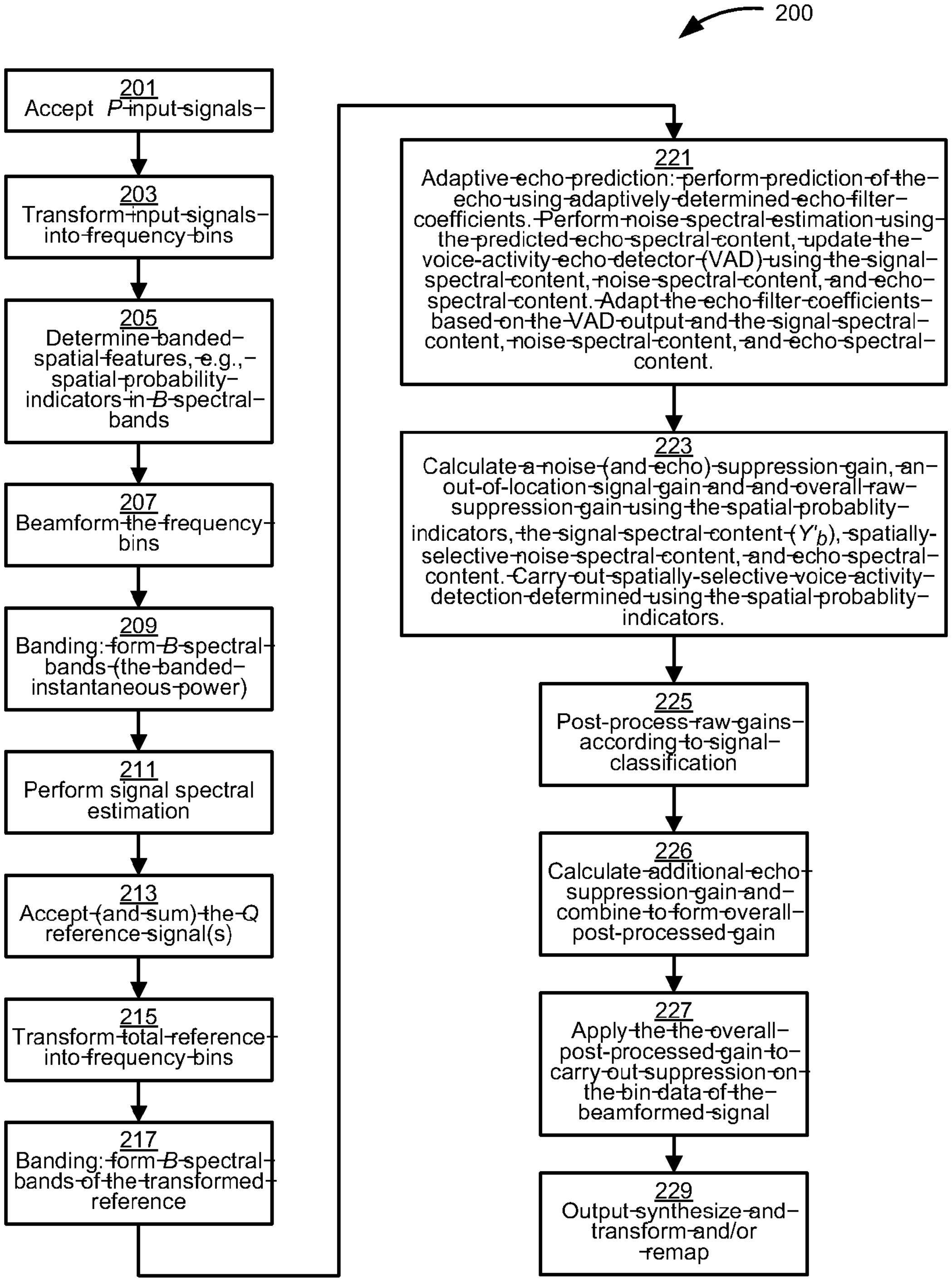
FIG. 2 shows a simplified flow chart diagram of one method embodiment of the invention.

FIG. 2 shows a flowchart of a method 200 of operating a processing apparatus 100 to suppress noise and out-of-location signals and in some embodiments echo in a number denoted P of signal inputs 101, e.g., microphone inputs from microphones at different respective spatial locations, the input signals denoted MIC 1, . . . , MIC P. In embodiments that include echo suppression, method 200 includes processing a number, denoted Q of reference inputs 102, denoted REF 1, . . . , REF Q, e.g., Q inputs to be rendered on Q loudspeakers, or signals obtained from Q loudspeakers. The signals are in the form of sample values. In some embodiments, it is sufficient to use an estimate of a combined amplitude metric relating to the expected echo as obtained from another source. The system carries out, in an integrated manner, simultaneous noise suppression, out-of-location signal suppression, and, in some embodiments, echo suppression.

In one embodiment, method 200 comprises: accepting 201 in the processing apparatus a plurality of sampled input signals 101, and forming 203, 207, 209 a mixed-down banded instantaneous frequency domain amplitude metric 110 of the input signals 101 for a plurality of frequency bands, the forming including transforming 203 into complex-valued frequency domain values for a set of frequency bins. In one embodiment, the forming includes in 203 transforming the input signals to frequency bins, downmixing, e.g., beamforming the frequency data, and in 207 banding. In alternate embodiments, the downmixing can be before transforming, so that a single mixed-down signal is transformed. In alternate embodiments, the system may make use of an estimate of the banded echo reference, or a similar representation of the frequency domain spectrum of the echo reference provided by another processing component or source within the realized system.

The method includes determining in 205 banded spatial features 106 from the plurality of sampled input signals.

In embodiments that include simultaneous echo suppression, the method includes accepting 213 one or more reference signals and forming in 215 and 217 a banded frequency domain amplitude metric representation 116 of the one or more reference signals. The representation in one embodiment is the sum. Again in embodiments that include echo suppression, the method includes predicting in 221 a banded frequency domain amplitude metric representation of the echo 118 using adaptively determined echo filter coefficients 128. The predicting in one embodiment further includes voice-activity detecting—VAD—using the estimate of the banded spectral amplitude metric of the mixed-down signal 122, the estimate of banded spectral amplitude metric of noise 124, and the previously predicted echo spectral content 118. The coefficients 128 are undated or not according to the results of voice-activity detecting. Updating uses an estimate of the banded spectral amplitude metric of the noise 124, previously predicted echo spectral content 118, and an estimate of the banded spectral amplitude metric of the mixed-down signal 122. The estimate of the banded spectral amplitude metric of the mixed-down signal is in one embodiment the mixed-down banded instantaneous frequency domain amplitude metric 110 of the input signals, while in other embodiments, signal spectral estimation is used.

In some embodiments, the method 200 includes: a) calculating in 223 raw suppression gains including an out-of-location signal gain determined using two or more of the spatial features 106, and a noise suppression gain determined using spatially-selective noise spectral content; and b) combining the raw suppression gains to a first combined gain for each band. The noise suppression gain in some embodiments includes suppression of echoes, and its calculating 223 also uses the predicted echo spectral content 118.

In some embodiments, the method 200 further includes carrying out in spatially-selective voice activity detection determined using two or more of the spatial features 106 to generate a signal classification, e.g., whether voice or not. In some embodiments, wind detection is used such that the signal classification further includes whether the signal is wind or not.

In some embodiments, the method 200 further includes carrying out post-processing on the first combined gains of the bands to generate a post-processed gain 130 for each band. The post-processing includes in some embodiments one or more of: ensuring minimum gain, e.g., in a band dependent manner, ensuring there are no isolated gains by carrying out median filtering of the combined gain, and ensuring smoothness by carrying out time and/or band-to-band smoothing. In one embodiment, the post-processing is according to the signal classification.

In one embodiment in which echo suppression is included, the method includes calculating in 226 an additional echo suppression gain. In one embodiment, the additional echo suppression gain is included in the first combined gain which is used as a final gain for each band, and in other embodiment, the additional echo suppression gain is combined with the first combined gain (post-processed, if post-processing is included) to generate a final gain for each band.

The method includes applying in 227 the final gain, including interpolating the gain for bin data to carry out suppression on the bin data of the mixed-down signal to form suppressed signal data 132. And apply in 229 one or both of a) output synthesis and transforming to generate output samples, and b) output remapping to generate output frequency bins.

Typically, $P \geq 2$ and $Q \geq 1$. However, the methods, systems, and apparatuses disclosed herein can scale down to remain effective for the simpler cases of $P=1$, $Q \geq 1$ and $P \geq 2$, $Q=0$. The methods and apparatuses disclosed herein even work reasonably well for $P=1$, $Q=0$. Although this final example is a reduced and perhaps trivial embodiment of the presented invention, it is noted that the ability of the proposed framework to scale is advantageous, and furthermore the lower signal operation case may be required in practice should one or more of the input signals or reference become corrupted or unavailable, e.g. due to the failure of a sensor or microphone.

Whilst the disclosure is presented for a complete method (FIG. 2), system or apparatus (FIG. 1) that includes all aspects of suppression, including simultaneous echo, noise, and out-of-spatial location suppression, or presented as a computer-readable storage medium that includes instructions that when executed by one or more processors of a processing system (see FIG. 16 and description thereof), cause a processing apparatus that includes the processing system to carry out the method such as that of FIG. 2, note that the example embodiments also provide a scalable solution for simpler applications and situations. There can be a substantial benefit, for example when a send-side (noise suppression, echo suppression, and spatial selectivity) and receive-side (noise only) are required on a single apparatus, e.g., a device such as a Bluetooth headset, and in the case that the methods are implemented on processing systems that execute code stored in one or more storage media, there is a benefit to sharing code for the different aspects within the same one or more storage media.

One embodiment includes simultaneous noise suppression, echo suppression and out-of-spatial location suppression, while another embodiment includes simultaneous noise suppression and out-of-spatial location suppression. Much of the description herein assumes simultaneous noise suppression, echo suppression and out-of-location signal suppression, and how to modify any embodiment to not include echo suppression would be clear to one skilled in the art.

The Reference Signals and Input Signals

The Q reference signals represent a set of audio signals that relate to the potential echo at the microphone array. In a typical case, the microphone array may be that of a headset, personal mobile device or fixed microphone array. The references may correspond to signals being used to drive one or several speakers on the headset or personal mobile device, or one or more speakers used in a speaker array or surround sound configuration, or the loudspeakers on a portable device such as a laptop computer or tablet. It is noted that the application is not limited to these scenarios, however the nature of the approach is best suited to an environment where the response from each reference to the microphone array center is similar in gain and delay. The reference signals may also represent a signal representation prior to the actual speaker feeds, for example a raw audio stream prior to it being rendered and sent to a multichannel speaker output. The proposed approach offers a solution for robust echo control which also allows for moderate spatial and temporal variation in the echo path, including being robust to sampling offsets, discontinuities and timing drift.

The reference inputs may represent the output speaker feeds that are creating the potential echo, or alternately the sources that will be used to create the speaker outputs after appropriate rendering. The system will work well for either case, however in some embodiments, the use of the initial independent and likely uncorrelated sources prior to rendering are preferred. Provided that the rendering is linear and of a constant or slow time varying gain the adaptive framework presented in this invention is able to manage the variation and complexity of the multi channel echo source. The use of the component audio sources rather than the rendered speaker feeds can be beneficial in avoiding issues in the combination of the echo reference due to signal correlations. The combination of the echo reference and robustness for the multichannel echo suppression is discussed further later in the disclosure.

In one set of embodiments, the output of the system is a single signal representing the separated voice or signal of interest after the removal of noise, echo and sound components not originating from the desired position. In another embodiment, the output of the system is a set of remapped frequency components representing the separated voice or signal of interest after the removal of noise, echo and sound components not originating from the desired position. These frequency components are, e.g., in a form usable by a subsequent compression (coding) method or additional processing component.

Each of the processing of system 100 and the method 200 is carried out in a frame-based manner (also called block-based manner) on a frame of M input samples (also called a block of M input samples) at each processing time instant. The P inputs, e.g., microphone inputs are transformed by one or more time-to-frequency transformers 103 independently to produce a set of P frequency domain representations. The transform to the frequency domain representation will typically have a set of N linearly spaced frequency bins each having a single complex value at each processing time instant. It is noted that generally N≥M such that at each time instant, M new audio data samples are processed to create N complex-valued frequency domain representation data points. The increased data in the complex-valued frequency domain representation allows for a degree of analysis and processing of the audio signal suited to the noise, echo and spatial selectivity algorithm to achieve reasonable phase estimation.

Combining the Reference Signals

In one embodiment, the Q reference inputs are combined using a simple time domain sum. This creates a single reference signal of M real-valued samples at each processing instant. It has been found by the inventor(s) that the system is able to achieve suppression for a multi-channel echo by using only a single combined reference. While the invention does not depend on any reasoning of why the results are achieved, it is believed that using only a single combined reference works, we believe, as a result of the inherent robustness of using the banded amplitude metric representation of the echo, noise and signal within the suppression framework, and the broader time resolution offered from the time-frame-based processing. This approach allows a certain timing and gain uncertainty or margin of error. For a reasonable frame size of 8-32 ms and echo estimation margin of 3 dB, this relates to a variation of the speaker to microphone response equivalent to having several, e.g., 2-8, meters change relative distance between the speakers. This was found to be satisfactory for most domestic and single user applications and should remain effective even for larger theatre or speaker array configurations.

In one embodiment, the Q reference inputs are combined, e.g., using summation in the time domain to create a single reference signal to be used for the echo control. In some embodiments, this summation may occur after the transform or at the banding stage where the power spectra (or other amplitude metric spectra) of the Q reference signals may be combined. Combining the signals in the power domain has the advantage of avoiding the effects of destructive (cancellation) or constructive combination of correlated content across the Q signals. Such ‘in phase’ or exact phase aligned combination of the reference signals is unlikely to occur extensively and consistently across time and/or frequency at the microphones due to the inherent complexities of the expected acoustic echo paths. Whilst the direct combination approach can create deviations in the single channel reference power estimate and its ability to be used as an echo predictor. In practice, this is not found to be a significant problem for typical multi channel content. The single channel time domain summation offers effective performance at very low complexity. Where a large amount of correlated content is expected between the channels, and the probability is reasonable that there may be opposing phase and time aligned content, the potential for loss of echo control performance can be reduced by using a de-correlating filter on one or more of the reference channels. One example of such a filter commonly used in the art is a time delay. A 2-5 ms time delay is suggested for such embodiments of the invention. Another example is a bulk phase shift such as a Hilbert transform or 90-degree phase shift.

Transforming to the Frequency Domain

There are many aspects of this invention that are dependent on the ability to work in a signal domain with a discrete time interval at which estimates and processing control are updated, and there is a degree of separation across frequency. Such approaches are often referred to as filterbanks or transforms and processing carried out in the frequency domain. It should be apparent to one skilled in the art, that there are many frameworks possible. The following section sets out a general framework and some preferred embodiments for such signal processing to be used in the various example embodiments described herein.

Embodiments of the invention process the data frame-by-frame, with each consecutive frame of samples used in the transform overlapping with the previous frame of samples used in some way. Such overlapped frame processing is common in audio signal processing. The term "instantaneous" as used herein in the context of such frame-by-frame processing means for the current frame.

Figure 3A:
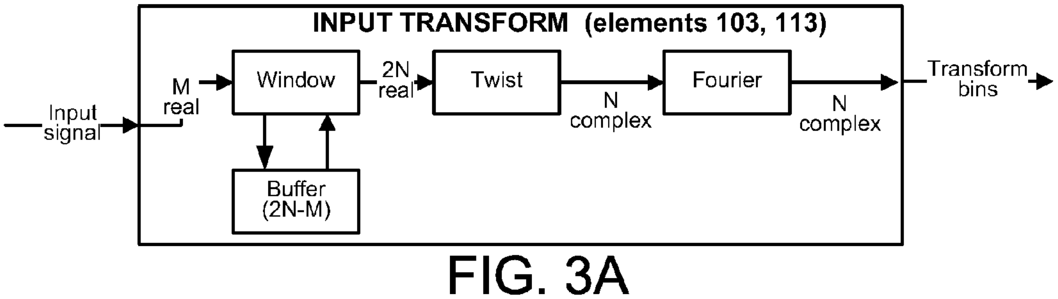
FIG. 3A shows a simplified block diagram of a time-frame of samples being windowed to generate values which are transformed according to a transform, in according with a feature of one or more embodiments of the invention.
Figure 3B:
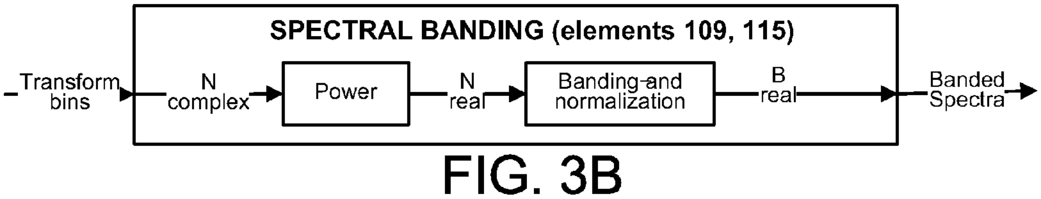
FIG. 3B shows a simplified block diagram of banding frequency bins to a plurality of frequency bands.

FIGS. 3A-3E show some details of some of the elements of embodiments of the invention. FIG. 3A shows a frame (a block) of M input samples being placed in a buffer of length 2N with a set of 2N−M previous samples and being windowed according to a window function to generate 2N values which are transformed according to a transform, with an additional twist function as described below. This results in N complex-valued bins. FIG. 3B shows the conversion of the N bins to a number B of frequency bands. The banding to B bands is described in more detail below. One aspect of the invention is the determination of a set of B suppression gains for the B bands. The determination of the gains incorporates statistical spatial information, e.g., indicative of out-of-location signals.

Figure 3C:
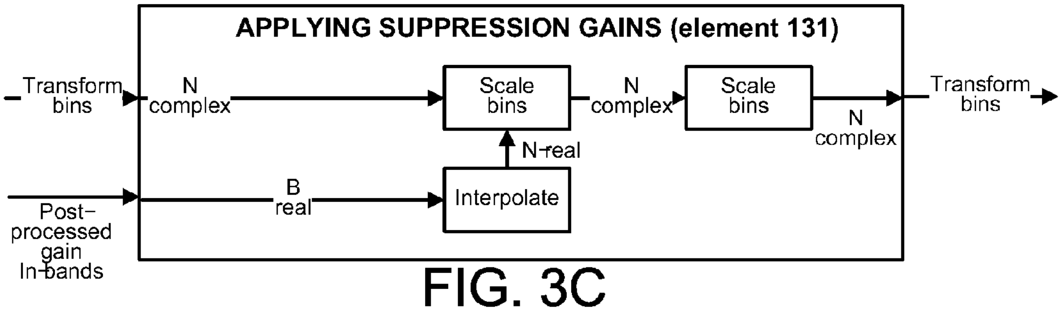
FIG. 3C shows a simplified block diagram of the application of calculated gains to bins of sampled input data.

FIG. 3C shows the interpolation of B gains to create a set of N gains which are then applied to N bins of input data. Some embodiments of the invention include post-processing of raw-gains to ensure stability. The post-processing is controlled based on signal classification, e.g., a classification of the signal to according to one or more of (spatially selective) voice activity and wind activity. Thus, the post-processing applied is selected according to signal activity classification. The post-processing includes preventing the gains from falling below some pre-specified (frequency-band-dependent) minimum point, the manner of prevention dependent on the activity classification, how musical noise due to one or more isolated gain values can be effectively eliminated in a manner dependent on the activity classification, and how the gains may be smoothed, with the type and amount of smoothing dependent on the activity classification.

Figure 3D:
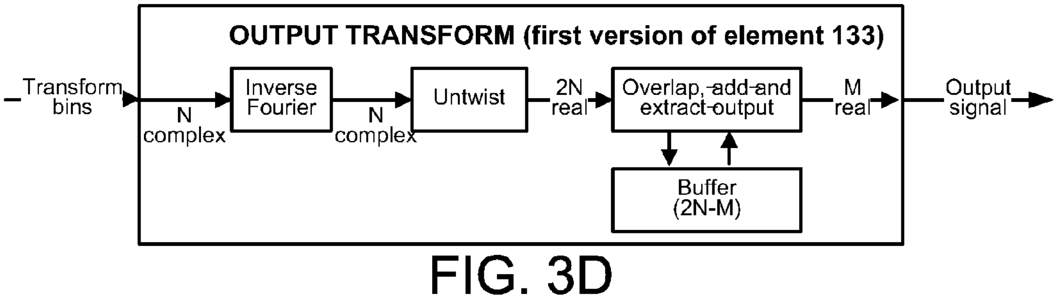
FIG. 3D shows a simplified block diagram of a synthesis process of converting output bins to frames of output samples.

The result of applying the suppression gains leads to N output bins. FIG. 3D describes the synthesis process of converting the N output bins to a frame of M output samples, and typically involves inverse transforming and windowed overlap-add operations.

Figure 3E:
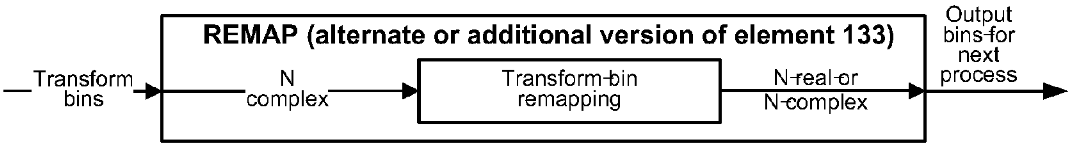
FIG. 3E is a simplified block diagram of an output stage that can be included in addition to or instead of the stage of FIG. 3D, and that reformats complex-valued bins to suit the transform needs of subsequent processing (such as an audio codec), according to a feature of some embodiments of the invention.

Instead of producing output samples, it may instead or in addition be desired to determine transform domain data for other processing needs. FIG. 3E is an optional output stage which can reformat the N complex-valued bins from FIG. 3C to suit the transform needs of subsequent processing (such as an audio codec) thus saving processing time and reducing signal latency. For example, in some applications, the processing of FIG. 3D is not used, as the output is to be encoded in some manner. In such cases, a remap operation as shown in FIG. 3E is applied.

Returning to FIG. 3A, for computational efficiency, the use of a discrete finite length Fourier transform (DFT), such as implemented by the fast Fourier transform (FFT) is an effective way of achieving the transform to a frequency domain. A discrete finite length Fourier transform, such as implemented by the FFT, is often referred to as a circulant transform due to the implicit assumption that the signal in the transform window is in some way periodic or repetitive. Most general forms of circulant transforms can be represented by buffering, a window, a twist (real value to complex value transformation) and a DFT, e.g., FFT. An optional complex twist after the DFT can be used to adjust the frequency domain representation to match specific transform definitions. This class of transforms includes the modified DFT (MDFT), the short time Fourier transform (STFT) and with a longer window and wrapping, a conjugate quadrature mirror filter (CQMF). To strictly comply with standard transforms such as the Modified discrete cosine transform (MDCT) and modified discrete sine transform (MDST), the additional complex twist of the frequency domain bins is used, however this does not change the underlying frequency resolution or processing ability of the transform and thus can be left until the end of the processing chain, and applied in the remapping if required.

In some embodiments, the following transform and inverse pair is used for the forward transform of FIG. 3A and inverse transform of FIG. 3D:

$$X_{2n} = \frac{1}{\sqrt{N}} \sum_{n'=0}^{N-1} e^{\frac{-i\pi n'}{2N}} (u_{n'} x_{n'} - i u_{N+n'} x_{N+n'}) e^{\frac{-i2\pi nn'}{N}} \quad n = 0 \ldots N/2-1$$

$$X_{2n+1} = \frac{1}{\sqrt{N}} \sum_{n'=0}^{N-1} e^{\frac{i\pi n'}{2N}} (u_{n'} x_{n'} + i u_{N+n'} x_{N+n'}) e^{\frac{-i2\pi nn'}{N}} \quad n = 0 \ldots N/2-1$$

$$y_n = v_n \mathrm{real}\left[\frac{1}{\sqrt{N}} e^{\frac{i\pi n}{4N}} \left( \sum_{n'=0}^{N/2-1} X_{n'} e^{\frac{i4\pi nn'}{N}} + \sum_{n'=N/2}^{N-1} \overline{X_{N-n'-1}} e^{\frac{i4\pi nn'}{N}} \right)\right]$$

$$n = 0 \ldots N-1$$

$$y_{N+n} = -v_{N+n} \mathrm{imag}\left[\frac{1}{\sqrt{N}} e^{\frac{i\pi n}{4N}} \left( \sum_{n'=0}^{N/2-1} X_{n'} e^{\frac{i4\pi nn'}{N}} + \sum_{n'=N/2}^{N-1} \overline{X_{N-n'-1}} e^{\frac{i4\pi nn'}{N}} \right)\right]$$

$$n = 0 \ldots N-1$$

where $i^2=-1$, $u_n$ and $v_n$ are appropriate window functions, $x_n$ represents the last 2N input samples with $x_{N-1}$ representing the most recent sample, $X_n$ represents the N complex-valued frequency bins in increasing frequency order. The inverse transform or synthesis of FIG. 3D is represented in the last two equation lines. $y_n$ represents the 2N output samples that result from the individual inverse transform prior to overlapping, adding and discarding as appropriate for the designed windows. It should be noted, that this transform has an efficient implementation as a block multiply and FFT.

In more detail regarding the synthesis process of FIG. 3D, in order to reconstruct the final output, the samples $y_n$ are added to a set of samples remaining from previous transform(s) in what is known as an overlap and add method. It should be evident to someone skilled in the art that this process of overlapping and combining is dependent on the frame size, transform size and window functions, and should be designed to achieve a accurate reconstruction of the input signal in the absence of any processing or modification of the signal, $X_n$, in the frequency domain.

Note that the use of $x_n$ and $X_n$ in the above expressions of transform is for convenience. In other parts of this disclosure, $X_n$, n=0, . . . , N−1, denote the frequency bins of the signal representative of the reference signals, and $Y_n$, n=0, . . . , N−1, denote the frequency bins of the mixed-down input signals.

For a given sampling rate, $f_0$, the transform is carried out every M samples representing a time interval, denoted T of $M/f_0$. It is typical, though not restrictive for this invention, that for voice applications that $f_0$=8000 Hz or $f_0$=16000 Hz with common transform sizes being optimal for powers of 2, N=128, 256 or 512. For the sampling case of M=N, such combinations of sampling rate and frame size lead to effective time intervals or transform domain sampling intervals of T=8, 16, 32 or 64 ms. In one embodiment, a sampling rate of $f_0$=16000 Hz is used with a frame and transform size of N=512 providing a transform time interval of 32 ms. This provides good resolution in the frequency domain, but may present an undesirable latency due to the framing and processing of 64 ms. For applications requiring lower latency and reduced computational complexity, another embodiment is a sample rate of $f_0$=8000 Hz and a frame size N=128, with a frame interval of 16 ms. For reasons of system frame matching, or to achieve a finer time resolution and slightly improved performance, the transform can be run more often or "over-sampled." In one embodiment, a frame size of M=90 is used with a transform N=128 at $f_0$=8000 Hz, with the frame size selected to reasonably align with a common frame size of 30 used in typical Bluetooth headsets.

The window functions $u_n$ and $v_n$ have an effect on the finer details of the transform frequency resolution and the transition and interpolation of activity between adjacent time frames of processed data. Since the transform is processed in an overlapping manner, the window functions control the nature of this overlap. It should be known to someone skilled in the art that there are many possibilities of window function related to this aspect of signal processing, each with different properties and trade-offs. A suggested window for the above transform in one embodiment is the sinusoidal window family, of which one suggested embodiment is $$u_n = v_n = \sin\left(\frac{n+\frac{1}{2}}{2N}\pi\right) \quad n = 0 \ldots 2N-1.$$

It can be seen that this window extends over the complete range of 2N samples. Using this sample window and this general approach is often referred to as a short term Fourier transform (STFT) method of transform and signal analysis.

It should be apparent to one skilled in the art, that the analysis and synthesis windows of FIG. 3A and FIG. 3D, also known as prototype filters, can be of length greater or smaller than the examples given herein. A smaller window can be represented in the general form suggested above with a set of zero coefficients (zero padding). A longer window is typically implemented by applying the window and then folding the signal into the transform processing range of the 2N samples. It is known that the window design affects certain aspects of: frequency resolution, independence of the frequency domain bins, latency, and processing distortions.

It should also be apparent to one skilled in the art that the invention is not limited to using any particular or specific type of transform. The method requires a degree of frequency and temporal analysis of the signals, as is indicated in the general suggested embodiments for the block period and the required frequency resolution A general property which is achieved or approximated by a suitable window is that after the application of the input and output windows, and overlapping after an interval M, a constant gain is achieved without modulation over time across the M sample frame.

$$u_n v_n + u_{n+M} v_{n+M} = k$$

where k is a scaling constant, and with a unity transform as provided in one embodiment discussed below, a useful requirement is that k=1 also to achieve a unity system gain It should be noted the standard complex-valued fast Fourier transform can be used in implementing the transforms used herein, so that this complete transform has an efficient implementation using a set of complex block multiplication and a standard FFT. While not meant to be limiting, such that other embodiments can use other designs, this design facilitates porting of the transform or filterbank by taking advantage of any standard existing optimized FFT implementation for the target processor platform.

It should be evident to one skilled in the art that there are many families of transforms represented by variations to the input and output windows and the frame size and positioning (M) and twists. Provided the windows are not sub-optimal, the main characteristics are the frequency sampling resolution (N), the underlying frequency resolution (related to the width and shape of the input window) and the frame size or stride between transforms (M).

Note that the window and complex twist may be different for each of the inputs, e.g., microphone inputs to effect appropriate time delay to be used in the mixing down, e.g., beamforming and in the positional inference. Such details are left out for simplicity, and would be understood by those skilled in the art.

In some respects, the method can be made reasonably independent of the transform, provided the frame size (or stride) is known in order to update all processing time constants accordingly. However, for human voice, a suitable degree of frequency resolution to obtain echo, noise and beam separation in the lower voice spectrum is achieved with a transform size of N=128.512 for a sampling rate of 16 kHz, or, N=64.256 for a sampling rate of 8 kHz. This represents a transform frame size or time interval of 8.32 ms. Operation can be achieved for M=N with a marginal improvement due to output gain smoothing achieved if M is reduced, however the computational complexity is directly related to 1/M.

The N complex-valued bins for each of the P inputs, e.g., microphone inputs, are used directly to create a set of positional estimates of spatial probability of activity. This is shown in FIG. 1 as banded spatial feature estimator 105 and in FIG. 2 as step 205. The details and operation of element 105 and step 205 are described in more detail below after a discussion of the downmixing, e.g., by beamforming.

Downmixing, e.g., by Beamforming

The N complex-valued bins for each of the P inputs are combined to make a single frequency domain channel, e.g., using a downmixer, e.g., a beamformer 107. This is shown as beamforming step 207 in method 200. While the invention works with any mixed-down signal, in some embodiments, the downmixer is a beamformer 107 designed to achieve some spatial selectivity towards the desired position. In one embodiment, the beamformer 107 is a linear time invariant process, i.e., a passive beamformer defined in general by a set of complex-valued frequency-dependent gains for each input channel. Longer time extent filtering may be included to create a selective temporal and spatial beamformer. Possible beamforming structures include a real-valued gain and combination of the P signals, for example in the case of two microphones this might be a simple summation or difference. Thus, the term beamforming as used herein means mixing-down, and may include some spatial selectivity.

In some embodiments, the beamformer 107 (and beamforming step 207) can include adaptive tracking of the spatial selectivity over time, in which case the beamformer gains (also called beamformer weights) are updated as appropriate to track some spatial selectivity in the estimated position of the source of interest. In such embodiments, the tracking is sufficiently slow such that the time varying process beamformer 107 can be considered static for time periods of interest. Hence, for simplicity, and for analysis of the short-term system performance, it is sufficient to assume this component is time invariant.

Other possibilities for the downmixer, e.g., beamformer 107 and step 207 include using complex-valued frequency-dependent gains (mixing coefficients) derived for each processing bin. Such a filter may be designed to achieve a certain directivity that is relatively constant or suitably controlled across different frequencies. Generally the downmixer, e.g., beamformer 107 will be designed or adapted to achieve an improvement in the signal to noise ratio of the desired signal, relative to that which would be achieved by any one microphone input signal.

Note that beamforming is a well-studied problem and there are many techniques for achieving a suitable beamformer or linear microphone array process to create the mixed-down, e.g., beamformed signal out of beamformer 107 and step 207.

See such books as Van Trees, H. L., Detection, estimation, and modulation theory: {IV} Optimum Array Processing. 2002, New York: Wiley, and Johnson, D. H. and D. E. Dudgeon, Array Signal Processing: Concepts and Techniques. 1993: Prentice Hall, for a discussion of beamforming.

In one embodiment, the beamforming 207 by beamformer 107 includes the nulling or cancellation of specific signals arriving from one or more known locations of sources undesired signal, such as echo, noise, or other undesired signal. While "nulling" suggest reducing to zero, in this description, "nulling" means reducing the sensitivity; those skilled in the art would understand that "perfect" nulling is not typically achievable in practice. Furthermore, the linear process of the beamformer is only able to null a small number (P−1) of independently located sources. This limitation of the linear beamformer is complemented by the more effective spatial suppression described later as a part of some embodiments of the present invention. The location of spatial response of the microphone array to the expected dominant echo path may be known and relatively constant. As an example, with a portable device having a fixed relative geometry, of microphones and speaker(s), e.g., in a rigid structure, the source of the echo would be known as coming from the speaker(s). In such a case, or where there was an expected and well located noise source, in some embodiments, the beamformer is designed to null, i.e., provide zero or low relative sensitivity to sound arriving from the known location of source(s) of undesired signal.

Embodiments of the present invention can be used in a system or method that includes adaptive tracking of the spatial selectivity over time, e.g., using a beamformer 107 that can be updated as appropriate to track some spatial selectivity in the estimated position of the source of interest. Because such tracking is typically a fairly slow time varying process compared to the time T, for analysis of the system performance it is sufficient to assume each of the beamformer 107 and beamforming 207 is time invariant.

For the example of a two-microphone array, with the desired sound source located broad side to the array, i.e., at the perpendicular bisector, one embodiment uses for beamformer 107 a passive beamformer 107 that determines the simple sum of the two input channels. For the example of a two-microphone may placed on the side of a user's head, one embodiment of beamforming 207 includes introducing a relative delay and differencing of the two input signals from the microphones. This substantially approximates a hypercardioid microphone directionality pattern. In both of these two-microphone examples, the designed mixing of the P microphone inputs to achieve a single intermediary signal has a preferential sensitivity for the desired source.

In some alternate embodiments, the downmixer, e.g., the beamforming 207 of beamformer 107 weights the sets of inputs (as frequency bins) by a set of complex valued weights. In one embodiment, the beamforming weights of beamformer 107 are determined according to maximum-ratio combining (MRC). In another embodiment, the beamformer 107 uses weights determined using zero-forcing. Such methods are well known in the art.

While the embodiments of the invention described herein create a single output channel, and thus a single intermediary signal, those skilled in the art would understand that a generalization of this approach is to run several independent or partially related instances of the herein-described processing to create multiple outputs. Each instance would have a unique associated mix or beam from the input signals from the microphone array, including the possibility that each instance may act on just a single microphone signal. How to so generalize to a system and to a method having multiple output channels would thus be straightforward to one skilled in the art.

Banding to Frequency Bands

Described so far is the creation of two signals in the frequency domain, in the form of frequency bins: the mixed-down, e.g., beamformed signal from the microphone array, and the transformed signal resulting from the combination of all of the echo reference inputs.

For the suppressive section of the presented invention, much of the analysis leading to the calculation of the set of suppression gains requires only a representation of the signal power spectra (or other amplitude measure spectra). In some embodiments, rather than using each frequency bins, pluralities of the bins are combined to form a plurality of B frequency bands. Each band contains a contribution from more than one or more frequency bins, with at least 90% of the bands having contributions from two or more bins, the number of bins non-decreasing with frequency such that higher frequency bands have contribution from more bins than lower frequency bands. FIG. 3B shows the conversion of the N bins to a number B of frequency bands carried out by banding elements 109 and 115, and banding steps 209 and 217. One aspect of the invention is the determination of a set of B suppression gains for the B bands. The determination of the gains incorporates statistical spatial information.

Whilst the raw frequency domain representation data is required for the intermediate signal, as this will be used in the signal synthesis to the time domain, the raw frequency domain coefficients of the echo reference are not required and can be discarded after calculating the power spectra (or other amplitude metric spectra). As described previously, the full set of P frequency domain representations of the microphone inputs is required to infer the spatial properties of the incident audio signal.

In one embodiment, the B bands are centered at frequencies whose separation is monotonically non-decreasing. In some particular embodiments, the band separation is monotonically increasing in a log-like manner. Such a log-like manner is perceptually motivated. In some particular embodiments, they are on a psycho-acoustic scale, that is, the frequency bands are critically spaced, or follow a spacing related by a scale factor to critical spacing.

In one embodiment, the banding of elements 109 and 115, and steps 209 and 217 is designed to simulate the frequency response at a particular location along the basilar membrane in the inner ear of a human. The banding 109, 115, 209, 217 may include a set of linear filters whose bandwidth and spacing are constant on the Equivalent Rectangular Bandwidth (ERB) frequency scale, as defined by Moore, Glasberg and Baer (B. C. J. Moore, B. Glasberg, T. Baer, "A Model for the Prediction of Thresholds, Loudness, and Partial Loudness," J. of the Audio Engineering Society (AES), Volume 45 Issue 4 pp. 224-240; April 1997).

There is much research on which perceptual scale more closely matches human perception and thus would result in improved performance in producing objective loudness measurements that match subjective loudness results, the Bark frequency scale may be employed with reduced performance.

Some skilled in the art believe the ERB frequency scale more closely matches human perception. The Bark frequency scale also may be used with possibly reduced performance. It is the contention of the inventors that the specifics of the perceptual scale is of minor importance to the overall performance of the systems presented herein. As set out in the example embodiments, the number and spacing of the processing bands relative to critical perceptual bands is a design consideration, with recommendations provided herein, however the exact matching or consistency with a developed perceptual model is not a necessary requirement system performance.

Thus, in some embodiments, each of the single channels obtained for the mixed-down, e.g., beamformed input signals and for the reference input is reduced to a set of B spectral power (or other frequency domain amplitude metric), e.g., B such values on a psycho-acoustic scale. Depending on the underlying frequency resolution of the transform, the B bands can be fairly equally spaced on a logarithmic frequency scale. All such log-like banding is called "perceptual banding" herein In some embodiments, each band should have an effective bandwidth of around 0.5 to 2 ERB with one specific embodiment using a bandwidth of 0.7 ERB. In some embodiments, each band has an effective bandwidth of 0.25 to 1 Bark. One specific embodiment uses a bandwidth of 0.5 Bark.

At lower frequencies, the inventors found it useful to keep the minimum band size to cover several frequency bins, as this avoids problems of temporal aliasing and circulant distortion in both time to frequency band—analysis—and frequency-to-time—synthesis—that can occur with transforms such as the short time Fourier transform. It is noted that certain transforms or subbanded filter banks such as the complex quadrature mirror filter, can avoid many of these issues. In addition, the inventors found it advantageous that the characteristic shape and overlap of the banding used for power (or other frequency domain amplitude metric) representation and gain interpolation be relatively smooth.

In some embodiments, the audio was high-pass filtered with a pass-band starting at around 100 Hz. Below this, it was observed that the input, e.g., microphone signals are typically very noisy with a poor signal-to-noise ratio and it becomes increasingly difficult to achieve a perceptual spacing on account of the fixed length N transform.

The bandwidth of a 1 ERB filter is given by $$\mathrm{ERB}(f)=0.108f+24.7.$$

Integrating this and given the first band center at around 100 Hz, the following expression can be used for the band center spacing of 1 ERB:

$$f_C\approx 320e^{0.108b}-250$$

with $f_C(b)$ being in Hz and the band number b in the range 1 to B.

With a N=512 transform at 16 kHz this creates B=30 bands with center frequencies in the range of 100 Hz to 4000 Hz, with the lowest band centered at 100 Hz still having a bandwidth greater than 2 bins.

This particular perceptual banding for elements 109, 115 and steps 209, 217 is suggestive and not meant to limit the invention to such banding. Furthermore, the banding 109, 115 and steps 209, 217 need not be logarithmic or log-like. However for reasons related to the nature of hearing and perception, to achieve computational efficiency, and to improve the stability of statistical estimates across bands, the logarithmic banding is suggested and effective. The logarithmic banding approach significantly reduces complexity and stabilizes the power estimation and associated processing that occur at higher frequencies.

The banding of elements 109, 115 and steps 209, 217 can be achieved with a soft overlap using banding filters, the set of banding filters also called an analysis filterbank. The shape of each banding filter should be designed to minimize the time extent of the time domain filters associated with each band. The banding operation of elements 109, 115 and steps 209, 217 can be represented by a B*N real-valued matrix taking the bin power (or other frequency domain amplitude metric) to the banded power (or other frequency domain amplitude metric). While not necessary, this matrix can be restricted to positive values as this avoids the problem of any negative band powers (or other frequency domain amplitude metric). To reduce the computational load, this matrix should be fairly sparse with bands only dependent on the bins around their center frequency. An optimal filter shape for achieving the compact form in both the frequency and time domain would be a Gaussian. An alternative with the same quadratic main lobe but a faster truncation to zero is a raised cosine. With each band extending to the center of the adjacent bands, the raised cosine also provides a unity gain when the bands are summed. Since the raised cosine becomes sharp for the smaller bands, it is advisable to also include an additional spreading kernel such as [1 2 1]/4 or [1 4 6 4 1]/16 across the frequency bins. This has negligible effect on the wider bands at higher frequency however it provides a softening and thus limits the time spread of the associated band filters at lower frequencies.

Figure 4:
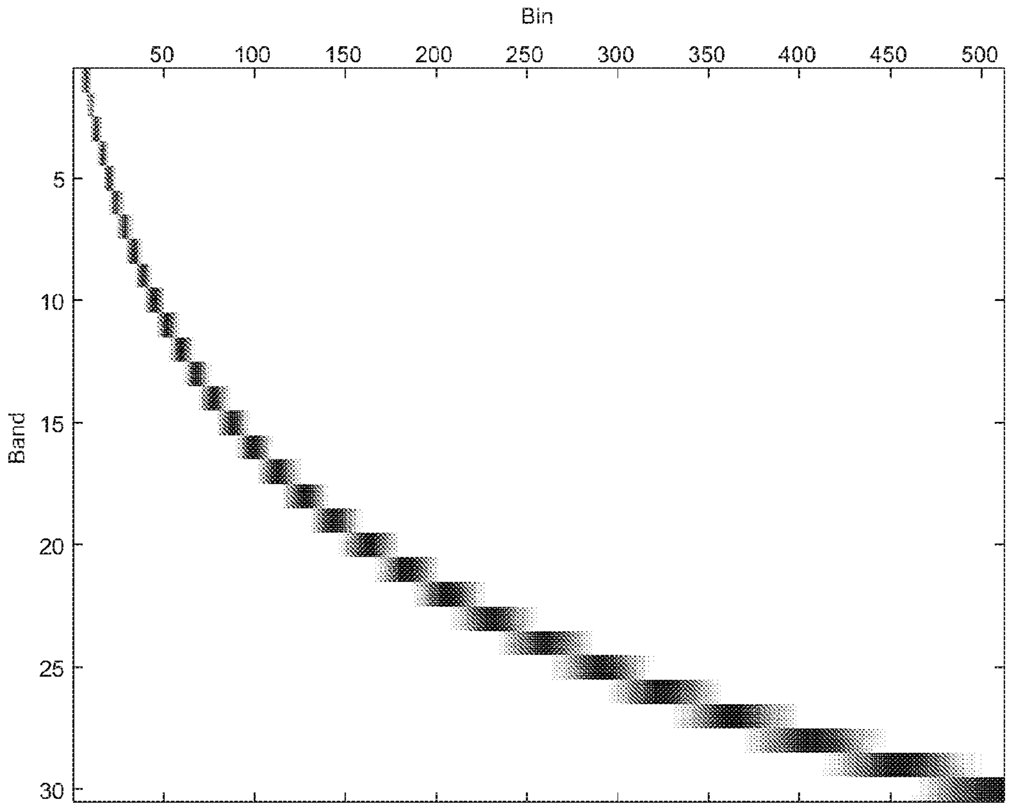
FIG. 4 depicts a two-dimensional plot representation of a banding matrix for banding a set of transform bins in accordance with some embodiments of the invention.

FIG. 4 depicts as a two-dimensional plot the banding matrix for banding a N=512 point complex-valued transform at sampling frequency of 16 kHz into B=30 bands as used in some embodiments of the invention. In such embodiments, this matrix is used to sum the powers (or other frequency domain amplitude metric) from the N bins into the B bands. The transform of this matrix is used to interpolate the B suppression gains into a set of N gains to apply to the transform bins.

Figure 5:
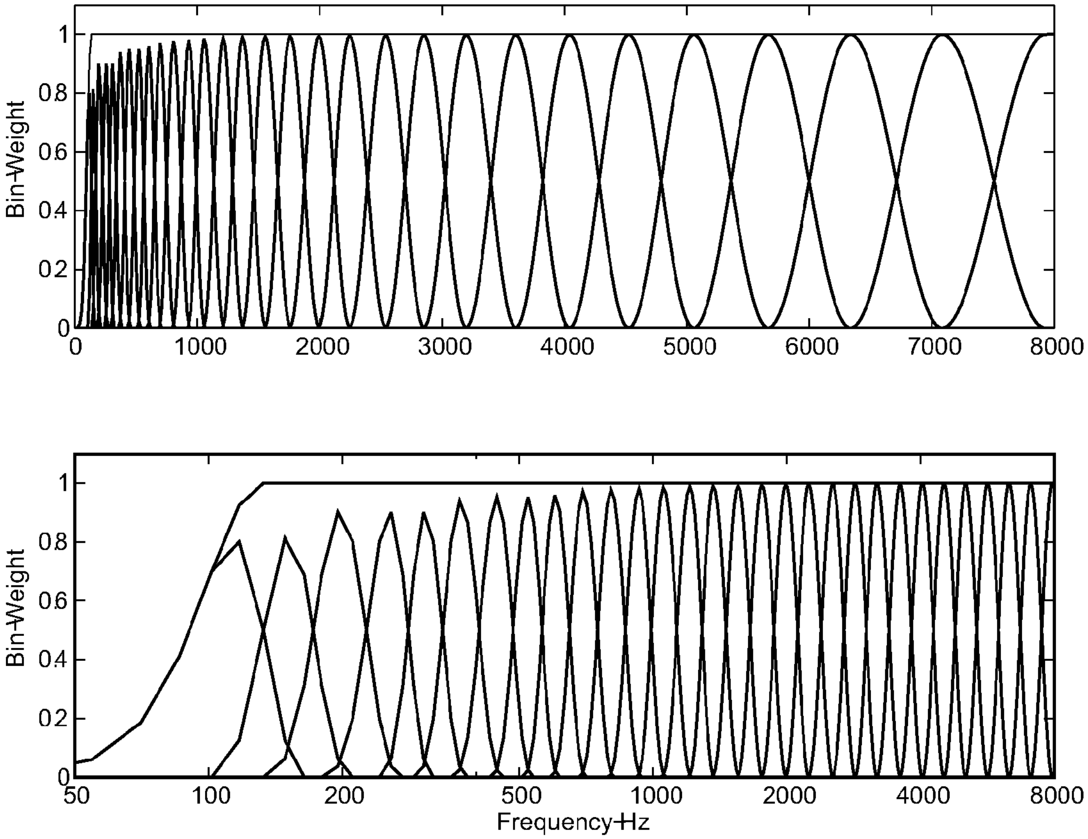
FIG. 5 depicts example shapes of the bands in the frequency domain on both a linear and logarithmic scale. Also shown in FIG. 5 is the sum of example band filters in accordance with some embodiments of the invention.

FIG. 5 depicts example shapes of the B bands in the frequency domain on both a linear and logarithmic scale. It can be seen that the B bands are approximately evenly spaced on the logarithmic scale with the lower bands becoming slightly wider. The term log-like is used for such behavior. Also shown in the FIG. 5 is the sum of example band filters. It can be seen that this has a unity gain across the spectrum with a high pass characteristic having a cut-off frequency around 100 Hz. The high frequency shelf and banding are not essential components of the embodiments presented herein, but are suggested features for use on typical microphone input signals for the case of the signal of interest being a voice input.

Figure 6:
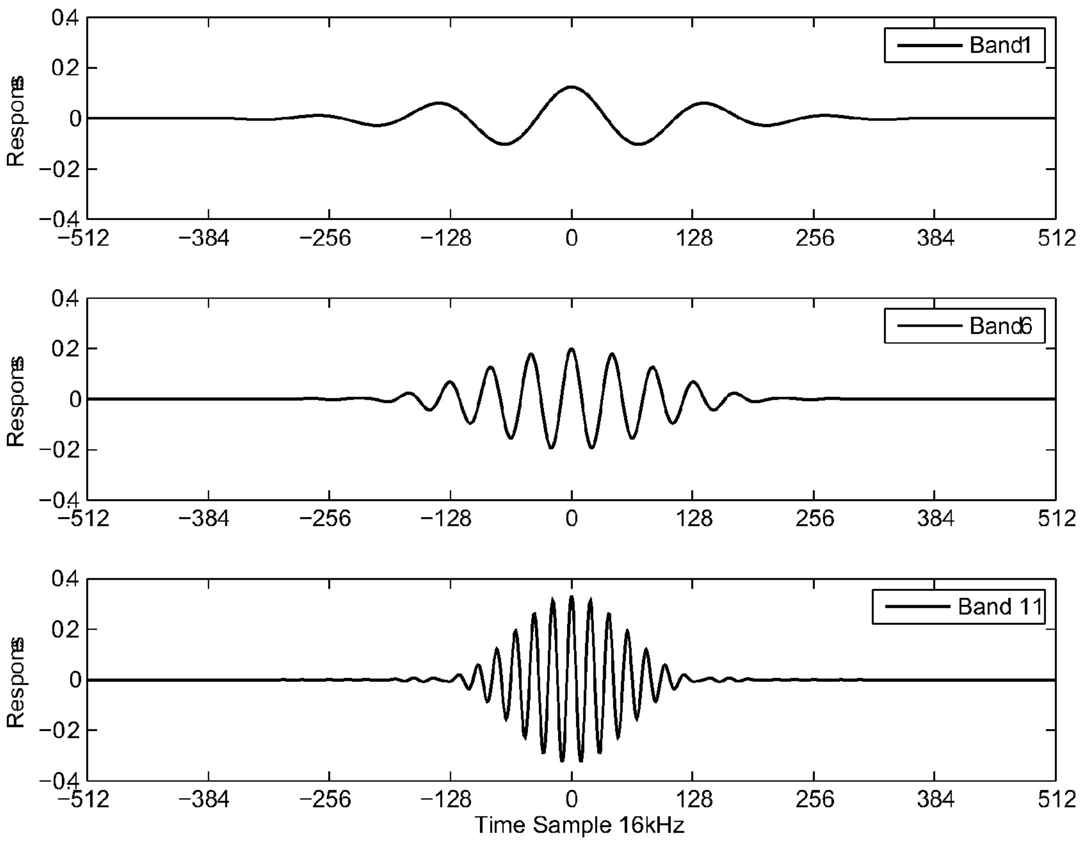
FIG. 6 shows time domain filter representations for several filter bands of example embodiments of banding.

FIG. 6 shows time domain filter representations for several of the filter bands of example embodiments of banding elements 109, 115 and steps 209, 217. In this example embodiment, an additional smoothing kernel [1 2 1]/4 is applied in the construction of the banding matrix coefficients. It can be seen that the filter extent is constrained to the center half of the time window around time zero. This property results by having the filter bands being wider than a single bin and, in this example, the additional smoothing kernel used in the determination of the banding matrix.

While the invention is not limited to such embodiments, the property of constraining the filter extent to the center half of the time window has been found to reduce distortion due to circulant convolution when applying an arbitrary set of gains for the filter bank. This is of particular importance when using the same banding for both determining banded power (or other frequency domain amplitude metric) of signals, and for the operation shown in FIG. 3C of element 131, step 225 of interpolation used in applying the banded gains for the individual frequency bins.

The use of a matched analysis and interpolation for the banded power (or other frequency domain amplitude metric) representation is convenient in an implementation. However, in some embodiments, to achieve different characteristics of finer analysis and smoother applied processing gains across frequency, the analysis and interpolation banding may be different. The inventors have found that constraining the filter extent to the center half of the time window is a particularly advantageous inherent in the banding matrix when used for interpolating the banded processing gains (element 131, step 225) to create binned gains to apply, when using the transform suggested above, or similar short term Fourier transform.

The banding of elements 109, 115 and steps 209, 217 serves several purposes:

By grouping the transform bins, there are less parameters to estimate regarding the signal activity. In one example embodiment, B=30 bands, significantly less than N=512 bins. This is a significant computational saving.

By grouping the transform bins into bands, more data is used to form estimates of each spectral band, which lowers the statistical uncertainty of the estimation process. This is particularly advantageous for determining the spatial probability indicators described herein below.

In some perceptual banding embodiments, psychoacoustic criteria are used for banding, and the resulting banding is related in some aligned or scaled way to the critical hearing bandwidth of a listener. Arguably, controlling the spectrum on a finer resolution than this has little merit, since the perceived activity in each band will be dominated by the strongest source in that band. The strongest source would also dominate the parameter estimation. In this way, appropriate banding of the transform provides a degree of signal estimation and masking which matches inherent psychoacoustic models thus making use of masking in the suppression framework. The spread of the bands on analysis and the gain constraint on output both work to avoid trying to suppress signal that is already masked. Smooth overlap of the bands provides further mechanism that effects a result similar to the computation of gains to achieve noise suppression that would take into account the a psychoacoustic masking effects of the listener.

The banding and the interpolation of the banded suppression gain provides smoothing, so avoids any sharp variations of the resulting gains across frequency that are applied to the N bins in frequency domain. In some embodiments, a constraint can be applied to the banding design to ensure all the time domain filters related to the band filters have a compact form, with length ideally less than N. This design reduces distortion from circulant convolution when the band gains are applied in the transform domain.

Whilst not necessary for the invention, some embodiments include scaling the power (or other metric of the amplitude) in each band to achieve some nominal absolute reference. This has been found useful for suppression in order to facilitate suppression of residual noise to a constant power across frequency value relative to the hearing threshold. One suggested approach for normalization of the bands is to scale such that the 1 kHz band has unity energy gain from the input, and the other bands are scaled such that a noise source having a relative spectrum matching the threshold of hearing would be white or constant power across the bands. In some sense, this is a pre-emphasis filter on the bands prior to analysis which causes a drop in sensitivity in the lower and higher bands. This normalization is useful, since if the residual noise is controlled to be constant across the bands, this achieves a perceptually white noise when close to the hearing threshold. In this sense it provides a way of achieving sufficient but not excessive reduction of the signal by attenuating the bands to achieve a perceptually low or inaudible noise level, rather than just a numeric optimization in each band independent of the audibility of the noise.

An approximation for the average threshold of hearing is $$T_q(f) = 3.64\left(\frac{f}{1000}\right)^{-0.8} - 6.5e^{-0.6(f/1000-3.3)^2} + 10^{-3}\left(\frac{f}{1000}\right)^4,$$

where $T_q$ is the threshold of hearing in dB sound pressure level (SPL) which is approximately 0 dB at 2 kHz. See for example, Terhardt, E., Calculating Virtual Pitch. Hearing Research, vol. 1: pp. 155-182, 1979. By summing the powers from this expression calculated at the appropriate bin frequencies with the band gains previously defined, a set of band powers are obtained which represent the banded spectral shape of the hearing threshold. Using this, a normalization gain can be calculated for each band. Since the hearing threshold increases rapidly at very low frequencies, a sensible limit of around −10 dB . . . −20 dB is suggested for the normalization gain.

Figure 7:
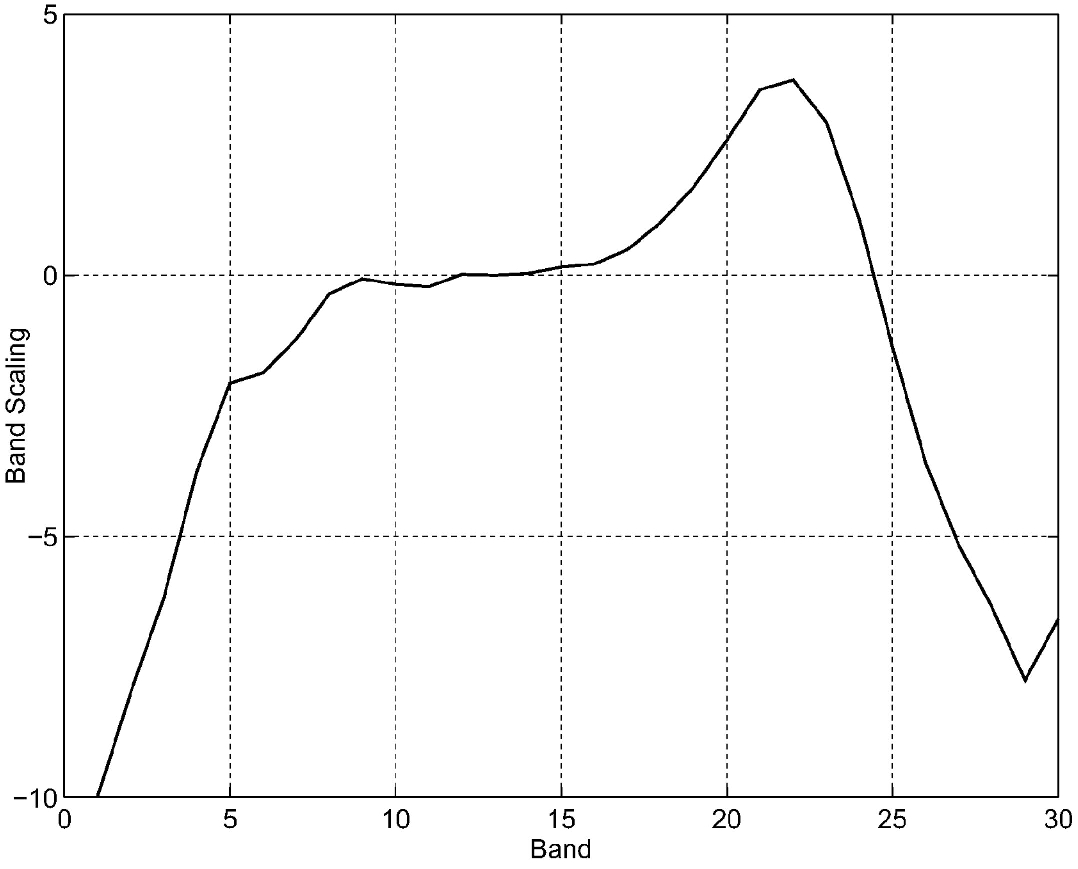
FIG. 7 shows a normalization gain for banding to a plurality of frequency bands in accordance with some embodiments of the invention.

FIG. 7 shows the normalization gain for the banding to 30 bands as described above. Note that the 1 kHz band is band 13 and thus has the 0 dB gain.

Denote by $Y_n$ the frequency bins of the mixed-down, e.g., beamformed signal (combined with noise and echo) of the most recent T-long frame (the current frame) of M samples. The final expression for calculating the banded powers given the transform output (the frequency bins $Y_n$) is, for element 109 carried out in step 209, $$Y'_b = W_b \sum_{n=0}^{N-1} w_{b,n} |Y_n|^2$$

where $Y_b'$ is the banded instantaneous power of the mixed-down, e.g., beamformed signal, $W_b$ is the normalization gain from FIG. 7 and $w_{b,n}$ are the elements from the banding matrix shown in FIGS. 4 and 5.

Similarly, the operation 217 of spectral banding element 115 forms $X_b'$, the banded instantaneous power of the combined reference signal, using the $W_b$ normalization gain and a banding matrix with elements $w_{b,n}$.

Note that when a subscript b is used for a quantity, the quantity is banded in frequency band b. Note also that whenever a prime is used in the banded domain, this is a measure of subband power, or, in general, any metric of the amplitude. Thus, the prime notation can be generalized to any metric based on the frequency domain complex coefficients, in particular, their amplitude. In one alternate embodiment, the 1-norm is used, i.e., the amplitude (also called envelope) of the spectral band is used, and the expression for the instantaneous mixed-down signal spectral amplitude becomes $$Y_b' = W_b \sum_{n=0}^{N-1} w_{b,n}|Y_n|,$$

with a similar expression for the combined instantaneous reference spectral amplitude $X_b'$ In some embodiments, useful metric is obtained by combining the weighted amplitudes across the bins used in a particular band, with exponent p, and then applying a further exponent of 1/q. We shall refer to this as a pq metric, and note that if p=q then this defines a norm on the vector of frequency domain coefficients. By virtue of the weighting matrix $w_{b,n}$, each band has a different metric. The expression for the instantaneous mixed-down signal metric in each band becomes:

$$Y_b' = W_b\left(\sum_{n=0}^{N-1} w_{b,n}|Y_n|^p\right)^{\frac{1}{q}},$$

with a similar expression for the combined instantaneous reference spectral metric $X_b'$.

While in embodiments described herein, the signal power and the signal power spectra are used, i.e., p=2, and q=1, the description, e.g., equations and definitions used herein can be readily modified to use any other pq metric, e.g., to use the amplitude, or some other metric of the amplitude, and how to carry out such modification would be straightforward to one having ordinary skill in the art. Therefore, while the terminology used herein might refer to "power (or other frequency domain amplitude metric)," the equations typically are for power, and how to modify the equations and implementations to any other pq metric would be straightforward to one having ordinary skill in the art.

Note that in the description herein, the explicit notation of the signal in the bin or banded domain may not always be included since it would be evident to one skilled in the art from the context. In general, a signal that that is denoted by a prime and a subscript b is a banded frequency domain amplitude measure. Note also that the banding steps 205, 217 of elements 109, 115 may be further optimized by combining the two gains and noting that the gain matrix is very sparse, and such a modification would be clear to those in the art, and is included in the scope of what is meant by banding herein.

Suppression

At each M-sample frame instant, the goal of the method embodiments and system embodiments includes determining an estimate for the various components of the banded mixed-down audio signal that are included in the total power spectrum (or other amplitude metric spectrum) in that band. These are determined as power spectra (or other amplitude metric spectra). Determination of the components in a frequency band of the beamformed signal $Y_b'$ is described below in more detail.

Additionally, statistical spatial properties, called spatial probability indicators determined by banded spatial feature estimator 105 in step 205, are used to spatially separate a signal into the components originating from the desired location and those not.

The estimations of the spatial probability indicators, and of the components of the overall signal spectra are interrelated.

Note also that the beamformer 107 and beamforming step 207 may provide some degree of spatial selectivity. This may achieve some suppression of out-of-position signal power and some suppression of the noise and echo.

Determining Components in a Frequency Band of the Beamformed Signal $Y_b'$

Figure 8A:
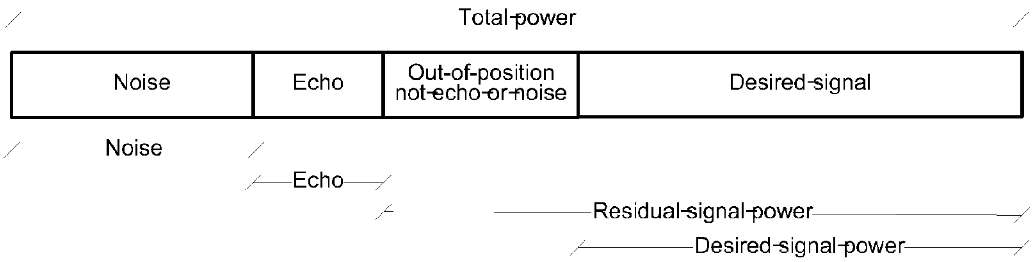
FIG. 8A and FIG. 8B show two decompositions of the signal power (or other frequency domain amplitude metric) in a band eventually to an estimate of the desired signal power (or other frequency domain amplitude metric).
Figure 8B:
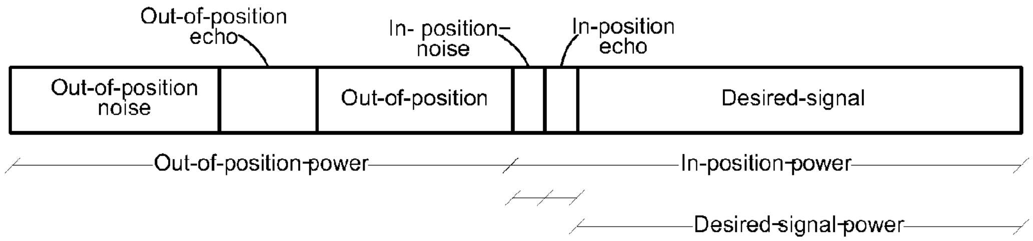

Suppression is carried out by applying a set of frequency dependent gains generally as real coefficients across the N frequency domain coefficients as suggested for embodiments presented herein. The suppression gains are calculated in the banded domain from an analysis of signal features such as the power spectra (or other amplitude metric spectra). Denote by $P_b'$ the total power spectrum (or other amplitude metric spectrum) of the banded mixed-down, e.g., beamformed signal power in band b. FIGS. 8A and 8B show breakdowns of the various components in $P_b'$, and the following is a brief description of the signal components in $P_b'$ with a discussion of assumptions associated with estimating the components in embodiments of the present invention.

- Noise, denoted $N_b'$: $N_b'$ is the power spectra (or other amplitude metric spectra) component which is reasonably constant or without short term flux, where flux, as is commonly understood by one skilled in the art, is a measure of how quickly the power spectrum (or other amplitude metric spectrum) changes over time. ●Echo, denoted $E_b'$ is the power spectra (or other amplitude metric spectra) component which has flux that is reasonably predictable given a short (0.25-0.5 s) time window of the reference signal power spectra (or other amplitude metric spectra).
- Out-of-position power, denoted $Power'_{OutOfBeam}$, also called out-of-beam power and out-of-location power. This is defined to be the power or power spectra (or other amplitude metric spectra) component with flux that does not have an appropriate phase or amplitude mapping on the input microphone signals to be potentially incident from the desired location.
- Desired signal power, denoted $Power'_{Desired}$: This is the remainder of $P_b'$ that is not noise $N_b'$, echo $E_b'$, or $Power'_{OutOfBeam}$.

FIG. 8A and FIG. 8B show two decompositions of the signal power (or other frequency domain amplitude metric) in a band. FIG. 8A shows a separation of the echo power and noise power from power spectrum estimate of the mixed-down, e.g., beamformed signal to residual signal power, and further a separation into the desired in-position signal as a fraction of the residual signal power. FIG. 8B shows a spatial of the total power in a band b into the total in-position power, and the total out-of-position power, and a separation of the total in-position power to an estimate of the desired signal power without an in-position echo power component and an in-position noise power component from the in-position power.

Embodiments of the present invention use the available information used to create some bounds for the estimate of the power in the desired signal, and create a set of band gains accordingly that can be used to affect simultaneous combined suppression.

It is evident from FIGS. 8A and 8B that the desired signal power is 1) bounded from above by the residual power, i.e., the total power $P_b'$ less the noise power $N_b'$ and less the echo power $E_b'$, and 2) bounded from above by the portion of the total power $P_b'$ that is estimated to be in-position, i.e., the part that is not out-of-position power $Power'_{OutOfBeam}$.

Estimating Signal Spectrum $P_b'$ (Element 121, Step 211)

Referring to FIG. 1, signal power (or other frequency domain amplitude metric) estimator 121 generates an estimate of the total signal power (or other metric of amplitude) in each band b. Embodiments of the present invention include determining in element 121, step 211 the overall signal power spectra (or other amplitude metric spectra) and noise power spectra (or other amplitude metric spectra). This is carried out on the mixed-down, e.g., beamformed instantaneous signal power $Y_b'$. Since the downmixing, e.g., beamforming 207 is a linear and time invariant process for the duration of interest, the mapping of the statistic of the noise and echo from the inputs $X_{p,n}$ to the output of the downmixer, e.g., beamformer 107, and ultimately its banded version $Y_b'$ are also time invariant for the duration of interest. Thus it is reasonable to assume that the initial beamformer is a linear and time invariant process over the time of observation used for the estimation of statistics, e.g., the power spectra, and thus the nature of the estimates relative to the underlying signal conditions prior to the beamforming are not changing due to rapid adaption of the beamformer with the signal conditions.

The variance of such an estimate depends on the length of time over which the signal is observed. For longer transform blocks, e.g., N>512 at 16 kHz, the immediate band power (or other frequency domain amplitude metric) suffices. For shorter transform blocks N≤512 at 16 kHz, some additional smoothing or averaging is preferred, although not necessary. Depending on the frame size M, one embodiment determines the power estimate $P_b'$ using a first order filter to smooth the signal power (or other frequency domain amplitude metric) estimate. In one embodiment, $P_b'$, the total power spectrum estimate in band b carried out in estimator 121, step 211 is $$P_b'=\alpha_{P,b}(Y_b'+Y_{min}')+(1-\alpha_{P,b})P_{b_{PREV}}'.$$

where $P_{b_{PREV}}'$ is a previously, e.g., the most recently determined signal power (or other frequency domain amplitude metric) estimate, $\alpha_{P,b}$ is a time signal estimate time constant, and $Y_{min}'$ in is an offset. Alternate embodiments use a different smoothing method, and may not include the offset. A suitable range for the signal estimate time constant $\alpha_{P,b}$ was found to be between 20 to 200 ms. A narrower range of 40 to 120 ms is used in some embodiments. In one embodiment, the offset $Y_{min}'$ in is added to avoid a zero level power spectrum (or other amplitude metric spectrum) estimate. $Y_{min}'$ in can be measured, or can be selected based on a priori knowledge. $Y_{min}'$, for example, can be related to the threshold of hearing or the device noise threshold.

Note that in some embodiments, the instantaneous power (or other frequency domain amplitude metric) $Y_b'$ is a sufficiently accurate estimate of the signal power (or other frequency domain amplitude metric) spectrum $P_b'$, such that element 121 is not used, but is used for $P_b'$. This is particularly true when the banding filters and the frequency bands are chosen according to criteria based on psycho-acoustics, e.g., with the log-like banding as described above. Therefore, in the formulae presented herein in which $P_b'$ is used, some embodiments use $Y_b'$ instead.

Adaptive Echo Prediction Step 221

Method 200 includes step 221 of performing prediction of the echo using adaptively determined echo filter coefficients (see echo spectral prediction filter 117), performing noise spectral estimation using the predicted echo spectral content and the total signal power (see noise estimator 123), updating the voice-activity echo detector (VAD) using the signal spectral content, noise spectral content, and echo spectral content (see element 125), and adapting the echo filter coefficients based on the VAD output and the signal spectral content, noise spectral content, and echo spectral content (see adaptive filter updater 127 that updates the coefficients of filter 117).

Instantaneous Echo Prediction of Element 117 (Part of Step 221)

The echoes are created at the microphones due to the acoustic reproduction of signals related to the one or more reference signals. Suppose there are Q reference signals, e.g., Q=5 for surround sound, and in general Q≥1. The potential source of echoes are typically rendered, e.g., via a set of one or more loudspeakers. In one embodiment, a summer 111 is used to determine a direct sum of the Q rendered reference signals to generate a total reference to be used for echo spectral content prediction for suppression. In one embodiment, such a sum or grouped echo reference may be obtained by a single non-directional microphone having a much greater level of echo and lower level of the desired signal compared to the signals of input microphones. In some configurations, the signals are available in pre-rendering form. For example, the digital signals that are converted to analog then rendered to a set of one or more loudspeakers may be available. An another example, the analog speaker signals may be available. In some embodiments, rather than the rendered signals being used, i.e., the sound waves from speaker(s) being used, the electronic signals, analog or digital are used, and directly summed by a summer 111, in the digital or analog domain to provide M-sample frames of a single real-valued reference signal. The inventors have found that using the signals pre-rendering provides advantages.

Step 213 of method 200 includes the accepting (and summing) of the Q reference signals. Step 215 includes transforming the total reference into frequency bins, e.g., using a time-to-frequency transformer 113 or a processor running transform method instructions. Step 217 includes banding to form B spectral bands of the transformed reference, e.g., using a spectral bander 115 to generate the transform instantaneous power or other metric denoted $X_b'$. This is used to predict the echo spectral content using an adaptive filter.

There are many possibilities for the adaptive filter to predict the echo power spectra (or other amplitude metric spectra) bands. Those in the art will be familiar with adaptive filter theory. See for example, Haykin, S., Adaptive Filter Theory Fourth ed. 2001, New Jersey: Prentice Hall. When adaptive filters are applied in embodiments of the present invention, there may be some complications on account of the banded power spectra (or other amplitude metric spectra) being a positive real-valued signal and thus not zero mean. Since each processing frame represents M samples, the filter length for predicting the spectra will be relatively short (for M=320 at 16 kHz sampling a length of 10 to 20 taps represents 200 to 400 ms which covers most voice echo situations). Thus a simple normalized least mean squares adaptive filter is appropriate. In one embodiment, an additional and sensible constraint is made for the power spectra (or other amplitude metric spectra) prediction by restricting the adaptive filter coefficients to be positive.

By convention, denote by integer l a representation of the number of M input-sample frames in the past. Thus, the present frame is represented by l=0.

In one embodiment, the adaptive filter includes determining the instantaneous echo power spectrum (or other amplitude metric spectrum), denoted $T_b'$ for band b by using an L tap adaptive filter described by $$T'_b = \sum_{l=0}^{L-1} F_{b,l} X'_{b,l},$$

where the present frame is $X_b'=X_{b,0}'$, where $X_{b,0}', \ldots, X_{b,l}', \ldots X_{b,L-1}'$ are the L most recent frames of the (combined) banded reference signal $X_b'$, including the present frame $X_b'=X_{b,0}'$, and where the L filter coefficients for a given band b are denoted by $F_{b,0}, \ldots, F_{b,l}, \ldots F_{b,L-1}$, respectively. These filter coefficients are determined by an adaptive filter coefficient updater 127. The filter coefficients require initialization, and in one embodiment, the coefficients are initialized to 0, and in another, they are initialized to an a priori estimate of the expected echo path. One option is to initialize the coefficients to produce an initial echo power estimate that has a relatively high value—larger than any expected echo path which facilitates an aggressive starting position for echo and avoids the problem of an underestimated echo triggering the VAD and preventing adaption.

Adaptively updating the L filter coefficients uses the signal power (or other frequency domain amplitude metric) spectrum estimate $P_b'$ from the current time frame and the noise power (or other frequency domain amplitude metric) spectrum estimate $N_b'$ from the current time frame. In some embodiments, $Y_b'$ is a reasonably good estimate of $P_b'$, so is used for determining the L filter coefficients rather than $P_b'$ (which in any case is determined from $Y_b'$).

One embodiment includes time smoothing of the instantaneous echo from echo prediction filter 117 to determine the echo spectral estimate $E_b'$. In one embodiment, a first order time smoothing filter is used as follows $$E_b'=T_b' \text{ for } T_b'\geq E_{b_{Prev}}', \text{and}$$

$$E_b'=\alpha_{E,b}T_b'+(1-\alpha_{E,b})E_{b_{Prev}}' \text{ for } T_b'<E_{b_{Prev}}'$$

where $E_{b_{Prev}}'$ is the previously determined echo spectral estimate, e.g., in the most recently, or other previously determined estimate, and $\alpha_{E,b}$ is a first order smoothing time constant. The time constant in one embodiment is not frequency-band-dependent, and in other embodiments is frequency-band dependent. Any value between 0 and 200 ms could work. A suggestion for such time constants ranges from 0 to 200 ms and in one embodiment the inventors used values of 15 to 200 ms as a frequency-dependent time constant embodiments, whilst in another a non-frequency-dependent value of 30 ms was used.

Noise Power (or Other Frequency Domain Amplitude Metric) Spectrum Estimator 123

The noise power spectrum (or other amplitude metric spectrum) denoted $N_b'$ is estimated as the component of the signal which is relatively stationary or slowly varying over time.

Different embodiments of the present invention can use different noise estimation methods, and the inventors have found a leaky minimum follower to be particularly effective.

In many applications a simple noise estimation algorithm can provide appropriate performance. One example of such an algorithm is the minimum statistic. See R. Martin, "Spectral Subtraction Based on Minimum Statistics," in Proc. Euro. Signal Processing Conf. (EUSIPCO), 1994, pp. 1182-1185. Using the minimum statistic (a minimum follower) is appropriate, e.g., when the signal of interest has high flux and drops to zero power in any band of interest reasonably often, as is the case with voice.

Whilst this method is appropriate for simple noise suppression, where the estimation of the signal components involves only the noise and desired signal, the inventors have found that presence of an echo may cause an over-estimation of the noise component. For this reason, one embodiment of the invention includes echo-gated noise estimation: updating the noise estimate $N_b'$, and stopping the update of the noise estimate when the predicted echo level is significant compared with the previous noise estimate. That is, that noise estimator 123 provides an estimate which is gated when the predicted echo spectral content is significant compared to the previously estimated noise spectral content.

A simple minimum follower based on a historical window can be improved. The estimate from such a simple minimum follower can jump suddenly as extreme values of the power enter and exit the historical window. The simple minimum follower approach also consumes significant memory for the historical values of signal power in each band. Rather than having the minimum value over a window, as for example in the above Martin reference, some embodiments of the present invention use a "leaky" minimum follower with a tracking rate defined by at least one minimum follower leak rate parameter. In one embodiment, the "leaky" minimum follower has exponential tracking defined by one minimum follower rate parameter.

Denote by $N_{b_{Prev}}'$ the previous estimate of the noise spectrum $N_b'$. In one embodiment, the noise spectral estimate is determined, e.g., by element 123, and in step 221 by a minimum follower method with exponential growth. In order to avoid possible bias, the minimum follower is gated by the presence of echo comparable to or greater than the previous noise estimate.

In one embodiment, $$N_b'=\min(P_b',(1+\alpha_{N,b})N_{b_{Prev}}') \text{ when } E_b' \text{ is less than } N_{b_{Prev}}'$$

$$N_b'=N_{b_{Prev}}' \text{ otherwise,}$$

where $\alpha_{N,b}$ is a parameter that specifies the rate over time at which the minimum follower can increase to track any increase in the noise.

In one embodiment, the criterion $E_b'$ is less than $N_{b_{Prev}}'$ is if $$E'_b < \frac{N'_{bPrev}}{2},$$

i.e., in the case that the (smoothed) echo spectral estimate $E_b'$ is less than the previous value of $N_b'$ less 3 dB, in which case the noise estimate follows the growth or current power. Otherwise, $N_b'=N_{b_{Prev}}'$, i.e., $N_b'$ is held at the previous value of $N_b'$.

The parameter $\alpha_{N,b}$ is best expressed in terms of the rate over time at which minimum follower will track. That rate can be expressed in dB/sec, which then provides a mechanism for determining the value of $\alpha_{N,b}$. The range is 1 to 30 dB/sec. In one embodiment, a value of 20 dB/sec is used.

In one embodiment, the one or more leak rate parameters of the minimum follower are controlled by the probability of voice being present as determined by voice activity detecting (VAD). If the probability of voice suggests there is a higher probability of voice being present, the leakage is a bit slower, and if there is probability there is not voice, one leaks faster. In one embodiment, a rate of 10 dB/sec is used when there is voice detected, whilst a value of 20 dB/sec is used otherwise. One embodiment of the VAD is as described below for element 125. Other VADs may be used, and as described in more detail further in this description, one aspect of the invention is the inclusion of a plurality of VADs, each controlled by a small set of tuning parameters that separately control sensitivity and selectivity, including spatial selectivity, such parameters tuned according to the suppression elements in which the VAD is used in.

While one embodiment uses a minimum follower for noise estimation, alternate embodiments can use a noise estimator obtained from a mean or temporal average of the input signal powers in a given band. The inventor found the minimum follower to be more effective in eliminating bias and stabilizing the adaption of the echo prediction when compared with other such methods.

Voice Activity Detector (VAD) for Echo Updating 125

In one embodiment, VAD element 125 determines an overall signal activity level denoted S as $$S = \sum_{b=1}^{B} \frac{\max(0, Y'_b - \beta_N N'_b - \beta_E E'_b)}{Y'_b + Y'_{sens}}$$

where $\beta_N$, $\beta_B$>1 are margins for noise end echo, respectively and $Y_{sens}'$ is a settable sensitivity offset. These parameters may in general vary across the bands. The term VAD or voice activity detector is used loosely herein. Technically the measure S is a measure indicative of the number of bands that have a signal (indicated by $Y_b'$) that exceeds the present estimate of noise and echo by pre-defined amounts, indicated by $\beta_N$, $\beta_B$>1. Since the noise estimate is an estimate of the stationary or constant noise power (or other frequency domain amplitude metric) in each band, rather than being a true "voice" activity measure, the measure S is a measure of transient or short time signal flux above the expected noise and echo.

The VAD derived in the echo update voice-activity detector 125 and filter updater 127 serves the specific purpose of controlling the adaptation of the echo prediction. A VAD or detector with this purpose is often referred to as a double talk detector.

In one embodiment, the values of $\beta_N$, $\beta_E$ are between 1 and 4. In a particular embodiment, $\beta_N$, $\beta_E$ are each 2. $Y'_{sens}$ is set to be around expected microphone and system noise level, obtained by experiments on typical components. Alternatively, one can use the threshold of hearing to determine a value for $Y_{sens}$.

Voice activity is detected, e.g., to determine whether or not to update the prediction filter coefficients in echo prediction filter coefficient adapter 127, by a threshold, denoted $S_{thresh}$ in the value of S. In some embodiments a continuous variation in the rate of adaption may be effected with respect to S The operation in the echo update voice activity detector 125 has been found to be a simple yet effective method for voice or local signal activity detection. Since $\beta_N$>1 and $\beta_E$>1, each band must have some immediate signal content greater than the estimate of noise and echo. Typical values for $\beta_N$, $\beta_E$ are around 2. With the suggested values of $\beta_N$, $\beta_E$ of around 2, a signal to noise ratio of at least 3 dB is required for a contribution to the signal level parameter S. If the current signal level is large relative to the noise and echo estimate, the summation term has a maximum of 1 for each band. The sensitivity offset in the denominator of the expression for S prevents S and thus any derived activity detector, such as the VAD 125, from registering at low signal levels. The summation over the B bands for S will thus represent the number of bands that have "significant" local signal. That is a signal not expected from the noise and echo estimates which are assumed to be reasonable once the system converges. In some embodiments, the suggested scaling related to band size and threshold of hearing, as described earlier, creates an effective balancing of the VAD expression with each band having a similar sensitivity and perceptually weighted contribution without tuning VAD parameters separately for each band.

It would be clear to one skilled in the art that by selecting different sets of the parameters $\beta_N$, $\beta_E$, $Y_{sens}$, $S_{thresh}$, that different VADs of different sensitivities to the various components of the overall signal strength may easily be created. As will be discussed below, it is also possible to use spatial information in the VAD for a more location-specific VAD. Such a location-specific VAD is used in some embodiments of gain calculator 129 and in gain calculating step 223.

Echo Prediction Filter Coefficient Adapter, Gated by an Activity Threshold

In one embodiment, the echo filter coefficient updating of updater 127 is gated, with updating occurring when the expected echo is significant compared to the expected noise and current input power, as determined by the VAD 125 and indicated by a low value of local signal activity S.

If the local signal activity level is low, e.g., below the pre-defined threshold $S_{thresh}$, i.e., if S<$S_{thresh}$, then the adaptive filter coefficients are updated as:

$$F_{b,l} = F_{b,l} + \mu \frac{(\max(0, Y'_b - \gamma_N N'_b) - T'_b)X'_{b,l}}{\sum_{l''=0}^{L-1} (X'^2_{b,l''} + X'^2_{sens})} \text{ if } S < S_{thresh},$$

where $\gamma_N$ is a tuning parameter tuned to ensure stability between the noise and echo estimate. A typical value for $\gamma_N$ is 1.4 (+3 dB). A range of values 1 to 4 can be used. μ is a tuning parameter that affects the rate of convergence and stability of the echo estimate. Values between 0 and 1 might be useful in different embodiments. In one embodiment, μ=0.1 independent of the frame size M. $X_{sens}'$ is set to avoid unstable adaptation for small reference signals. In one embodiment $X_{sens}'$ is related to the threshold of hearing. In another embodiment, $X_{sens}'$ is a pre-selected number of dB lower than the reference signal, so is set relative to the expected power (or other frequency domain amplitude metric) of the reference signal, e.g., 30 to 60 dB below the expected power (or other frequency domain amplitude metric) of $X_b'$ in the reference signal. In one embodiment, it is 30 dB below the expected power (or other frequency domain amplitude metric) in the reference signal. The choice of value for $S_{thresh}$ depends on the number of bands. $S_{thresh}$ is between 1 and B, and for one embodiment having 24 bands to 8 kHz, a suitable range was found to be between 2 and 8, with a particular embodiment using a value of 4.

A lower threshold could prevent the adaptive filter from correctly tracking changes in the echo path, as the echo estimate may be lower than the incoming echo and adaption would be prevented. A higher threshold would allow faster initial convergence, however since a significant local signal would be required to cause a detection from the echo prediction control VAD 125, the filter updates will be corrupted during double talk.

In a further embodiment, a band-dependent weighting factor can be introduced into the echo update voice-activity detector 125 such that the individual band contributions based on the instantaneous signal to noise ratio are weighted across frequency for their contribution to the detection of signal activity. In the case of perceptual-based, e.g., log-like banding, for detecting speech activity, the inventors have found it acceptable to have a uniform weighting. However, for specific applications or to enhance sensitivity to certain expected stimulus, a band-dependent weighting function can be introduced.

It has been found that the approach presented here for VAD-based echo filter updating is a very low complexity but effective approach for controlling the adaption and predicting the echo level. The approach was also found to be fairly effective at avoiding bias in the noise and echo estimates caused by the potentially ambiguous joint estimation. The proposed approach effectively deals with the interaction between the noise and the echo estimates and has been found to be robust and effective in a wide range of applications. Even though the approach is somewhat unconventional, in that the noise estimation method and echo prediction methods may not be the most accepted and established methods known, the approach was found to work well, and allows simple but robust techniques to be used in a systematic way to effectively reduce and control any error or bias. The invention, however, is not limited to the particular noise estimation method used or to the particular echo prediction method used.

In order to start the echo tracking, it may be necessary to force the adaptation of the filter values for a number of signal processing intervals, or initialize the filter values to achieve a desired outcome. The signal detection in echo update voice-activity detector 125 assumes that the echo filter 117, has reasonably converged. If the echo prediction underestimates the echo, and in particular when $F_{b,l}=0$ at initialization or after tracking the absence of any echo, the sudden onset of echo that is not well estimated can gate the adaption and thus become stuck. A solution to this problem is to force adaption initially or repeatedly when some reference signal commences, or initialize the echo filter to be the expected of upper bound of the expected echo path.

Note that the echo power spectrum (or other amplitude metric spectrum) is estimated, and this estimate has a resolution in time and frequency as set out by the transform and banding. The echo reference need only be as accurate and have a similar resolution to this representation. This provides some flexibility in the mixing of the Q reference inputs as discussed above. For M=N=256, the inventors found a time variation of around 16-32 ms is tolerable, due to the overlapping time frames, and a frequency variation of around 10% of the signal frequency is tolerable. The inventors also found that there is also a toleration of gain variation of around 3-6 dB due to the suppression rule and suggested values of the echo estimate scaling used in the VAD and suppression formulae.

At this point in the algorithm, we have a current set of estimates, in terms of banded power spectra (or other amplitude metric spectra), for the noise and echo, in addition to a first measure of signal activity above that.

Embodiments without Echo Suppression

Some embodiments of the invention do not include echo suppression, only simultaneous suppression of noise and out-of-location signals. In such embodiments, the same formulae apply, with $E_b'=0$, and also without the echo gating of the noise estimator(s). Furthermore, with respect to FIG. 1, for no echo suppression, the elements involved in generating the echo estimate might not be present, including the reference inputs, elements 111, 113, 115, filter 117, echo update VAD 125 and element 127. Furthermore, with respect to FIG. 2, steps 213, 215, 217, and 221 would not be needed, and step 223 would not involve echo suppression.

Location Information

One aspect of embodiments of the invention is using the input signal data, e.g., input microphone data in the frequency or transform domain from input transformers 103 and transforming step 203 to form estimates of the spatial properties of the sound in each band. This is sometimes referred to as inferring the source direction or location.

Much of the prior art in this area assumes a simple model of ideal point microphones in a free field acoustic environment. Assumptions about the sensitivity and response of the microphones to plane waves and proximate sounds are used in algorithmic design and a priori tuning. It should be appreciated that for many devices and applications, the input signals are not ideal in this way. For example, the array of microphones may be intricately embedded in a device and thus, e.g., may include different microphones with different locations, directivities, and/or responses. Furthermore, the presence of near-field objects, such as the device using the microphones itself, the user's head or other body part that is not in a predictable or fixed in geometry, and so forth, means that the spatial location of an object can only be expressed in terms of the expected signal properties at the array of sound arriving from that desired or other source.

Thus, in embodiments of the present invention, the source position location is not determined, but rather characteristics of the incident audio in terms of a set of signal statistics and properties are determined as a measure of the probability of a source of sound being or not being at a particular location. Embodiments of the present invention include estimating or determining banded spatial features, carried out in the system 100 by banded spatial feature estimator 105, and in method 200 by step 205. Some embodiments of the present invention use an indicator of the probability of the energy in a particular band b having originated from a spatial region of interest. If, for example, there is a high probability in several bands, it is reasonable to infer that is it from a spatial region of interest.

Embodiments of the present invention use spatial information in the form of one or more measures determined from one or more spatial features in a band b that are monotonic with the probability that the particular band b has such energy incident from a spatial region of interest. Such quantities are called spatial probability indicators.

For convenience, the term "position" is used to refer to an expected relationship between the signals at the microphone array. This is best viewed as a "position" in the array manifold that represents all of the possible relationships that may occur between signals from the microphone array given different incident discrete sounds. Whilst there will be a definitive mapping between the "position" of a source in the array manifold, and its physical position, it is noted that the technique and invention herein do not rely in any way on this mapping being known, deterministic or even constant over time.

Referring back to system 100 of FIG. 1, the P sets of N complex values after the microphone input transforms are routed to a processing element for banded positional estimation. In some embodiments, the relative phase and amplitudes of the input microphones in each transform bin can be used to infer some positional information about the dominant source in that frequency bin for the given processing instant. With a single observation of a bin at that processing instant, it is possible to resolve the direction or position of at most P−1 sources, assuming that we know the number of sources. See, for example, Wax, M. and I. Ziskind, *On unique localization of multiple sources by passive sensor arrays*. IEEE Trans. Acoustics, Speech, and Signal Processing, vol. 37, no. 7, pp. 996-1000, 1989. Such classical statistical methods are concerned with the numerical and statistical efficiency of the approach. In this work, an approach is presented that provides a robust solution for the suppressive control of audio signals to achieve good subjective results rather than to optimize simpler objective criteria. In embodiments of the present invention, an estimate is made of a measure monotonic with the probability that energy in a given band at that point time could reasonably have arrived from the desired location, which is represented by a target position in the array manifold. The target position in the array manifold may be based on a priori information and estimates, or it may take advantage of previous online estimates and tracking (or a combination of both). The result of the spatial inference is to create an estimate for a measure of probability, e.g., as an estimated fraction or as an appropriate gain that relates to the estimated amount of signal from the desired location, in that band at that point in time.

In some embodiments, one or more spatial probability indicators are determined in step 205 by banded spatial feature estimator 105, and used for suppression. These one or more spatial probability indicators are one or more measures in a band b that are monotonic with the probability that the particular band b has such energy in a region of interest. The spatial probability indicators are functions of one or more weighted banded covariance matrices of the inputs.

In one embodiment, the one or more spatial probability indicators are functions of one or more banded weighted covariance matrices of the input signals. Given the output of the P input transforms $X_{p,n}$, p=1, . . . , P, with N frequency bins, n=0, . . . , N−1, we construct a set of weighted covariance matrices to correspond by summing the product of the input vector across the P inputs for bin n with its conjugate transpose, and weighting by a banding matrix $W_b$ with elements $w_{b,n}$ $$R'_b = \sum_{n=0}^{N-1} w_{b,n}[X_{1,n} \ \ldots \ X_{P,n}]^H[X_{1,n} \ \ldots \ X_{P,n}].$$

The $w_{b,n}$ provide an indication of how each bin is weighted for contribution to the bands. This creates an estimate of the instantaneous array covariance matrix at a given time and frequency instant. In general, with multi-bin banding, each band contains a contribution from several bins, with the higher frequency bands having more bins. This use of banded covariance has been found to provide a stable estimate of the covariance, such covariance being weighted to the signal content having the most energy.

In some embodiments, the one or more covariance matrices are smoothed over time. In some embodiments, the banding matrix includes time dependent weighting for a weighted moving average, denoted as $W_{b,l}$ with elements $w_{b,n,l}$, where l represents the time frame, so that, over L time frames, $$R'_b = \sum_{n=0}^{N-1} \sum_{l=0}^{L-1} w_{b,n,l}[X_{1,n} \ \ldots \ X_{P,n}]^H[X_{1,n} \ \ldots \ X_{P,n}].$$

In a different embodiment, the smoothing is defined by a frequency dependent time constant ${}^R\alpha_b$:

$$R_b' = {}^R\alpha_b R_b' + (1 - {}^R\alpha_b) R_{b_{Prev}}'.$$

where $R_{b_{Prev}}'$ is a previously determined covariance matrix.

The description herein is provided in detail for the case of two signals, e.g., signals from a microphone array of two microphones. How to generalize to more than two input signals is discussed further below.

In the case of two inputs, P=2, define $$R'_b = \begin{bmatrix} R'_{b11} & R'_{b12} \\ R'_{b21} & R'_{b22} \end{bmatrix},$$

so that each band covariance matrix $R'_b$ is a 2×2 Hermetian positive definite matrix with $R_{b21}' = \overline{R_{b12}'}$, where the overbar is used to indicate the complex conjugate.

In some embodiment, the spatial features include a "ratio" spatial feature, a "phase" spatial feature, and a "coherence" spatial feature. These features are used to determine an out-of-location signal probability indicator, expressed as a suppression gain, and determined using two or more of the spatial features, and a spatially-selective estimate of noise spectral content determined using two or more of the spatial features. In some the embodiments described herein, the three spatial features ratio, phase, and coherence are used, and how to modify these embodiments to include only two of the spatial features would be straightforward to one of ordinary skill in the art.

Denote by the spatial feature "ratio" a quantity that is monotonic with the ratio of the banded magnitudes $$\frac{R'_{b11}}{R'_{b22}}.$$

In one embodiment, a log relationship is used:

$$\mathrm{Ratio}'_b = 10\log_{10}\frac{R'_{b11} + \sigma}{R'_{b22} + \sigma}$$

where σ is a small offset added to avoid singularities. σ can be thought of as the smallest expected value for $R_{b11}'$. In one embodiment, it is the determined, or estimated (a priori) value of the noise power (or other frequency domain amplitude metric) in band b for the microphone and related electronics. That is, the minimum sensitivity of any preprocessing used.

Denote by the spatial feature phase a quantity monotonic with $\tan^{-1} R_{b21}'$.

$$\mathrm{Phase}'_b = \tan^{-1} R_{b21}'.$$

Denote by the spatial feature "coherence" a quantity that is monotonic with $$\frac{R'_{b21}R'_{b12}}{R'_{b11}R'_{b22}}.$$

In some embodiments, related measures of coherence could be used such as $$\frac{2R'_{b21}R'_{b12}}{R'_{b11}R'_{b11}+R'_{b22}R'_{b22}}$$

or values related to the conditioning, rank or eigenvalue spread of the covariance matrix. In one embodiment, the coherence feature is $$\text{Coherence}'_b=\sqrt{\frac{R'_{b21}R'_{b12}+\sigma^2}{R'_{b11}R'_{b22}+\sigma^2}}.$$

with offset σ as defined above.

Note that alternate embodiments may use a logarithmic scale in dB, such as $$\text{Coherence}'_{b|db}=5\log_{10}\frac{R'_{b21}R'_{b12}+\sigma^2}{R'_{b11}R'_{b22}+\sigma^2}.$$

Figure 9A:
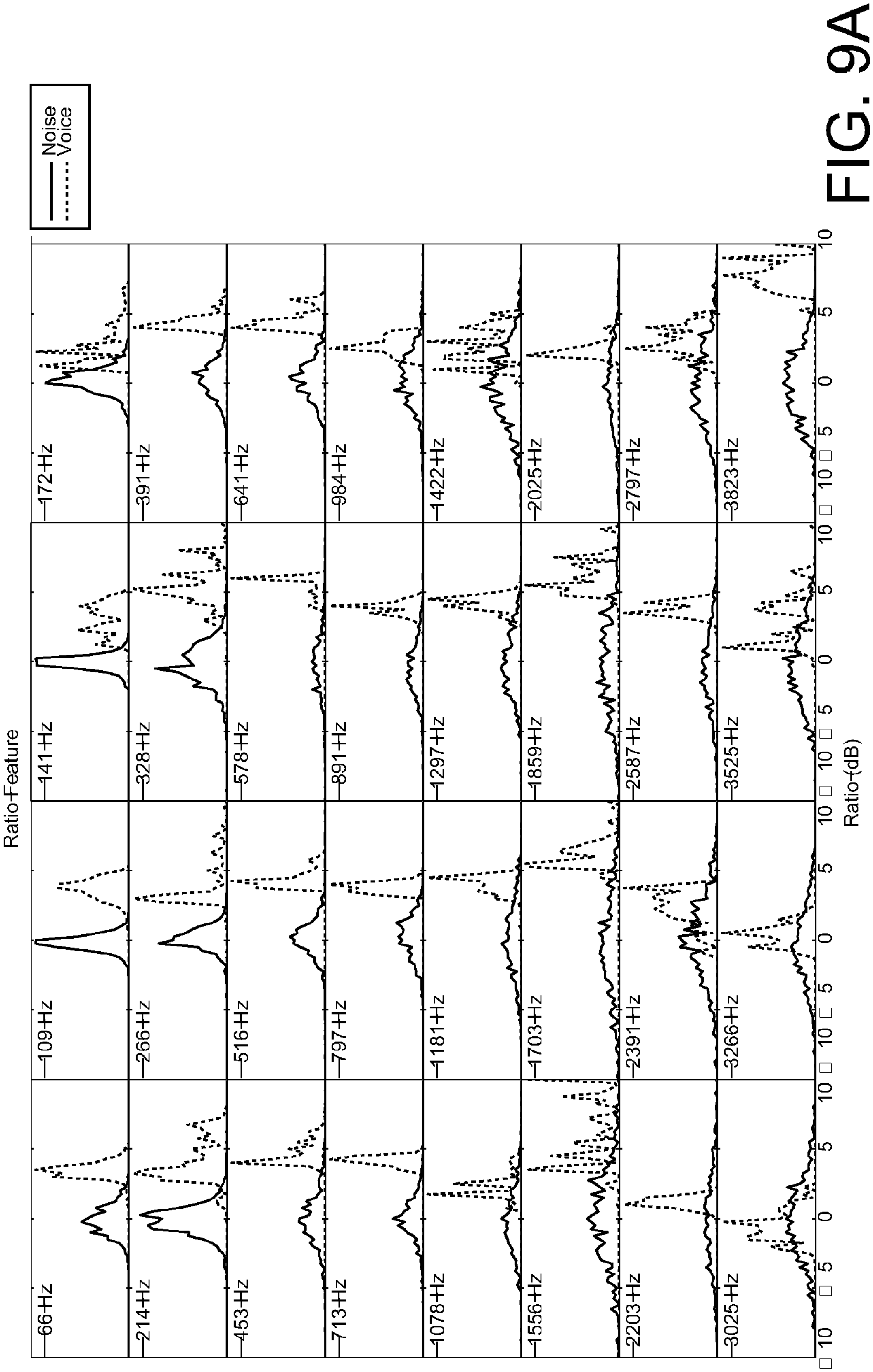
FIGS. 9A, 9B and 9C show the probability density functions over time of the ratio, phase, and coherence spatial features, respectively, for diffuse noise and a voice signal.
Figure 9B:
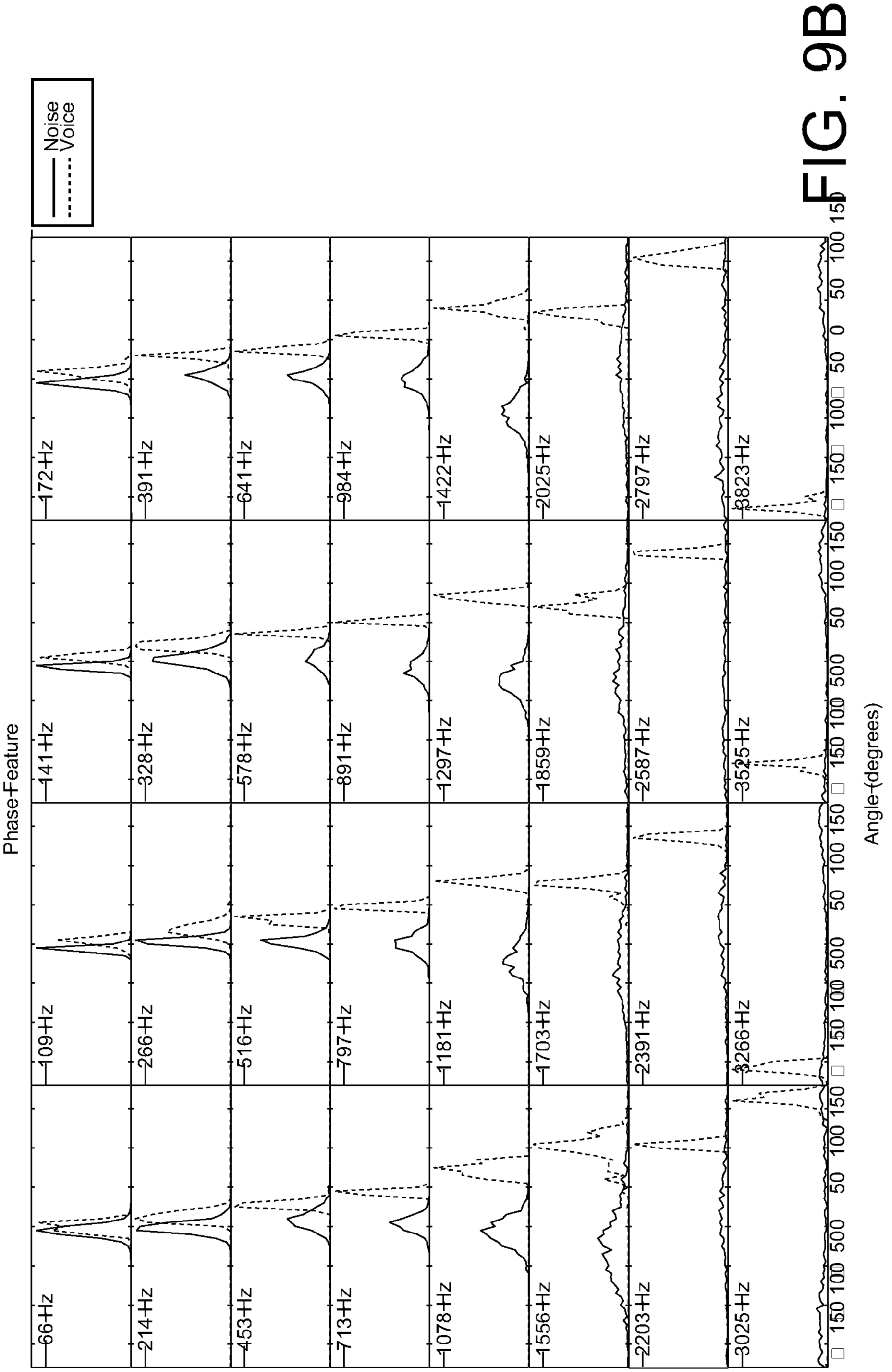
Figure 9C:
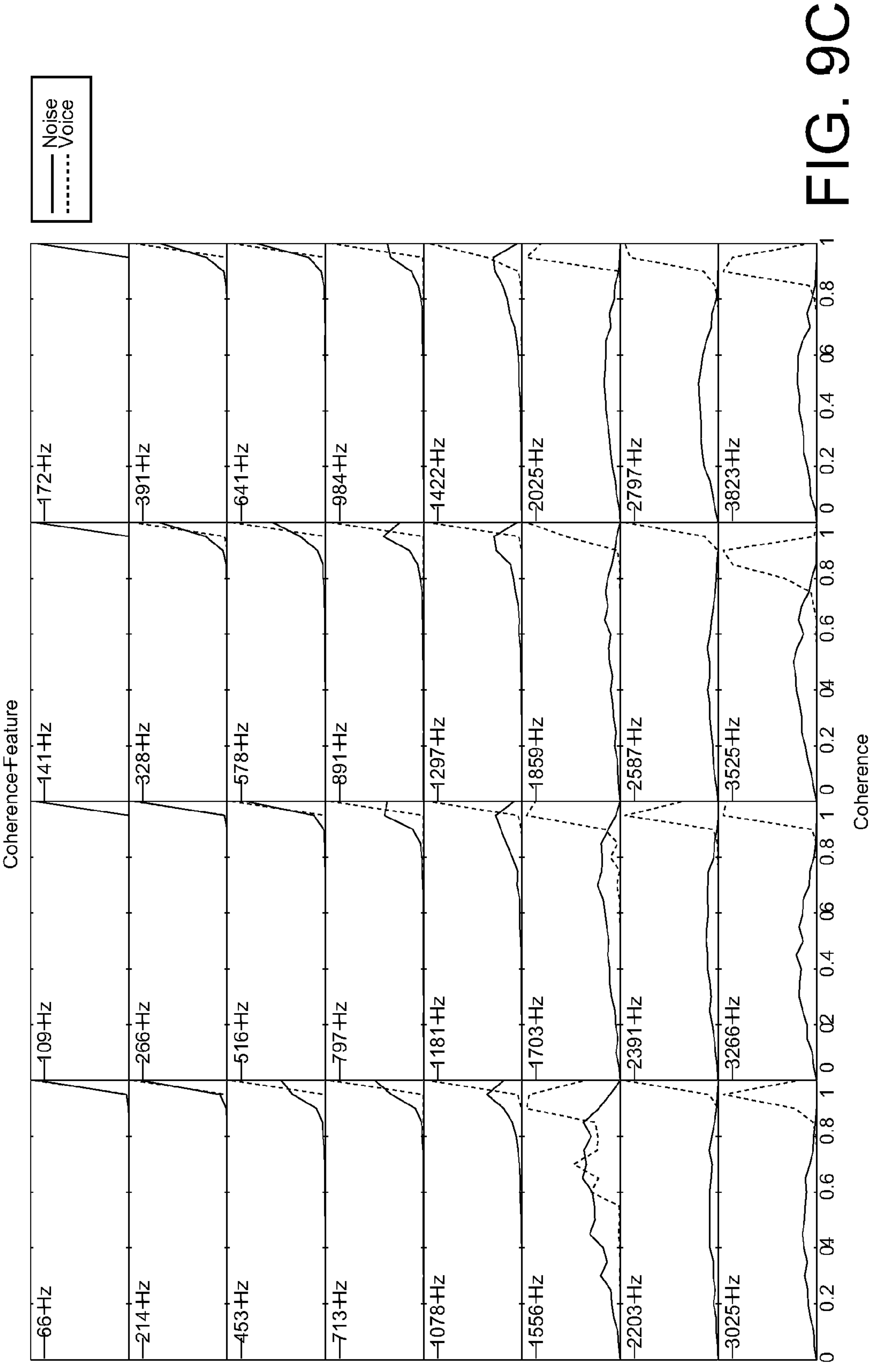

FIGS. 9A, 9B and 9C show the probability density functions over time of the spatial features $\text{Ratio}'_b$, $\text{Phase}'_b$, and $\text{Coherence}'_b$, respectively, for diffuse noise, shown solid, and a desired signal, in this case voice, shown by dotted lines, as calculated for two inputs captured by a two-microphone headset with a microphone spacing of around 50 mm across 32 frequency bands. In this example, the incoming signals were sampled at a sampling rate of 8 kHz, and the 32 bands are on an approximate perceptual scale with center frequencies from 66 Hz to 3.8 kHz. The expected ranges are −10 to +10 dB for $\text{Ratio}'_b$, −180° to 180° for $\text{Phase}'_b$, and 0 to 1 for $\text{Coherence}'_b$. The plots were obtained from around 10 s of the noise and of the desired voice signal, with a frame time interval T of 16 ms. As such, around 600 observations of the feature were accumulated for each distribution plot.

Plots such as shown in FIGS. 9A, 9B and 9C are useful for determining the design of the probability indicators, in that they represent the spread of feature values that would be expected for the desired and undesired signal content.

The noise field is diffuse and can be comprised of multiple sources arriving from different spatial locations. As such, the spatial features $\text{Ratio}'_b$, $\text{Phase}'_b$, and $\text{Coherence}'_b$ for the noise are characteristic of a diffuse or spatially random field. In this example, the noise is assumed to be in the farfield whilst the desired signal—the voice—is in the nearfield, however this is not a requirement for the application of this method. The microphones were matched such that the average ratio feature for the noise field is 0 dB, i.e., a ratio of 1. Noise signals arrive at the two microphones with a relatively constant expected power. For low frequencies the microphone signals would be expected to be correlated due to the longer acoustic wavelength, and the ratio feature for noise is concentrated around 0 dB. However, since there may be multiple sources, in higher frequency bands, the acoustic signal at the microphones can become independent in a diffuse field, and thus a spread in the probability density function of the ratio feature for noise is observed with higher frequency bands. Similarly the phase spatial feature for the diffuse noise field is centered around 0°. However, since the microphones are not in free field, the characteristic of the head and device design create a deviation from the theoretical spaced microphone diffuse field response. Again, at higher frequency bands, the wavelength decreases relative to the microphone spacing and the ratio and phase features for the noise become more distributed as the microphones become independent in the diffuse field.

The signal of interest used for the plots shown in FIGS. 9A-9C was voice originating from the mouth of the wearer of the headset. The mouth was about 80 mm from the nearest microphone. This proximity to the microphones caused a strong bias in the magnitude ratio of signals arriving from the mouth. In this example, the bias is around 3-5 dB. Since there are nearfield objects such as the head and the device body, this feature does not behave in the expected theoretical free field or ideal way. Furthermore, the desired source does not emanate from a single location in space; speech from a human mouth has a complex and even dynamic spatial characteristic. Thus, some embodiments of the invention use suppression not focused on the spatial geometry, but rather the statistical spatial response of the array for the desired source, as reflected by statistics of spatial features. While a simple theoretical model might suggest that the ratio and phase features would assume a single value for the desired source in the absence of noise, as shown in FIGS. 9A-9B, the ratio and phase features exhibit different values and spread in each band. This a priori information is used to determine the appropriate parameters for the probability indicators that are derived from each single observation of the features. This mapping can vary for the specific spatial configuration, desired signal and noise characteristics.

The coherence spatial feature is not dependent on any spatial configuration. Instead, it is a measure of the coherence or the extent to which the signal at that moment is being created by a single dominant source. As can be seen from FIG. 9C, at higher frequencies where the bands cover more frequency bins from the transform, the coherence feature is effective at separating the desired signal (a single voice) from the diffuse and complex noise field.

Spatial Probability Indicators

It can be seen that in at least some of the frequency bands, the distributions of the noise and desired signal (voice) show a degree of separation. From such distributions, one aspect of embodiments of the invention is to use an observation of each of these features in a given band to infer a partial probability of the incident signal being in the desired spatial location. These partial probabilities are referred to as spatial probability indicators herein. In some bands the distributions of a spatial feature for voice and noise are disjoint, and therefore it would be possible to say with a high degree of certainty if the signal in that band is from the desired spatial location. However, there is generally some amount of overlap and thus the potential for noise to appear to have the desired statistical properties at the array, or for the desired signal to present a relationship at the microphone array that would normally be considered noise.

One feature of some embodiments of the invention is that, based on the a priori expected or current estimate of the desired signal features—the target values, e.g., representing spatial location, gathered from statistical data such as represented by the plots shown in FIGS. 9A-9C, or from a priori knowledge, each spatial feature in each band can be used to create a probability indicator for the feature for the band b.

One embodiment of the invention combines two or more of the probability indicators to form a combined single probability indicator used to determine a suppression gain, which, along with the additional information from noise and echo estimation, leads to a stable and effective combined suppression system and method. In some embodiments, the combining works to reduce the over processing and "musical" artifacts that would otherwise occur if each feature was used directly to apply a control or suppression to the signal. That is, one feature of embodiments of the invention is to make an effective combined inference or suppressive gain decision using all information, rather than to achieve a maximum suppression or discrimination from each feature independently.

The probability indicators designed are functions that encompass the expected distribution of the spatial features of the desired signal. The creation or identification of these is based on actual data observation and not rigid spatial geometry models, thus allowing a flexible framework for arbitrarily complex acoustical configurations and robust performance around spatial uncertainties.

While probability densities such as shown in FIGS. 9A-9C could be used to infer a maximum likelihood estimate and associated probability of the signal in that band being in the desired location, some embodiments of the invention include simplifying the distributions to a set of parameters. In some embodiments of the invention, the a priori characterization of the feature distributions for spatial locations is used to infer a centroid, e.g. a mean and an associated width, e.g., variance of the spatial features for sound originating from the desired location. This offers advantages over using detailed a priori knowledge: simplicity, and avoiding the possibility that in practice an over reliance on detailed a priori information can create unexpected results and poor robustness.

In one embodiment, the distributions of the expected spatial features for the desired location are modeled as a Gaussian distributions that present a robust way of capturing the region of interest for probability indicators derived from each spatial feature and band.

Three spatial probability indicators are related to these three spatial features, and are the ratio probability indicator, denoted $RPI'_b$, the phase probability indicator, denoted $PPI'_b$, and the coherence probability indicator, denoted $CPI'_b$, with $$RPI_b'=f_{R_b}(Ratio_b'-Ratio_{target_b})=f_{R_b}(\Delta Ratio_b'),$$

where $\Delta Ratio_b'=Ratio_b'-Ratio_{target_b}$ and $Ratio_{target_b}$ is determined from either prior estimates or experiments on the equipment used, e.g., headsets, e.g., from data such as shown in FIG. 9A.

The function $f_{R_b}$ ($\Delta$Ratio') is a smooth function. In one embodiment, the ratio probability indicator function is $$f_{R_b}(\Delta Ratio')=\exp\left[-\frac{\Delta Ratio_b'}{Width_{Ratio,b}}\right]^2,$$

where $Width_{Ratio,b}$ is a width tuning parameter expressed in log units, e.g., dB. The $Width_{Ratio,b}$ is related to but does not need to be determined from the actual data such as in FIG. 9A. It is set to cover the expected variation of the spatial feature in normal and noisy conditions, but also needs only be as narrow as is required in the context of the overall system to achieve the desired suppression. It is noted that the features presented in the example embodiments herein are nonlinear functions of the covariance matrix, and as such, the expected distribution of the feature values in a mixture of desired signal and noise, is typically not linearly related to the features for each signal separately. The introduction of any noise may cause a bias and variance to the observation of the features for the desired signal. Recognizing this, the target and widths could be selected or tuned to match the expected distributions in likely noise conditions. Generally it should be noted that the width parameter need to be sufficiently large to cover the variation in feature due to variations in geometry as well as the effect of noise corrupting the spatial feature estimation. $Width_{Ratio,b}$ is not necessarily obtained from data such as shown in FIG. 9A. In one embodiment, assuming a Gaussian shape, $Width_{Ratio,b}$ is 1 to 5 dB which may vary with the band frequency.

For the phase probability indicator, $$PPI_b'=f_{P_b}(Phase_b'-Phase_{target_b})=f_{R_b}(\Delta Phase_b'),$$

where $\Delta Phase_b'=Phase_b'-Phase_{target_b}$ and $Phase_{target_b}$ is determined from either prior estimates or experiments on the equipment used, e.g., headsets, obtained, e.g., from data such as shown in FIG. 9B.

The function $f_{P_b}$ ($\Delta$Phase') is a smooth function. In one embodiment, $$f_{R_b}(\Delta Phase_b')=\exp\left[-\frac{\Delta Phase_b'}{Width_{Phase,b}}\right]^2$$

where $Width_{Phase,b}$ is a width tuning parameter expressed in units of phase. In one embodiment, $Width_{Phase,b}$ is related to but does not need to be determined from the actual data such as in FIG. 9B. It is set to cover the expected variation of the spatial feature in normal and noisy conditions, but also needs only be as narrow as is required in the context of the overall system to achieve the desired suppression. It typically needs to be tuned in the context of overall system performance.

In some embodiments, at higher frequencies, the variance of the desired signal spatial features from sample data is a useful indication for the widths. At lower frequencies, the spatial features are typically more stable, and therefore the widths could be narrow. Note however that too narrow a width may be overly aggressive, offering more suppressive ability than may be required at the expense of reduced voice or desired signal quality. Matching the stability and selectivity of the spatial probability indicators is a process of tuning, guided by plots such as those of FIGS. 9A and 9B, to achieve the desired performance. One consideration is the spread of the spatial feature resulting from a mixture of desired signal and noise. In some embodiments, the targets and widths for the ratio and phase features can be derived directly from data such as shown in FIGS. 9A and 9B. In some such embodiments, the targets may be obtained as the mean of the desired signal feature in each band, and the widths obtained from a scaling function of the variance of the same feature. In another embodiment, the targets and widths may be initially derived from data such as shown in FIGS. 9A and 9B and then adjusted as required to achieve a balance of noise reduction and performance.

For the Coherence probability indicator, no target is used, and in one embodiment, $$CPI_b'=\left(\frac{R_{b21}'R_{b12}'+\sigma^2}{R_{b11}'R_{b22}'+\sigma^2}\right)^{CFactor_b}$$

where $\text{CFactor}_b$ is a tuning parameter that may be a constant value in the range of 0.1 to 10; in one embodiment value of 0.25 was found to be effective. In other embodiments, $\text{CFactor}_b$ may dependent on frequency b, and typically have a lower value with increasing frequency b, e.g., with a range of up to 10 at low frequencies and decreasing to value 0 at the upper bands. In one embodiment, a value of about 5 is used for the lowest b, and a value of about 0.25 for the highest b.

Each of the probability indicators has a value between 0 and 1.

In alternate embodiments, allowance is made for the distribution to be asymmetric, e.g., two half Gaussian shapes.

For example, in the case of the ratio probability indicator, suppose there are two widths, $\text{WidthUp}_{Ratio,b}$ and $\text{WidthLow}_{Ratio,b}$. In one embodiment, $$RPI'_b = \exp - \left[\left(\frac{\text{Ratio}'_b - \text{Ratio}_{target_b}}{WidthHigh_{Ratio,b}}\right)^2\right] \text{if } \text{Ratio}'_b > \text{Ratio}_{target_b},$$

and $$RPI'_b = \exp - \left[\left(\frac{\text{Ratio}'_b - \text{Ratio}_{target_b}}{WidthLow_{Ratio,b}}\right)^2\right] \text{if } \text{Ratio}'_b \le \text{Ratio}_{target_b}.$$

Similar modifications can be made for $\text{PPI}_b$. Suppose there are two widths, $\text{WidthUp}_{Phase,b}$ and $\text{WidthDown}_{Phase,b}$. In one embodiment, $$PPI'_b = \exp - \left[\left(\frac{\text{Phase}'_b - \text{Phase}_{target_b}}{WidthHigh_{Ratio,b}}\right)^2\right] \text{if } \text{Phase}'_b > \text{Phase}_{target_b},$$

and $$PPI'_b = \exp - \left[\left(\frac{\text{Phase}'_b - \text{Phase}_{target_b}}{WidthLow_{Phase,b}}\right)^2\right] \text{if } \text{Phase}'_b \le \text{Phase}_{target_b}.$$

The herein described embodiments for the mapping from spatial feature to spatial probability indicators provide several useful examples. It should be evident that a set of curves could be created from any piecewise continuous function. By convention, the inventors chose that there should be at least some point or part of the spatial feature domain where the probability indicator is unity, with the function non-increasing as the distance from this point increases in either direction. For stable noise suppression and improved voice quality, the functions should be continuous and relatively smooth in value and also in the first and higher derivatives. Suggested extensions to the functions presented above include a "flat top" windowed region of the particular spatial feature, and other banded functions such as a raised cosine.

More than Two Microphones

For the general case of more than two input signals, e.g., input signals from an array of more than two microphones, one embodiments includes determining pairwise spatial features and probability indicators for some or all pairs of signals. For example, for three microphones, there are three possible pairwise combinations. Therefore, for the case of determining the ratio, phase, and coherence spatial features, up to nine pairwise spatial features can be obtained, and probability indicators determined for each, and a combined spatial probability indicator determined for the configuration by combining two or more, up to nine spatial probability indicators.

While the embodiments described herein provide simple methods, in general, the signal-of-interest position can be inferred along with such spatial features as a measure of uncertainty based on the coherence of the position across the transform bins associated with the given frequency band. If an assumption is made that the spectra of the sources creating the acoustic field are fairly constant across the transform bins in the frequency band, then each bin can be considered as a separate observation of the same underlying spatial distribution process.

By considering the observations in a band over frequency bin and/or time as an observation of a stationary process, statistical algorithms such as MUSIC (see Stoica, P. and A. Nehorai, "MUSIC, maximum likelihood, and Cramer-Rao bound," IEEE Trans. Acoustics, Speech, and Signal Processing, vol. 37, No. 5, pp. 720-741, 1989.) or ESPRIT (see Roy, R., A. Paulraj, and T. Kailath, "ESPRIT—A subspace rotation approach to estimation of parameters of cisoids in noise," IEEE Trans. Acoustics, Speech, and Signal Processing, vol. 34, no. 5, pp 1340-1342, 1986) can be used to infer the direction of arrivals and distance. See for example, Audone, B. and M. Buzzo Margari, "The use of MUSIC algorithm to characterize emissive sources" Electromagnetic Compatibility, IEEE Transactions on, vol. 43, No. 4, pp. 688-693, 2001. This can provide an alternate approach for mapping the array statistics to spatial location and thus creating alternate spatial probability indicators.

The Gain Calculator 129 and Gain Calculating Step 223.

One feature of embodiments of the invention is the use of statistical spatial information, e.g., the spatial probability indicators to determine suppression gains. The determining of the gains is carried out by a gain calculator 129 in FIG. 1 and step 223 in method 200.

In one embodiment, the gain calculator 129 uses the predicted echo spectral content, the instantaneous banded mixed-down signal power, together with the location probability indicators to implement one or more spatially-selective voice activity detectors, and to determine sets of B suppression probability indicators, in the form of suppression gains for forming a set of B gains for simultaneous noise, echo, and out-of-location signal suppression. The suppression gain for noise (and echo) suppression uses a spatially-selective noise spectral content estimate determined using the location probability indicators.

Beam Gain and Out-of-Beam Gain

One set of B gains is the beam gain, a probability indicator used to determine a suppression probability indicator related to the probability of a signal coming from a source in the desired location or "in beam." Similarly, related to this is a probability or gain for out-of-location signals, expressed in one embodiment as an out-of-beam gain.

In one embodiment, the spatial probability indicators are used to determine what is referred to as the beam gain, a statistical quantity denoted $\text{BeamGain}'_b$ that can be used to estimate the in-beam and out-of-beam power from the total power, and further, can be used to determine the out-of-beam suppression gain. In one embodiment, the beam gain is the product of spatial probability indicators. By convention and in some embodiments as presented herein, the probability indicators are scaled such that the beam gain has a maximum value of 1.

For the case of two inputs, in one embodiment, the beam gain is the product of at least two of the three spatial probability indicators. In one embodiment, the beam gain is the product of all three spatial probability indicators and has a maximum value of 1. Assuming each spatial probability indicator has a maximum value of 1, in one embodiment, the beam gain has a pre-defined minimum value denoted $\text{BeamGain}_{min}$. This minimum serves to avoid the rapid fall of the beam gain to very low values where the variation in the gain value represents largely noise and small variations away from the signal of interest. This approach of creating a floor or minimum of a gain or probability estimate is discussed further below, and used in other parts of embodiments of the invention as a mechanism to reduce the presence of instability and thus musical noise in the individual probability estimators once they represent a departure from the likelihood of the desired signal being present. A suggested approach to implement this lower threshold for the beam gains is:

$$\text{BeamGain}'_b=\text{BeamGain}_{min}+(1-\text{BeamGain}_{min})\,\text{RPI}'_b\cdot\text{PPI}'_b\cdot\text{CPI}'_b.$$

Embodiments of the present invention use $\text{BeamGain}_{min}$ of 0.01 to 0.3 (−40 dB to −10 dB). One embodiment uses a $\text{BeamGain}_{min}$ of 0.1.

While some embodiments of the invention use the product of all three spatial probability indicators as the beam gain, alternate embodiments use one or two of the indicators, i.e., in the general case, the beam gain is monotonic with the product of two or more of the spatial probability indicators.

Furthermore, for more than two inputs, e.g., microphone inputs, one embodiment uses pairwise-determined spatial probability indicators, and in such an embodiment, the beam gain is monotonic with the product of the pairwise-determined spatial probability indicators. The approach presented herein provides a simple method of combining the individual spatial feature probability indicators as a product and applying a lower threshold. The invention, however is not limited to such a combining. Alternative embodiments of combining include one or more of using the maximum, minimum, median, average (on log or linear domain) or, with larger numbers of features with more than two inputs, an approach such as a voting scheme is possible.

The beam gain is used to determine the overall suppression gain as described herein below. The beam gain is also used in some embodiments to estimate the in-beam power (or other frequency domain amplitude metric), that is, the power (or other frequency domain amplitude metric) in a given band b likely to be from the location of interest, and the out-of-beam power—the power (or other frequency domain amplitude metric) in a given band b likely to not be from the location of interest. Note that location, or the general idea of a spatial position and mapping to a particular location on an array manifold, might be at a different angle of arrival, or might be nearfield vs. farfield, and so forth.

As above, denote by $Y_b'$ the total banded power (or other frequency domain amplitude metric) from the mixed-down inputs, i.e., after beamforming. The in-beam and out-of beam powers are:

$$\text{Power}_{b,InBeam}=\text{BeamGain}'^2_b Y_b'$$

$$\text{Power}'_{b,OutOfBeam}=(1-\text{BeamGain}'^2_b)Y_b'.$$

Note that because the $\text{BeamGain}'^2_b$ can be 1, In an alternate embodiment, $$\text{Power}'_{b,OutOfBeam}=(1-\text{BeamGain}'_b)^2 Y_b'.$$

Note that $\text{Power}'_{b,InBeam}$ and $\text{Power}'_{b,OutOfBeam}$ are statistical measures used for suppression.

Out of Beam Power and a Spatially-Selective Noise Estimate

Embodiments of the present invention include determining an estimate of noise spectral content and using the estimate of noise spectral content to determine a noise suppression gain. In noise estimation, noise is usually assumed to be stationary, whereas voice is assumed to have a high flux. A spectrally monotonous voice signal might therefore be interpreted as noise, and should the suppression be based on such a noise estimate, there is a possibility that the voice will eventually be suppressed. It is desired to be less-sensitive to noise-like sounds that come from a location of interest. While some embodiments of the invention use a noise or noise and echo suppression gain that is determined using an estimate of noise spectral content that is not necessarily spatially selective, a feature of some embodiments of the invention is use of the spatial probability indicators to improve the estimate noise power (or other frequency domain amplitude metric) spectral estimate for use to determine suppression gains taking location into account in order to reduce the sensitivity of suppression to noise-like sounds that come from a location of interest. Thus, in some embodiments of the invention, the noise suppression gain is based on a spatially-selective estimate of noise spectral content.

Another feature of some embodiments is the use of the spatial probability indicators to carry out spatially sensitive voice activity detection, which is used in carrying out suppression gains taking location into account.

Note that interpreting voice as noise is not necessarily a disadvantage, e.g., for echo prediction control. Hence, the noise estimate $N_b'$ determined for voice activity detection and for updating the echo prediction filter doe not take location into account (except for any location sensitivity inherent in the initial beamforming).

Figure 10:
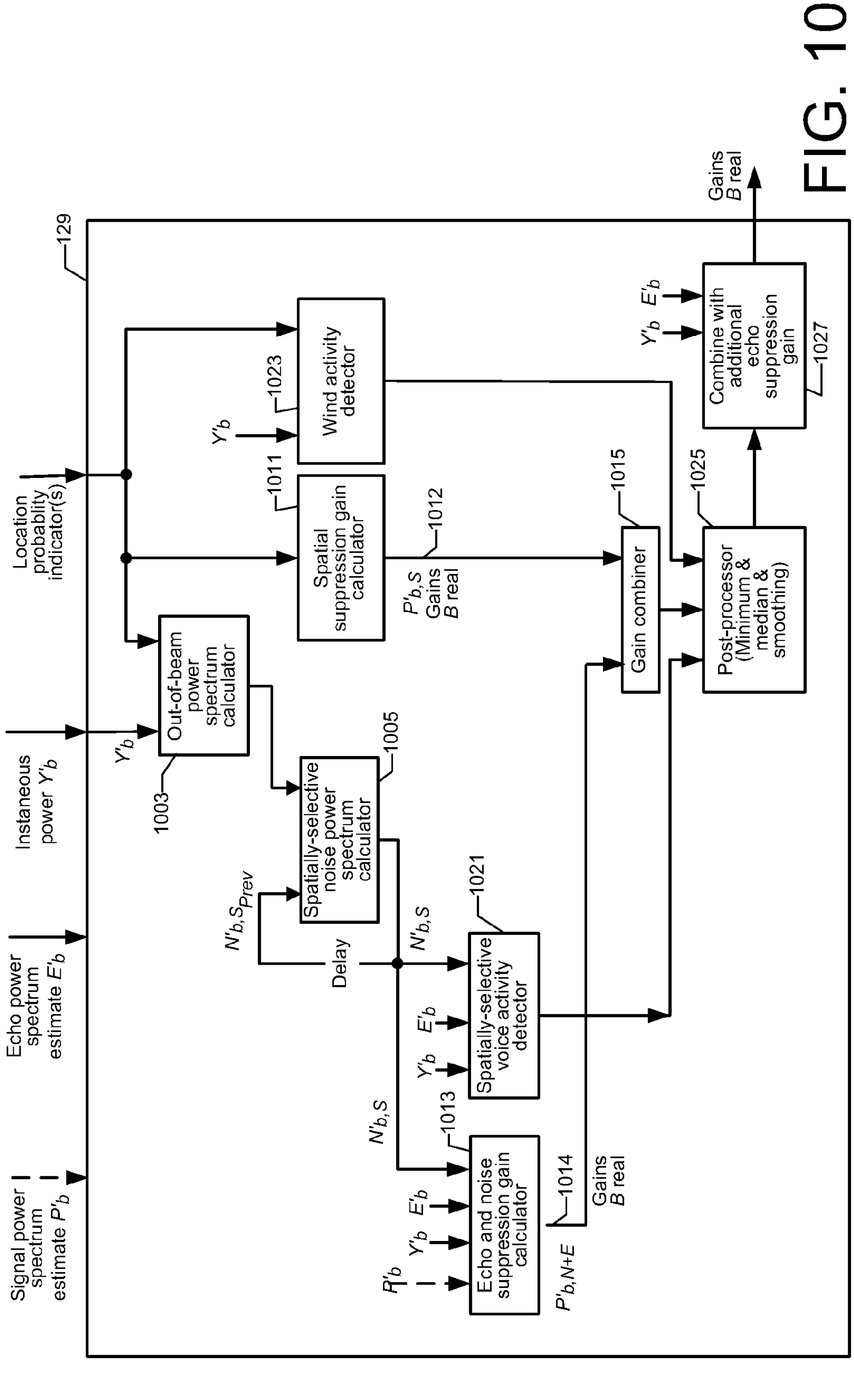
FIG. 10 shows a simplified block diagram of an embodiment of gain calculator 129 of FIG. 1 according to an embodiment of the present invention.

FIG. 10 shows a simplified block diagram of an embodiment of the gain calculator 129 and includes a spatially-selective noise power (or other frequency domain amplitude metric) spectrum calculator 1005 that operates on an estimate of the out-of-beam power, denoted $\text{Power}'_{OutOfBeam}$, generated by an out-of-beam power spectrum calculator 1003.

Figure 11:
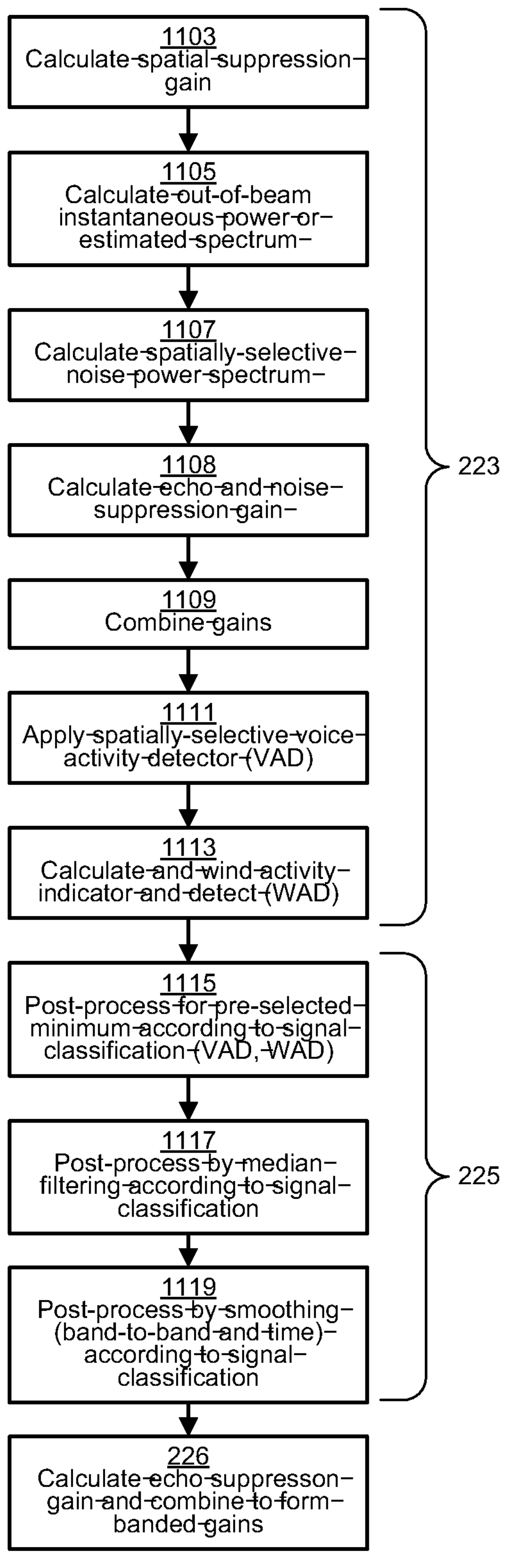
FIG. 11 shows a flowchart of the gain calculation step and the post-processing step of FIG. 2 for those embodiment that include post-processing, together with the optional step of calculating and incorporating an additional echo gain, in accordance with an embodiment of the present invention.

FIG. 11 shows a flowchart of gain calculation step 223, and post-processing step 225 in embodiments that include post-processing, together with the optional step 226 of calculating and incorporating an additional echo gain.

The out-of-beam power spectrum calculator 1003 determines the beam gain $\text{BeamGain}'_b$ from the spatial probability indicators. In one two-input embodiment, as described above, $$\text{BeamGain}'_b=\text{BeamGain}'_{min}+(1-\text{BeamGain}_{min})\,\text{RPI}_b\cdot\text{PPI}_b\cdot\text{CPI}_b.$$

Each of element 1003 and step 1105 determines an estimate of the out-of-beam instantaneous power $\text{Power}'_{b,OutOfBeam}$. In one version, $$\text{Power}'_{b,OutOfBeam}=(1-\text{BeamGain}'^2_b)Y_b'.$$

Note that because the $\text{BeamGain}'^2_b$ can be 1, so that $\text{Power}'_{OutOfBeam}$ can be 0, an improved embodiment ensures that the out-of-beam power is never zero. In embodiments of element 1003 and of step 1105, $$\text{Power}'_{b,OutOfBeam}=[0.1+0.9(1-\text{BeamGain}_b^2)]Y_b'.$$

Of course, alternate embodiments can use a different value for the minimum value of $\text{Power}'_{OutOfBeam}$ and also a different manner of ensuring $\text{Power}'_{OutOfBeam}$ is never 0.

Furthermore, in some embodiments, rather than the instantaneous out-of-beam and in-beam powers being produced from the beam gain and $Y_b'$, the instantaneous banded signal power (or other frequency domain amplitude metric), in other embodiments, the out-of-beam banded spectral estimate and the out-of-beam banded spectral estimate are determined using the signal power (or other frequency domain amplitude metric) spectrum, $P_b'$, rather than $Y_b'$. However, in embodiments, the inventors have found that $Y_b'$ is a good approximation of $P_b'$. The inventors have found that if the spectral banding is sufficiently analytic, e.g., the banding is log-like and perceptually-based, then $Y_b'$ is more or less equal to $P_b'$, and it is not necessary to use the smoothed power estimate $P_b'$.

Each of spatially-selective noise power spectrum calculator 1005 and step 1107 determines an estimate of the noise power spectrum 1006 (or in other embodiments, the spectrum of another metric of the amplitude). One embodiment of the invention uses a leaky minimum follower, with a tracking rate determined by at least one or leak rate parameter. The leak rate parameter need not be the same as for the non-spatially selective noise estimation used in the echo coefficient updating.

Denote by $N'_{b,S}$ the spatially selective noise spectrum estimate 1006. In one embodiment, $$N_{b,S}=\min(\text{Power}_{b,OutOfBeam}',(1+\alpha_b)N_{b,S_{Prev}}'),$$

where $N_{b,S_{Prev}}'$ is the already determined, i.e., previous value of $N'^{b,S}$. The leak rate parameter $\alpha_b$ is expressed in dB/s such that for a frame time denoted T, $$(1+\alpha_b)\frac{1}{T}$$

is between 1.2 and 4 if the probability of voice is low, and 1 if the probability of voice is high. A nominal value of $\alpha_b$ is 3 dB/s such that $$(1+\alpha_b)\frac{1}{T}=1.4.$$

In some embodiments, in order to avoid adding bias to the noise estimate, echo gating is used, i.e., $$N_{b,S}'=\min(\text{Power}_{b,OutOfBeam}',(1+\alpha_b)N_{b,S_{Prev}}') \text{ if } N_{b,S_{Prev}}>2E_b', \text{ else}$$

$$N_{b,S}'=N_{b,S_{Prev}}'.$$

That is, the noise estimate is updated only if the previous noise estimate suggests the noise level is greater, e.g., greater than twice the current echo prediction. Otherwise the echo would bias the noise estimate. In one embodiment, $\text{Power}_{b,OutOfBeam}$ is the instantaneous quantity determined using $Y_b'$, while in another embodiment, the out-of-beam spectral estimate determined from $P_b'$ is used for calculating $N'_{b,S}$.

Furthermore, in some embodiments, the at least one leak rate parameter of the leaky minimum follower used to determine $N'_{b,S}$ are controlled by the probability of voice being present as determined by voice activity detecting.

Noise Suppression (Possibly with Echo Suppression)

One aspect of the invention is simultaneously suppressing: 1) noise based on a spatially selective noise estimate and 2) out-of-beam signals.

In one embodiment, each of an element 1013 of gain calculator 129 and a step 1108 of step 223 calculates a probability indicator, expressed as a gain for the intermediate signal, e.g., the frequency bins 108 based on the spatially selective estimates of the noise power (or other frequency domain amplitude metric) spectrum, and further on the instantaneous banded input power $Y_b'$ in a particular band. For simplicity this probability indicator is referred to as a gain, denoted $\text{Gain}_N$. It should be noted however that this gain $\text{Gain}_N$ is not directly applied, but rather combined with additional gains, i.e., additional probability indicators in a gain combiner 1015 and in a combining gain step 1109 to achieve a single gain to apply to achieve a single suppressive action.

Each of elements 1013 and step 1108 is shown in FIGS. 10 and 11, respectively, with echo suppression, and in some versions does not include echo suppression.

An expression found to be effective in terms of computational complexity and effect is given by $$\text{Gain}_N' = \left(\frac{\max(0, Y_b' - \beta_N' N_{b,S})}{Y_b'}\right)^{GainExp}$$

where $Y_b'$ is the instantaneous banded power (or other frequency domain amplitude metric), $N_{b,S}'$ is the banded spatially-selective (out of beam) noise estimate, and $\beta_N'$ is a scaling parameter, typically in the range of 1 to 4, to allow for error in the noise estimate and to offset the gain curve accordingly. This scaling parameter is similar in purpose and magnitude to the constants used in the VAD function, though it is not necessarily equal to such a VAD scale factor. There may, however, be some benefit to using parameters and structures common to both for signal classification (voice or not) and gain calculation. In one embodiment suitable tuned values were $\beta_N'=1.5$. The parameter GainExp is a control of the aggressiveness or rate of transition of the suppression gain from suppression to transmission. This exponent generally takes a value in the range of 0.25 to 4 with a preferred value in one embodiment being 2.

Adding Echo Suppression

Some embodiments of the invention include not only noise suppression, but simultaneous suppression of echo. Thus, some embodiments of the invention include simultaneously suppressing: 1) noise based on a spatially selective noise estimate, 2) echoes, and 3) out-of-beam signals.

In some embodiments of gain calculator 129, element 1013 includes echo suppression, and in some embodiments of step 223, step 1108 include echo suppression. In some such embodiments of gain calculator 129 and step 223, the probability indicator for suppressing echoes is expressed as a gain denoted $\text{Gain}_{b,N+E}'$. The above noise suppression gain expression, in the case of also including echo suppression, becomes $$\text{Gain}_{b,N+E}' = \left(\frac{\max(0, Y_b' - \beta_N' N_{b,S}' - \beta_E' E_b')}{Y_b'}\right)^{GainExp_b} \quad (\text{“Gain 1”})$$

where $Y_b'$ is again the instantaneous banded power, $N_{b,S}'$, $E_b'$ are the banded spatially-selective noise and banded echo estimates, and $\beta_N'$, $\beta_E'$ are scaling parameters in the range of 1 to 4, to allow for error in the noise and echo estimates and to offset the gain curve accordingly. Again, they are similar in purpose and magnitude to the constants used in the VAD function, though they are not necessarily the same value. However, there may be some benefit to using parameters and structures common to both for signal classification and gain calculation. In one embodiment suitable tuned values are $\beta_N'=1.5$, $\beta_E'=1.4$. As in the case for only noise suppression, the value $\text{GainExp}_b$ in expression Gain 1 is a control of the aggressiveness or rate of transition of the suppression gain from suppression to transmission. This exponent would generally take a value in the range of 0.25 to 4 with a preferred value for one embodiment being 2 for all values of b.

In the remainder of the section on suppression, echo suppression is included. However, it should be understood that some embodiments of the invention do not include echo suppression, only simultaneous suppression of noise and out-of-location signals. In such embodiments, the same formulae apply, with $E_b'=0$, and also without the echo gating of the noise estimator(s). Furthermore, with respect to FIG. 1, for no echo suppression, the elements involved in generating the echo estimate might not be present, including the reference inputs, elements 111, 113, 115, filter 117, echo update VAD 125 and element 127. Furthermore, with respect to FIG. 2, steps 213, 215, 217, and 221 would not be needed, and step 223 would not involve echo suppression.

Returning to expression Gain 1 for $\text{Gain}_{b,N+E}'$ applicable to simultaneous noise and echo suppression, this expression Gain 1 may be recognized to be similar to the well known and used minimum mean squared error (MMSE) criteria for spectral subtraction, in which case the exponent would be $\text{GainExp}_b=0.5$ for all b to create the gain. The present invention is broader, and in embodiments of the present invention, value of the $\text{GainExp}_b$ larger than 0.5 is found to be preferable in creating a transition region between suppression and transmission that is more removed from the region of expected noise power activity and variation. As described herein below, in some embodiments, the gain expressions achieve a relatively flat, or even inverted gain relationship with input power in the region of expected noise power—and the inventors consider this an inventive step in the design of the gain functions that significantly reduces instability of the suppression during noise activity.

Using the Power Spectrum Rather than the Instantaneous Banded Power

Several of the expressions for $\text{Gain}_{N+E}'$ described herein for embodiments of element 1013 and 1108 have the instantaneous banded input power (or other frequency domain amplitude metric) $Y_b'$ in both the numerator and denominator. This works well when the banding is properly designed as described herein, with log-like or perceptually spaced frequency bands. In alternate embodiments of the invention, the denominator uses the estimated banded power spectrum (or other amplitude metric spectrum) $P_b'$, so that the above expression for $\text{Gain}_{b,N+E}'$ changes to:

$$\text{Gain}_{b,N+E}' = \left(\frac{\max(0, Y_b' - \beta_N' N_{b,S}' - \beta_E' E_b')}{P_b'}\right)^{GainExp}. \qquad (\text{"Gain } 1_{MOD}\text{"})$$

Smoothing the Gain Curves

It can be seen that for the above expressions Gain 1 and Gain $1_{MOD}$ for $\text{Gain}_{b,N+E}'$, there is at least one set of values in which the gain might become zero as the input signal power decreases below 1.4 to 1.5 times the echo or noise power. At this point the signal to noise ratio is around −3 dB. The abrupt transition to zero gain at this value (or any value) of input signal power or inferred signal to noise ratio might be undesirable, as it creates an expansion in the signal dynamics at that point, meaning that small changes in incoming signal power could lead to large changes in gain and thus fluctuation and instability at the output after application of the suppression gain(s).

One feature of some embodiments of the invention is significantly reducing this problem.

Figure 12:
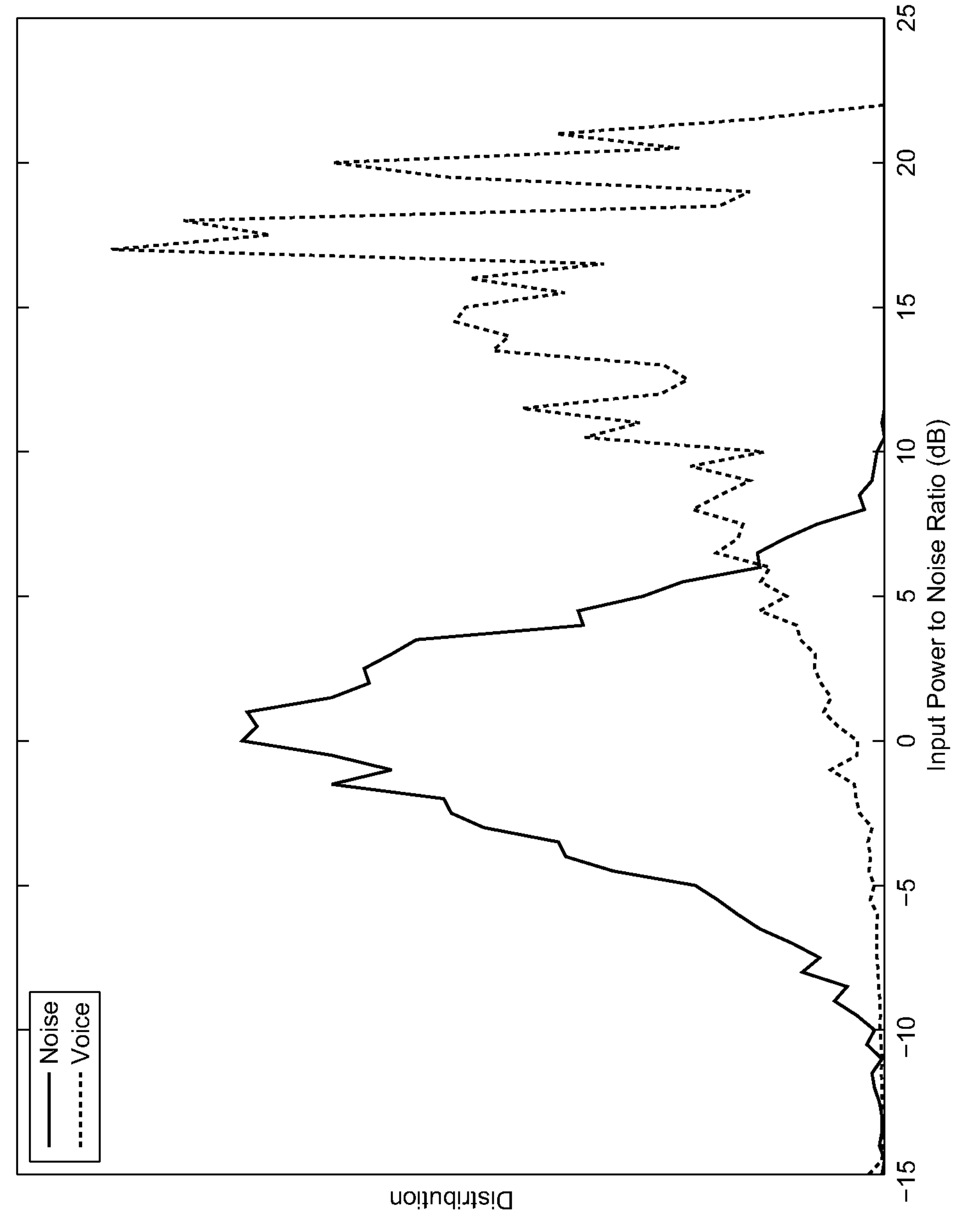
FIG. 12 shows a probability density function in the form of a scaled histogram of signal power in a given band for the case of noise signal and voice signal.

For clarity of the presentation, we first present an example probability density, e.g., a histogram of the expected power in a particular sub-band that would be expected in typical operating conditions. FIG. 12 shows a probability density in the form of a scaled histogram of signal power in a given band for the case of noise (solid line) and desired (voice) signal (broken line) in isolation obtained from observing around 10 s of each signal class for a single band of around 1 kHz where the noise and voice level correspond to an average signal to noise level of around 0 dB. The values are illustrative and not restrictive and it should be evident that this figure serves to capture the characteristics of the suppression gain calculation problem in order to demonstrate the desired properties and specific designs of some embodiments of such calculations. The horizontal axes represent a scaled value of the instantaneous band power relative to the expected noise (and echo) power. This is effectively the ratio of input power to noise, which is related but slightly different to the more commonly used signal to noise ratio.

Note that in any implementation, some lower limit must be placed on the noise and/or echo estimate such that the ratio of input signal power to noise remains bounded. The value of this limit is not material, provided it is sufficiently small, since the probability indicators, expressed herein as gain functions, are asymptotically unity for large ratios of input power to expected noise. The representation of gain vs. input power described herein is preferred to a more conventional representation in terms of gain vs. signal to noise ratio, as it better demonstrates the natural distribution of power in the different signal classes, and serves to highlight the design and benefits of using the gain expressions described herein.

In the following discussion the expression "expected noise and echo power" is used to refer to the sum of the expected noise power and expected echo power at that time. At any specific time in a band, there could be either echo or noise or both signals present in any proportion.

Referring to FIG. 12, the noise signal shows a spread of observed instantaneous input signal powers centered around the noise estimate and having an approximate range of ±10 dB. The desired signal, in this case of voice, has a higher instantaneous power having a larger range and generally having an instantaneous power in the range of 5-20 dB more than the noise when there is active voice. The data was representative of an incident signal at the microphone where the ratio of the average voice signal and noise signal power was 0 dB. However, since a voice signal is typically very non-stationary; the times and bands when speech is present show a higher signal level than the 0 dB average would suggest.

Ideally, any suppression gain should attenuate the noise components by a constant, and transmit the speech with unity gain. As can be seen in the example of FIG. 12, the distributions of the desired signal and noise are not disjoint. However, the design criteria for suppression used work to ensure relatively stable gain across the most probable speech levels and the most probable noise levels in order to avoid artifacts being introduced. To the inventor's knowledge, this is a new non-obvious inventive way of posing, visualizing and achieving a superior performing outcome for the suppression system. Many prior art approaches are concerned with minimizing the numerical error in each bin or band against the original reference, which can lead to unstable gains and musical artifacts common in other solutions. One feature of embodiments of the invention is the specification of the suppression gains for each band in the form of properties of the gain functions. The constant or smooth gains across both the voice and noise power distribution modes ensures processing and musical noise musical artifacts are significantly reduced. The inventors have found also that the methods presented herein can reduce the reliance on accurate estimates for the noise and echo levels.

Two simple modifications of the above presented gain function for suppression based on echo and noise power are presented as additional embodiments. The first uses a minimum threshold for the gain to prevent significant variation in gain around the expected noise/echo power, e.g., $$\text{Gain}'_{b,N+E} = \max\left(0.1, \left(\frac{\max(0, Y'_b - \beta'_N N'_{b,S} - \beta'_E E'_b)}{Y_b}\right)^{GainExp_b}\right)$$

where the minimum value selected, 0.1, is not meant to be limiting, and can be different in different embodiments. The inventors suggest a range of from 0.001 to 0.3 (−60 dB to −10 dB), and the minimum can be frequency dependent.

The second uses a softer additive minimum which achieves both a flatter gain around the expected noise/echo power and also a smoother transition and first derivative, e.g., $$\text{Gain}'_{b,N+E} = 0.1 + 0.9\left(\frac{\max(0, Y'_b - \beta'_N N'_{b,S} - \beta'_E E'_b)}{Y'_b}\right)^{GainExp_b} \quad \text{("Gain 2")}$$

where the minimum value selected, 0.1, is not meant to be limiting, and can be different in different embodiments. The inventors suggest a range of from 0.001 to 0.3 (−60 dB to −10 dB), and the minimum can be frequency dependent. The second value is sensibly 1 minus the first value.

A modified example uses $$\text{Gain}'_{b,N+E} = 0.1 + 0.9\left(\frac{\max\left(0, (Y'_b)^{\eta_{1_b}} - \beta'_N (N'_{b,S})^{\eta_{2_b}} - \beta'_E E_b'^{\eta_{3_b}}\right)}{Y'_b}\right)^{\frac{1}{\eta_b}}$$

where the exponents $\eta_{1_b}$, $\eta_{2_b}$, and $\eta_{3_b}$ are individual tuning parameters, and $$\frac{1}{\eta_b}$$

is the gain expression exponent, also a tuning parameter.

Yet another example uses a different approach, being a function of the input signal power to noise ratio more directly.

$$\text{Gain}'_{b,N+E} = 0.1 + 0.01\left(\frac{Y'_b}{N'_{b,S} + E'_b}\right)^{GainExp'_b} \quad \text{("Gain 3")}$$

where GainExp'$_b$ is a parameter usable to control the aggressiveness of the transition from suppression to transmission and may take values ranging from 0.5 to 4 with a preferred value in one embodiment being 1.5. The first two values, shown here as 0.1 and 0.01 are adjusted to achieve the required minimum gain value and transition period. The minimum value shown, 0.1, is not meant to be limiting, and can be different in different embodiments. The scalar 0.01 is set to achieve an attenuation of around 8 dB with the input power at the expected noise and echo level. Again, different values can be used in different embodiments.

It is evident that the examples above are computationally efficient. The desire is to use a smooth function. One suitable smooth function is a sigmoid function, and the expressions above for Gain$_{b,N+E}$' can be thought of as approximations of a sigmoid type function.

A fifth example presents a generalization of this using the well known logistic function indexed against the underlying parameter of interest (the input signal power to expected noise ratio). In this fifth example, $$\text{Gain}'_{b,N+E} = 10\,\frac{-1}{1 + \exp\left(0.4\log_{10}\left(\frac{Y'_b}{N'_{b,S} + E'_b}\right)\right)}. \quad \text{("Gain 4")}$$

It would be clear to one skilled in the art that there are computational simplifications for the sigmoid function, and alternate embodiments using such implications are meant to be within the scope of the invention.

These functions have a set of similar and desirable properties described briefly above and detailed below. These expressions all achieve the desired properties without being tied to the specific domain representation of input power to expected noise, and in all but Gain 4, without the specific sigmoid function. It is noted that the specific equation is not critical, however all the presented embodiments share the properties of being relatively constant in the regions of the mode or most probable input signal powers that would occur during speech or noise. For simplicity these three functions are presented with a minimum gain of 0.1 or −20 dB. It should be evident that this parameter can be adjusted to suit different applications, with a suggested range of values for the minimum being in the range −60 dB to −5 dB.

Figure 13:
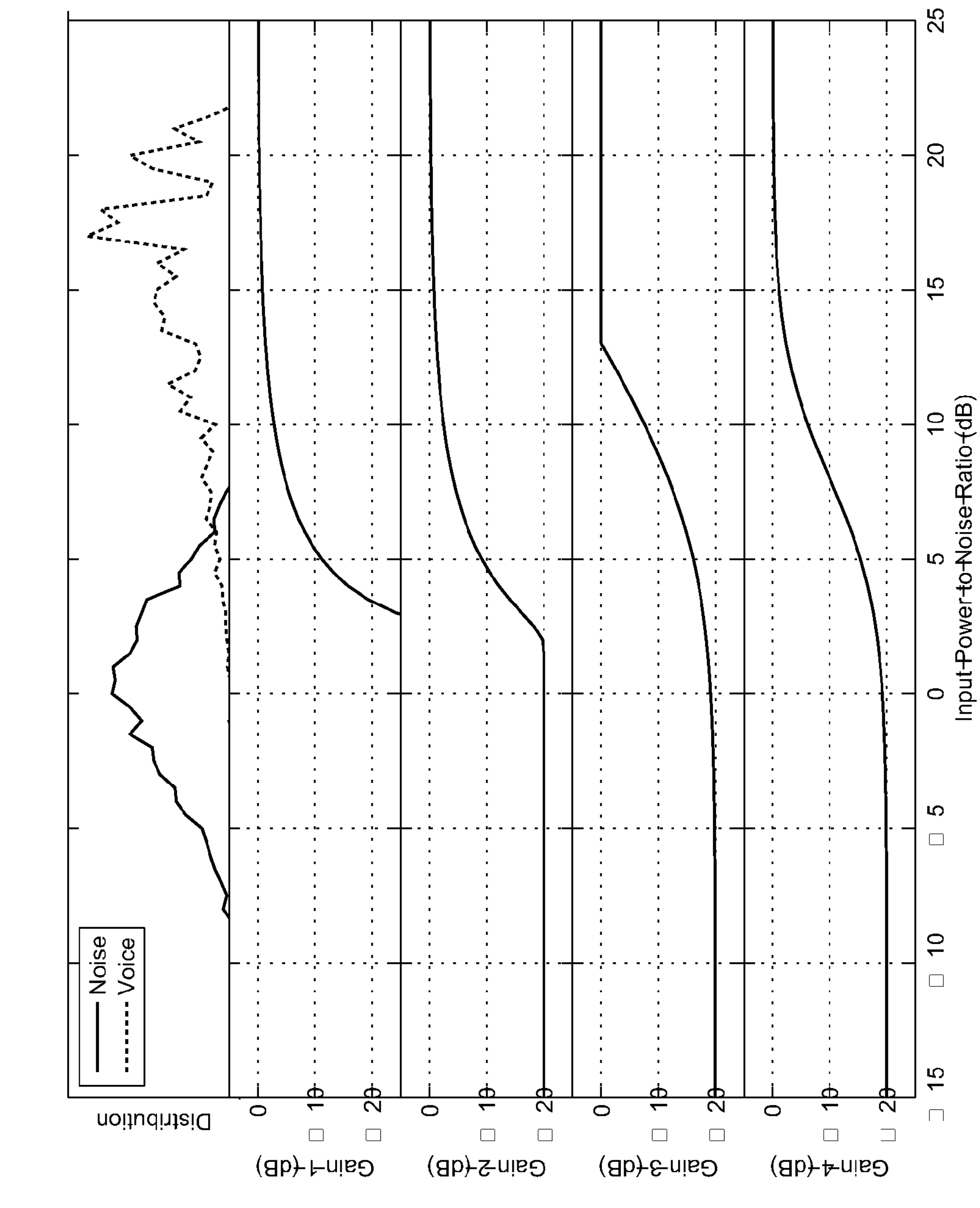
FIG. 13 shows the distribution of FIG. 12, together with four suppression gain functions determined according to alternate embodiments of the invention.

FIG. 13 shows the distribution of FIG. 12, together with the gain expressions Gain 1, Gain 2, Gain 3, and Gain 4 described above as functions of the ratio of input power to noise. The gain functions are shown plotted on a log scale in dB.

It is noted that features of this family of suppression gain functions include, assuming that for each frequency band, a first range of values of banded instantaneous amplitude metric values is expected for noise, and a second range of values of banded instantaneous amplitude metric values is expected for a desired input:

- A (relatively) constant gain for the first range of values, i.e., in the region of the noise power. By relatively constant is meant, e.g., less than 0.03 dB of variation in the range.
- A (relatively) constant gain for the second range of values, i.e., in the region of the desired signal, e.g., voice signal power. By relatively constant is meant, e.g., less than 0.1 dB per dB of input power in the second range.
- A (relatively) smooth transition from the first range to the second range, i.e., from the region of the noise power to the region of desired signal power.
- The progression towards a function whose derivative also is smooth, e.g., a sigmoid-like function.

Thus, other desirable but not necessary features include:

- A relatively smooth transition from the region of the noise power to the region of desired signal power.
- A continuous and bound first and desirably higher derivatives.

This approach substantially reduces the degree of expansion that may occur due to excessive gradient or discontinuities in the gain as a function of the incoming banded signal power.

It would be apparent to one skilled in the art that there are many possible functions and parameterizations that express these characteristics, and that those presented here are suggested examples that the inventors found work well. It should also be noted that the suggestions presented herein are also applicable to simple single channel and alternate structures for noise suppression.

Extension of Suppression Curves to Include Negative Gradient

The inventors found it may be desirable to suppress noise, i.e., lower the level of noise, and further, to "whiten" the noise to suppress not only the level, but undesirable characteristics of the noise.

For this, it may be advantageous to use a gain whose curve has a negative gradient in at least some of the range of input powers expected for the noise signal. In this region, lower power noise is attenuated less than higher power noise, which is a whitening process that reduces the dynamics of the noise over both frequency and time.

The extent to which such a negative slope is provided in the gain curve can be varied according to the circumstance. However, the inventors suggest that the slope of the gain relative to the input power should not be lower than about −1 (in units of dB gain vs. dB input power). The inventors also suggest that spikes and any sharp edges or discontinuities in the gain curve be avoided. It is also reasonable that the gain should not exceed unity. Therefore, the following is suggested for the noise and echo suppression gain:

An average slope across the expected range (the first range) of noise instantaneous power of approximately −0.5 (in units of dB gain vs. dB input power), where approximately means −0.3 to −0.7. A slope of −0.5 is suggested and achieves a compression ratio of the dynamic range of the noise signal of 2:1.

It should be apparent that there is a continuum of possible functions and parameterizations that express these characteristics. In one embodiment, a modified sigmoid function is used; the sigmoid function is modified by including an additional term to result in a desired negative gradient for input signal powers around the expected noise level.

In one embodiments, a modified sigmoid function is used that includes a sigmoid function and an additional term to provide the negative gradient in the first region. An expression is presented below for the modified sigmoid function that offers a similar level of suppression to the previous function suggested embodiment with the added property of achieving a significant reduction in the dynamic range of the noise. It is evident that there are computational simplifications for both the sigmoid function and the additional term.

$$\text{Gain}'_{b,N+E} = \min\left(0.9,\ 0.02\left(\frac{Y'_b}{N'_{b,S}+E_b}\right)^{-1}\right) + 10^{\frac{-1}{1+\exp\left(0.6\left[10\log_{10}\left(\frac{Y'_b}{N'_{b,S}+E'_b}\right)-10\right]\right)}}. \qquad (\text{“Gain 5”})$$

It would be clear to one skilled in the art that there are computational simplifications for the sigmoid function, and alternate embodiments use such simplifications of the expression Gain 5.

Figure 14:
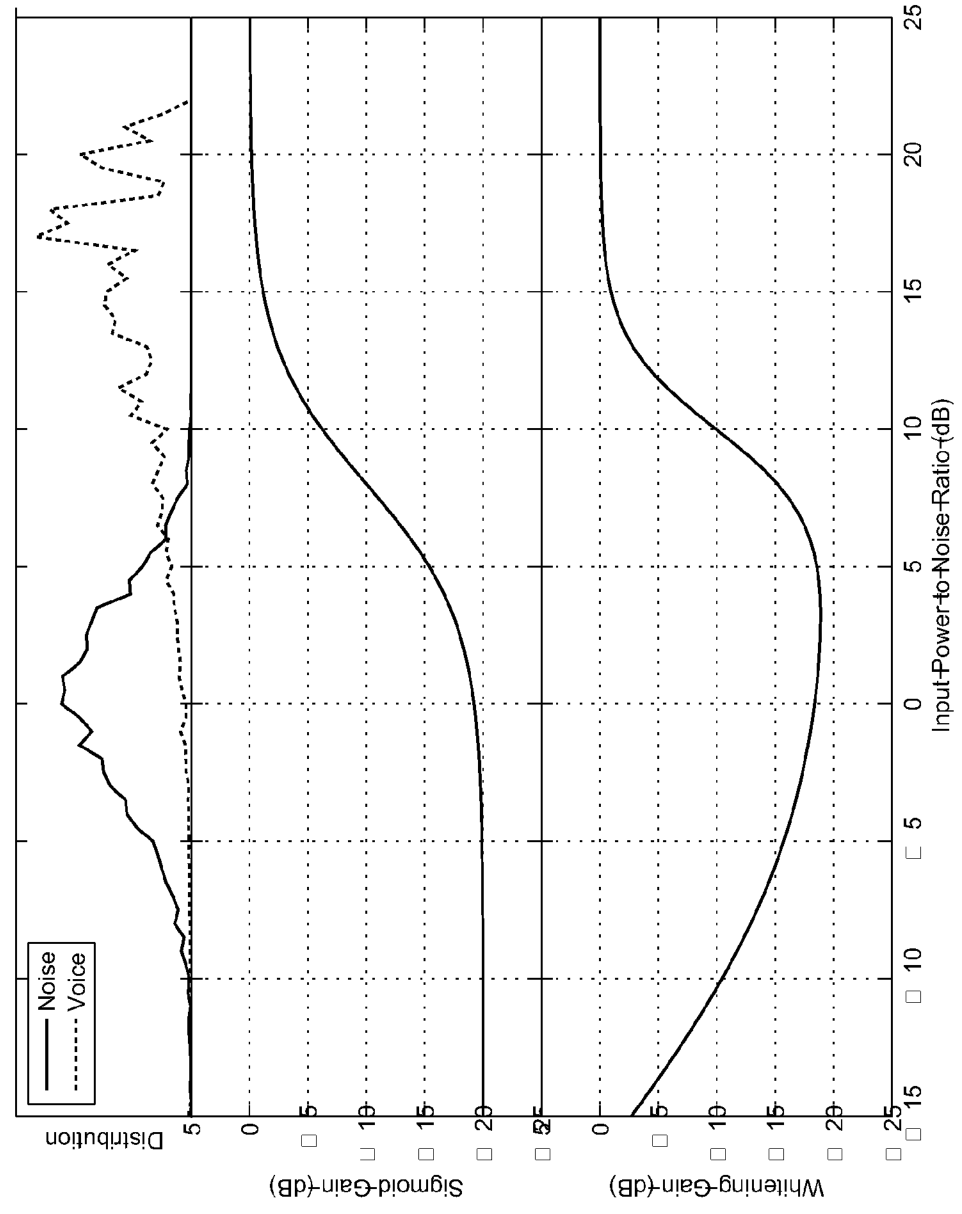
FIG. 14 shows the histograms of FIG. 12 together with a sigmoid gain curve and a modified sigmoid-like gain curve determined according to alternate embodiments of the invention.

FIG. 14 shows the histograms of FIG. 12 together with the sigmoid gain curve of Gain 4 and the modified sigmoid-like gain curve of Gain 5, called the whitening gain on the drawing. Each of the plots has the input power to noise ratio in dB as the horizontal axis.

Figure 15:
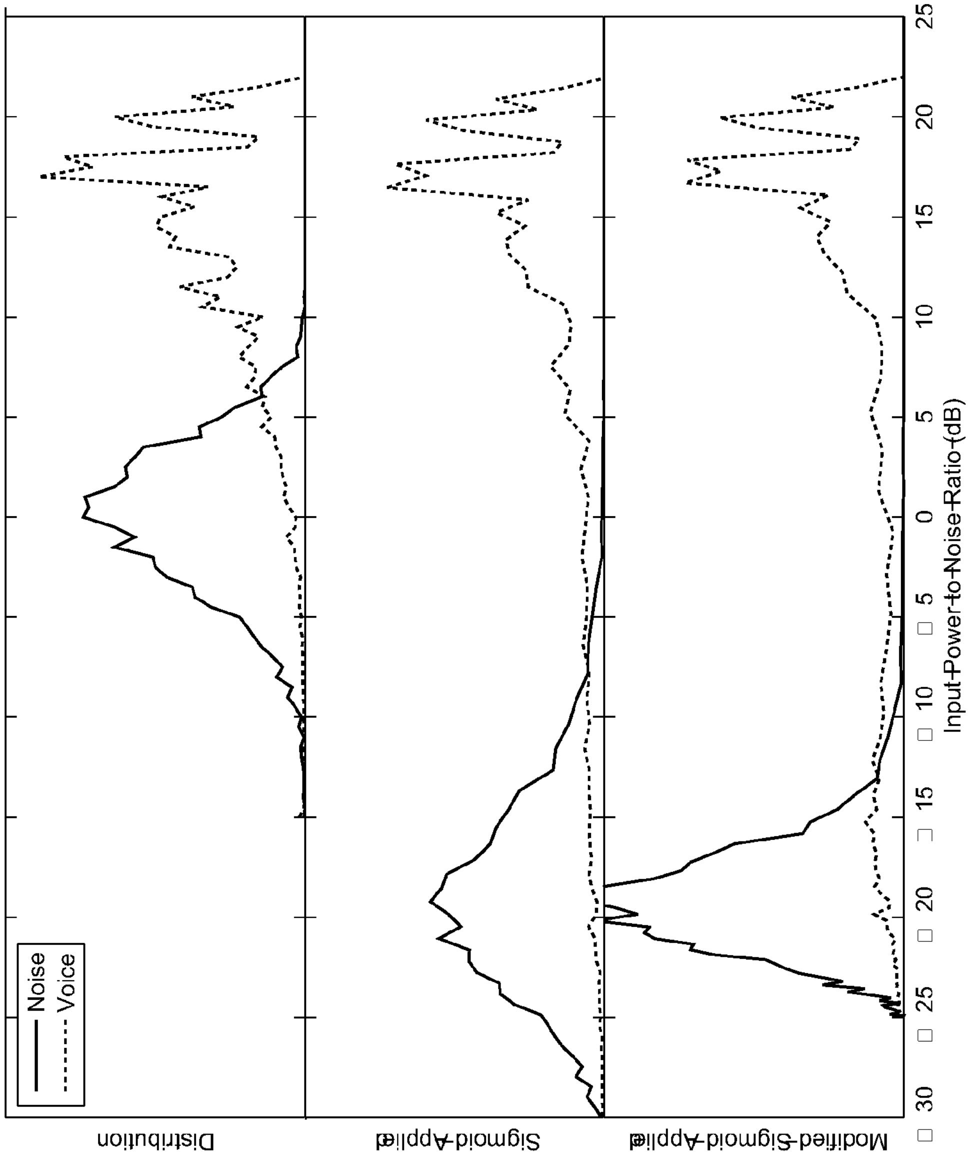
FIG. 15 shows what happens to the probability density functions of FIG. 12 after applying the sigmoid-like gain curve and the modified sigmoid-like gain curve of FIG. 14.

FIG. 15 shows what happens to the probability density functions, shown as scaled histograms, for the expected power of the noise for a noise signal and for a voice signal after applying the sigmoid-like gain curve Gain 4 and the whitening gain Gain 5. As can be seen, each of these causes a significant increase in the separation of the voice and noise, with the noise level decreasing in power or shifting lower on the horizontal axis. The first sigmoid gain, Gain 4, creates a spreading of the noise power. That is, the noise level fluctuates more in power than in the original noise signal. This effect may be worse for many prior art approaches to noise suppression that do not exhibit the smooth property of the sigmoid like functions through the main noise power distribution. The voice levels are also slightly expanded.

The second modified sigmoid gain, Gain 5, has the property of compacting the noise power distribution. This makes the curve higher, since the central noise levels are now more probable. This means there are less fluctuations in the noise and a sort of smoothing or whitening which can lead to less intrusive noise.

Note that these plots show scaled probability density functions, as histograms, for noise, and for a voice signal. The noise and voice probability density functions are scaled to have the same area.

Thus, both gain functions increase the signal to noise ratio by increasing the spread—reducing the noise levels. In the whitening gain case, the noise is less intrusive and partially whitened over time and frequency.

Additional Independent Control of Echo Suppression

The suppression gain expressions above can be generalized as functions on the domain of the ratio of the instantaneous input power to the expected undesirable signal power, sometimes called “noise” for simplicity. In these gain expressions, the undesirable signal power is the sum of the estimated (location-sensitive) noise power and predicted or estimated echo power. Combining the noise and echo together in this way provides a single probability indicator in the form of a suppressive gain that causes simultaneous attenuation of both undesirable noise and of undesirable echo.

In some cases, e.g., in cases in which the echo can achieve a level substantially higher than the level of the noise, such suppression may not lead to sufficient echo attenuation. For example, in some applications, there may be a need for only mild reduction of the ambient noise, whilst it is generally required that any echo be suppressed below audibility. To achieve such a desired effect, in one embodiment, an additional scaling of the probability indicator or gain is used, such additional scaling based on the ratio of input signal to echo power alone.

Denote by $f_A(\bullet)$, $f_B(\bullet)$ a pair of suppression gain functions, each having desired properties for suppression gains, e.g., as described above, including, for example being smooth. As one example, each of $f_A(\bullet)$, $f_B(\bullet)$ has sigmoid function characteristics. In some embodiments, rather than the gain expression being defined as $$f_A\left(\frac{Y'_b}{N'_{b,S}+E'_b}\right),$$

one can instead use a pair of probability indicators, e.g., gains $$f_A\left(\frac{Y'_b}{N'_{b,S}}\right),\quad f_B\left(\frac{Y'_b}{E'_b}\right)$$

and determine a combined gain factor from $$f_A\left(\frac{Y'_b}{N'_{b,S}}\right) \text{ and } f_B\left(\frac{Y'_b}{E'_b}\right),$$

which allows for independent control of the aggressiveness and depth for the response to noise and echo signal power. In yet another embodiment, $$f_A\left(\frac{Y'_b}{N'_{b,S}+E'_b}\right)$$

can be applied for both noise and echo suppression, and $$f_B\left(\frac{Y'_b}{E'_b}\right)$$

can be applied for additional echo suppression.

In one embodiment the two functions $$f_A\left(\frac{Y'_b}{N'_{b,S}}\right),\quad f_B\left(\frac{Y'_b}{E'_b}\right),$$

or in another embodiment, the two functions $$f_A\left(\frac{Y'_b}{N'_{b,S}+E'_b}\right),\quad f_B\left(\frac{Y'_b}{E'_b}\right)$$

are combined as a product to achieve a combined probability indicator, as a suppression gain.

Combining the Suppression Gains for Simultaneous Suppression of Out-of-Location Signals In one embodiment, the suppression probability indicator for in-beam signals, expressed as a beam gain 1012, called the spatial suppression gain, and denoted $\mathrm{Gain}_{b,S}'$ is determined by a spatial suppression gain calculator 1011 in element 129 (FIG. 10) and by a calculating suppression gain step 1103 in step 223 as $$\mathrm{Gain}_{b,S}'=\mathrm{BeamGain}'_b=\mathrm{BeamGain}_{min}+(1-\mathrm{BeamGain}_{min})\mathrm{RPI}'_b\cdot\mathrm{PPI}'_b\cdot\mathrm{CPF}'_b.$$

The spatial suppression gain 1012 is combined with other suppression gains in gain combiner 1015 and combining step 1109 to form an overall probability indicator expressed as a suppression gain. The overall probability indicator for simultaneous suppression of noise, echo, and out-of-beam signals, expressed as a gain $\mathrm{Gain}_{b,RAW}'$, is in one embodiment the product of the gains:

$$\mathrm{Gain}_{b,RAw}'=\mathrm{Gain}_{b,S}'\cdot\mathrm{Gain}_{b,N+E}'.$$

In an alternate embodiment, additional smoothing is applied. In one example embodiment of the gain calculation step 1109 and of element 1015:

$$\mathrm{Gain}_{b,RAW}'=0.1+0.9\mathrm{Gain}_{b,S}'\cdot\mathrm{Gain}_{b,N+E}'.$$

where the minimum gain 0.1 and 0.9=(1−0.1) factors can be varied for different embodiments to achieve a different minimum value for the gain, with a suggested range of 0.001 to 0.3 (−60 dB to −10 dB). The softening is to ensure that at every point at which a parameter and an estimate is calculated, efforts are taken to ensure continuity and stability over time, signal conditions, and spatial uncertainly. This avoids any sharp edges or sudden relative changes in the gains that are typical as the probability indicator or gain becomes small.

The above expression for $\mathrm{Gain}_{b,RAW}'$ suppresses noise and echo equally. As discussed above, it may be desirable to not eliminate noise completely, but to completely eliminate echo. In one such embodiment of gain determination, $$\mathrm{Gain}'_{b,RAW}=0.1+0.9\ \mathrm{Gain}'_{b,S}\cdot f_A\left(\frac{Y'_b}{N'_{b,S}+E'_b}\right)\cdot f_B\left(\frac{Y'_b}{E'_b}\right),$$

where $$f_A\left(\frac{Y'_b}{N'_{b,S}+E'_b}\right)$$

achieves (relatively) modest suppression of both noise and echo, while $$f_B\left(\frac{Y'_b}{E'_b}\right)$$

suppresses the echo more. In a different embodiment, $f_A(\bullet)$ suppresses only noise, and $f_B(\bullet)$ suppresses the echo.

In yet another embodiment, $$\mathrm{Gain}'_{b,RAW}=0.1+0.9\mathrm{Gain}'_{b,S}\cdot\mathrm{Gain}'_{b,N+E},$$

where:

$$\mathrm{Gain}'_{b,E+B}=\left(0.1+0.9f_A\left(\frac{Y'_b}{N'_{b,S}+E'_b}\right)\right)\cdot\left(0.1+0.9f_B\left(\frac{Y'_b}{E'_b}\right)\right).$$

In some embodiments, this noise and echo suppression gain is combined with the spatial feature probability indicator or gain for form a raw combined gain. In some versions, after combining, the raw combined gain is post-processed by a post-processor 1025 and by post processing step 225 to ensure stability and other desired behavior.

In another embodiment, the gain function $$f_B\left(\frac{Y'_b}{E'_b}\right)$$

specific to the echo suppression is applied as a gain (after post-processing by post-processor 1025 and by post processing step 225 in embodiments that include postprocessing). Post-processing is described in more detail herein below. Some embodiments of gain calculator 129 includes a determined of the additional echo suppression gain and a combiner 1027 of the additional echo suppression gain with the post-processed gain to result in the overall B gains to apply. The inventors discovered that such an embodiment can provide a more specific and deeper attenuation of echo. Note that in embodiments that include post-processing, the echo probability indicator or gain $$f_B\left(\frac{Y'_b}{E'_b}\right)$$

is not subject to the smoothing and continuity imposed by the post-processing 225, such post-processing, e.g., being tailored for the desired signal and noise signal stability. and a suitable level of noise suppression without unwanted voice distortion. The need to eliminate echo from the signal can override the constraint of instantaneous speech quality when echo is active. The echo suppressive component (after post-processing in embodiments that include post-processing) can apply narrow and potentially deep suppressive action across frequency, which can leave an unpleasant residual signature of the echo on the remaining noise in the signal. A solution to this problem is that of "comfort noise" and it should be well known to some-one skilled in the art, and apparent how this could be applied to reduce the presence of gaps in the spectrum caused by an echo suppressor after the gain post processing.

Post-Processing to Improve the Determined Gains

Some embodiments of the gain calculator 129 include a post-processor 1025 and some embodiments of method 200 include a post-processing step 225. Each of the post processor and post-processing step 225 is to post process the combined raw gains of the bands to generate a post-processed gain for each band. Such post-processing includes in different embodiments one or more of: ensuring minimum gain values; ensuring there are no or few isolated or outlier gains by carrying out median filtering of the combined gain; and ensuring smoothness by carrying out one or both of time smoothing and band-to-band smoothing. Some embodiments include signal classification, e.g., using one or both: a spatially-selective voice activity detector 1021 implementing a step 1111, and a wind activity detector 1023 implementing a step 1113 to generate a signal classification, such that the post-processing 225 of post-processor 1025 is according to the signal classification.

An embodiment of a spatially-selective voice activity detector 1021 is described herein below, as is an embodiment of a wind activity detector (WAD) 1023. The signal classification controlled post-processing aspect of the invention, however, is not limited to the particular embodiments of a voice activity detector or of a wind activity detector described herein.

Minimum Values (Maximum Suppression Depth)

The raw combined gain $\text{Gain}_{b,RAW}'$ may sometimes fall below a desired minimum point, that is, achieve more than a maximum desired suppression depth. Note that the term maximum suppression depth and minimum gain shall be uses interchangeably herein. Not all the above-described embodiments for determining the gain include ensuring that the gain does not fall below such a minimum point. The step of ensuring a minimum gain serves to stabilize the suppressive gain in noisy conditions by avoiding low gain values that can exhibit large relative variation with small errors in feature estimation or natural noise feature variations. The process of setting a minimum gain serves to reduce processing artifacts and "musical noise" caused by such variation in the low valued gains, and also can be used to lessen the workload or depth of the suppression in certain bands which can lead to improved quality of the desired signal Some embodiments of post-processor 1025 and post processing step 225 include, e.g., in step 1115, ensuring that the gain does not fall below a pre-defined minimum, so that there is a pre-defined maximum suppression depth.

Furthermore, in some embodiments of post-processor 1025 and step 1115, rather than the raw gain having the same maximum suppression depth (minimum gain) for all bands, it may be desired that the minimum level be different for different frequency bands. In one embodiment, $$\text{Gain}_{b,RAW}'=\text{Gain}_{b,MIN}'+(1-\text{Gain}_{b,MIN}')\cdot\text{Gain}_{b,S}'\cdot\text{Gain}_{b,N+E}'.$$

As one example, in some embodiments of post-processor 1025 and step 1115, it the range of the maximum suppression depth or minimum gain may range from −80 dB to −5 dB and be frequency dependent. In one embodiment the suppression depth was around −20 dB at low frequencies below 200 Hz, varying to be around −10 dB at 1 kHz and relaxing to be only −6 dB at the upper voice frequencies around 4 kHz.

In some embodiments, the processing of post-processing step 225 and of post-processor 1025 is controlled by a classification of the input signals, e.g., as being voice or not as determined by a VAD, and/or as being wind or not as determined by a WAD. In one such signal classification controlled embodiment of post-processing, the minimum values of the gain for each band, $\text{Gain}_{b,MIN}'$, are dependent on a classification of the signal, e.g., whether the signal is determined to be voice by a VAD in embodiments that include a VAD, or to be wind by embodiments that include a WAD. In one embodiment, the VAD is spatially selective.

In one embodiment, if a VAD determines the signal to be voice, $\text{Gain}_{b,MIN}'$ is increased, e.g., in a frequency-band dependent way (or in another embodiment, by the same amount for each band b). In one embodiment, the amount of increase in the minimum is larger in the mid-frequency bands, e.g., bands between 500 Hz to 2 kHz.

In one embodiment, if a WAD determines the signal to be wind, $\text{Gain}_{b,MIN}'$ is decreased, e.g., in a frequency-band dependent way (or in another embodiment, by the same amount for each band b). In one embodiment, the amount of decrease in the minimum is frequency dependent with a larger decrease occurring at the lower frequencies from 200 Hz to 1500 Hz.

In an improved embodiment, the increase in minimum gain values is controlled to increase in a gradual manner over time as voice is detected, and similarly, to decrease in a gradual manner over time as lack of voice is detected after voice has been detected.

Similarly, in an improved embodiment, the decrease in minimum gain values is controlled to decrease in a gradual manner over time as wind is detected, and similarly, to increase in a gradual manner over time as lack of wind is detected after wind has been detected.

In one embodiment, a single time constant is used to control the increase or decrease (for voice) and the decrease or increase (for wind). In another embodiment, a first time constant is used to control the increase in minimum gain values as voice is detected or the decrease as wind is detected, and a second time constant is used to control the decrease in minimum gain values as lack of voice is detected after voice was detected, or the increase in minimum gain values as lack of wind is detected after wind was detected.

Controlling Musical Noise

Musical noise is known to exist, and might occur because of short term mistakes over time made on the gain in some of the bands. Such gains-in-error can be considered statistical outliers, that is, values of the gain that across a group of bands statistically lie outside an expected range, so appear "isolated." To an extent, all the three methods of post-processing presented in different embodiments herein act to reduce the presence of musical artifacts, particularly during noise sections where the suppressive gains are low. The median filter approach presented in this section is particularly effective and works directly on the gains, rather than processing the internal estimates. The approach of combing the gains or probability indicators into a single gain for each band, and then using direct linear and nonlinear filtering on the gains is a significant novel and effective technique presented. The median filter approach is responsible for a considerable reduction in the prevalence of musical noise artifacts.

Such statistical outliers might occur in other types of processing in which an input signal is transformed and banded. Such other types of processing include perceptual domain-based leveling, perceptual domain-based dynamic range control, and perceptual domain-based dynamic equalization that takes into account the variation in the perception of audio depending on the reproduction level of the audio signal. See, for example, International Application PCT/US2004/016964, published as WO 2004111994. Perceptual-domain-based leveling, perceptual-domain-based dynamic range control, and perceptual-domain-based dynamic equalization processing each includes determining and adjusting the perceived loudness of an audio signal by applying a set of banded gains to a transformed and perceptually-banded metric of the amplitude of an input signal. To determine such perceptually-banded metric of the amplitude of the input signal, a psychoacoustic model is used to calculate a measure of the loudness of an audio signal in perceptual units. In WO 2004111994, such perceptual domain loudness measure is referred to as specific loudness, and is a measure of perceptual loudness as a function of frequency and time. When applied to equalization, true dynamic equalization is carried out in a perceptual domain to transform the perceived spectrum of the audio signal from a time-varying perceived spectrum to a substantially time-invariant perceived spectrum.

It is possible that the gains determined for each band for leveling and/or dynamic equalization include statistical outliers, e.g., isolated values, and such outliers might cause artifacts such as musical noise. Hence the processing described herein may be applicable also to such other applications in which gains are applied to a signal indicative of transformed banded norms of the amplitude at a plurality of frequency bands. It should also be noted that the proposed post processing is also directly applicable to systems without the combination of features and suppression. For example, it provides an effective method for improving the performance of a single channel noise reduction system.

One embodiment of post-processing 225 and of post-processor 1025 includes, e.g. in step 1117, median filtering the raw gain over different frequency bands. The median filter is characterized by 1) the number of gains to include to determine the median, and 2) the conditions used to extend the banded gains to allow calculation of the median at the edges of the spectrum.

One embodiment includes 3-point band-to-band median filtering, with extrapolation of interior values for the edges. In another embodiment, the minimum gain or a zero value is used to extend the banded gains.

In one embodiment, the band-to-band median filtering is controlled by the signal classification. In one embodiment, a VAD, e.g., a spatially-selective VAD is included, and if the VAD determines there is no voice, 5-point band-to-band median filtering is carried out, with extending the minimum gain or a zero value at the edges to compute the median, and if the VAD determines there is voice present, 3-point band-to-band median filtering is carried out, extrapolating the edge values at the edges to calculate the median.

In one embodiment, a WAD is included, and if the WAD determines there is no wind, 3-point band-to-band median filtering is carried out, with extrapolating the edge values applied at the edges, and if the WAD determines there is wind present, 5-point band-to-band median filtering is carried out, with selecting the minimum gain values applied at the edges.

Smoothing

The raw gains described above are independently determined for each band b, and it is possible that the gains may have some jumps across the bands, even after median filtering to eliminate or reduce the occurrence of gain values that are statistical outliers, e.g., isolated values. Therefore, some embodiments of post-processor 1025 and post-processing step 225 include smoothing 1119 across the bands to eliminate such potential jumps which can cause colored and unnatural output spectra.

One embodiment of smoothing 1119 uses a weighted moving average with a fixed kernel. One example uses a binomial approximation of a Gaussian weighting kernel for the weighted moving average.

As one example, a 5-point binomial smoother has a kernel $$\frac{1}{16}[1 \;\; 4 \;\; 6 \;\; 4 \;\; 1].$$

In practice, of course, the factor 1/16 may be left out, with scaling carried out in one point or another as needed.

As another example, a 3-point binomial smoother has a kernel $$\frac{1}{4}[1 \;\; 2 \;\; 1].$$

Many other weighted moving average filters are known, and any such filter can suitably be modified to be used for the band-to-band smoothing of the gain.

The smoothing, e.g. of step 1119 can be defined by a real-valued square matrix of dimension B, the number of frequency bands.

As will be described further herein below, the application of the gains on the N frequency bins in step 227 and in element 131 includes using an N by B matrix. The B by B matrix that defined smoothing can be combined with the gain application matrix to define a combined N by B matrix. Thus, in one embodiment, each of the gain applications of element 131 and the step 227 incorporates band-to-band smoothing.

In one embodiment, the band-to-band median filtering is controlled by the signal classification. In one embodiment, a VAD, e.g., a spatially-selective VAD is included, and if the VAD determines there is voice, the degree of smoothing is increased when noise is detected. In one example embodiment, 5-point band-to-band weighted average smoothing is carried out in the case the VAD indicates noise is detected, else, when the VAD determines there is no voice, no smoothing is carried out.

In some embodiments, time smoothing of the gains also is included. In some embodiments, the gain of each the B bands is smoothed by a first order smoothing filter:

$$\mathrm{Gain}_{b,Smoothed}=\alpha_b\mathrm{Gain}_b+(1-{}_b)\mathrm{Gain}_{b,Smoothed_{Prev}}$$

where $\mathrm{Gain}_b$ is the current time-frame gain, $\mathrm{Gain}_{b,Smoothed}$ is the time-smoothed gain, and $\mathrm{Gain}_{b,Smoothed_{Prev}}$ is $\mathrm{Gain}_{b,Smoothed}$ from the previous M-sample frame. $\alpha_b$ is a time constant which may be frequency band dependent and is typically in the range of 20 to 500 ms. In one embodiment a value of 50 ms was used.

Thus, in one embodiment, first order time smoothing of the gains according to a set of first order time constants is included.

In one embodiment, the amount of time smoothing is controlled by the signal classification of the current frame. In a particular embodiment that includes first order time smoothing of the gains, the signal classification of the current frame is used to control the values set of first order time constants used to filter the gains over time in each band.

In the case a VAD is included, one embodiment stops time smoothing in the case voice is detected.

In one embodiment, $\text{Gain}_{b,Smoothed}=\alpha_b\text{Gain}_b+(1-\alpha_b)\text{Gain}_{b,Smoothed_{Prev}}$ if no speech detected, and $\text{Gain}_{b,Smoothed}=\text{Gain}_b$ if speech is detected.

The inventors found it is important that aggressive smoothing be discontinued at the onset of speech. Thus it is preferable that the parameters of post-processing are controlled by the immediate signal classifier (VAD, WAD) value that has low latency and is able to achieve a rapid transition of the post-processing from noise into voice (or other desired signal) mode. The speed with which more aggressive post-processing is reinstated after detection of voice, i.e., at the trail out, has been found to be less important, as it affects intelligibility of speech to a lesser extent.

Voice Activity Detection with Settable Sensitivity

There are various elements of the method and system in which voice activity detection may be used. VADs are known in the art. In particular, so-called "optimal VADs" are known, and there has been much research on how to determine such an "optimal VAD" according to a VAD optimality criterion.

When applied to suppression, the inventors have discovered that suppression works best when different parts of the suppression system are controlled by different VADs, each such VAD custom designed for the functions of the suppressor in which it is used in, rather than having an "optimal" VAD for all uses. Therefore, one aspect of the invention is the inclusion of a plurality of VADs, each controlled by a small set of tuning parameters that separately control sensitivity and selectivity, including spatial selectivity, such parameters tuned according to the suppression elements the VAD is used in.

Each of the plurality of the VADs is an instantiation of a universal VAD that determines indications of voice activity from $Y_b'$. The universal VAD is controlled by a set of parameters and uses an estimate of noise spectral content, the banded frequency domain amplitude metric representation of the echo, and the banded spatial features. The set of parameters includes whether the estimate of noise spectral content is spatially selective or not. The type of indication of voice activity an instantiation determines controlled by a selection of the parameters.

Thus, another feature of embodiments of the invention is a method of determining a plurality of indications of voice activity from $Y_b'$, the mixed-down banded instantaneous frequency domain amplitude metric, the indications using respective instantiations of a universal voice activity detection method. The universal voice activity detection method is controlled by a set of parameters and uses an estimate of noise spectral content, the banded frequency domain amplitude metric representation of the echo, and the banded spatial features. The set of parameters including whether the estimate of noise spectral content is spatially selective or not. Which indication of voice activity an instantiation determines controller by a selection of the parameters.

For example, in some elements of the suppression method, selectivity is important, that is, the VAD instantiation should have a high probability that what it is detecting is voice, while in other elements of the suppression method, sensitivity is important, that is, the VAD instantiation should have a low probability of missing voice activity, even at the cost of selectivity so that more false positives are tolerated.

As a first example, the VAD 125 used to prevent updating of the echo prediction parameters—the prediction filter coefficients—is selected to have a high sensitivity, even at the cost of selectivity. For control of post-processing, the inventors selected to tune a VAD to have a balance of selectivity and sensitivity as being overly sensitive would lead to fluctuation of levels in noise as speech was falsely detected, whilst being overly selective would lead to some loss of voice. As another example, the measurement of output speech level requires a VAD that is highly selective, but not overly sensitive to ensure that only actual speech is used to set the level and gain control.

One embodiment of a general spatially selective VAD structure—the universal VAD to calculate voice activity that can be tuned for various functions is $$S=\sum_{b=1}^{B}(BeamGain_b')^{BeamGainExp}\left(\frac{\max(0,\,Y_b'-\beta_{b_N}\cdot(N_b'\vee N_{b,S}')-\beta_{b_E}E_b')}{Y_b'+Y_{b_{sens}}'}\right),$$

where $\text{BeamGain}'_b=\text{BeamGain}_{min}+(1-\text{BeamGain}_{min})\text{RPI}'_b\cdot\text{PPI}'_b\cdot\text{CPI}'_b$, BeamGainExp is a parameter that for larger values increases the aggressiveness of the spatial selectivity of the VAD, and is 0 for a non-spatially selective VAD such as used for echo update VAD 125, $N_b'\vee N_{b,S}'$ denotes either the total noise power (or other frequency domain amplitude metric) estimate $N_b'$ as used in VAD 125, or the spatially selective noise estimate $N_{b,S}'$ determined using the out-of-beam power (or other frequency domain amplitude metric), $\beta_N$, $\beta_E>1$ are margins for noise end echo, respectively and $Y_{sens}'$ is a settable sensitivity offset. The values of $\beta_N$, $\beta_E$ are between 1 and 4. BeamGainExp is between 0.5 to 2.0 when spatial selectivity is desired, and is 1.5 for one embodiment of step 1111 and VAD 1021 used to control post-processing.

The above expression also controls the operation of the universal voice activity detecting method.

For any given set of parameters to generate the speech indicator value S a binary decision or classifier can be obtained by considering the test $S>S_{thresh}$ as indicating the presence of voice. It should also be apparent that the value S can be used as a continuous indicator of the instantaneous speech level. Furthermore, an improved useful universal VAD for operations such as transmission control or controlling the post processing could be obtained using a suitable "hang over" or period of continued indication of voice after a detected event. Such a hang over period may vary from 0 to 500 ms, and in one embodiment a value of 200 ms was used. During the hang over period, it can be useful to reduce the activation threshold, for example by a factor of ⅔. This creates increased sensitivity to voice and stability once a talk burst has commenced.

For voice activity detection to control one or more post-processing operations, e.g., for step 1111 and VAD 1021, the noise in the above expression is $N_{b,S}'$ determined using the out-of-beam power (or other frequency domain amplitude metric) $Y_b'$. The values of $\beta_N$, $\beta_E$ are not necessarily the same as for the echo update VAD 125. This VAD is called a spatially-selective VAD and is shown as element 1021 in FIG. 10. $Y_{sens}$ is set to be around expected microphone and system noise level, obtained by experiments on typical components.

Thus, $\beta_N$, $\beta_E$, $Y_{sens}$, $S_{thresh}$, BeamGainExp, and whether $N_b'$ or $N_{b,S}'$ is used are tunable parameters, each tuned according to the function performed by the element in which an instantiation of the universal VAD is used. This is to enhance the voice quality while improving the suppression of undesired effects such as one or more of echoes, noise, and sounds from other than the speaker location. Other uses for the VAD structures presented herein include the control of transmission or coding, level estimation, gain control and system power management.

Wind Activity Detection

Some embodiments of the invention include a wind activity detector 1023 and wind activity detection step 1113 in the application of the gains, and in particular, in the post-processing.

Generally, each of wind activity detector (WAD) 1023 and wind detecting step 1113 operates to detect the presence of corrupting wind influences in the plurality of inputs, e.g., microphone inputs, e.g., two microphone inputs. In one embodiment, the element 1023 and step 1113 determine an estimate of wind activity. This can be used to control post-processing of the gains, e.g., to control one or more characteristics of one or more of: (a) imposing minimum gain values; (b) applying a median filter to gains across frequency bands; (c) band-to-band smoothing, (d) time smoothing, and other post-processing methods that in one embodiment are gated by voice activity, and in another by one or more of voice activity detection, wind activity detection, and silence detection.

Any wind activity detector and wind detection method can be used in system and method embodiments of the invention. The inventors chose to use the wind detector and wind detection method described in the Wind Detection/Suppression Application referenced in the "RELATED PATENT APPLICATIONS" Section herein above. Some embodiments further include wind suppression. Wind suppression however is not discussed herein, but rather in the related Wind Detection/Suppression Application.

Only an overview of embodiments of the wind detector and detection method is presented herein in sufficient detail to enable one skilled in the art to practice this element. For more details, see the related Wind Detection/Suppression Application.

In some embodiments, wind detector 1023 uses an algorithmic combination of multiple features including spatial features to increase the specificity of the detection and reduce the occurrence of "false alarms" that would otherwise be caused by transient bursts of sound common in voice and acoustic interferers as is common in prior art wind detection. This allows the action of the suppressor 131 as indicated by the gain calculated by calculator 129 to add suppression to stimuli in which wind is present, thus preventing any degradation in speech quality due to unwarranted operation of wind suppression processing under normal operating conditions.

It has been experimentally shown that for two sample periods of recordation of sound in the presence of wind in two channels, a low degree of correlation is exhibited between the channels. This effect is more pronounced when viewing the signal over both time and frequency windows. Furthermore, it has been observed that wind generally has a so-called "red" spectrum that is highly loaded at the low frequency end. Experiments have shown that wind power spectra have a significant downward trend when compared to the noise power spectra. This is used in embodiments of wind detector 1023 and wind activity detection method 1113.

Several other relevant characteristics—features—that can be used for distinguishing wind relate to its stochastic non-stationary nature. When viewed across time or frequency, wind introduces an extreme variance into spatial features such as ratio, angle, and coherence. That is, the spatial parameters in any band become rather stochastic and independent across time and frequency. This is a result of wind having no structural spatial properties or temporal properties—provided there is some diversity of microphone placement or orientation, it typically approximates an independent random process at each microphone and thus will be uncorrelated over time, space and frequency.

Some embodiments of a wind activity detector 1023 and a wind activity detection method 1113 use the following determined features for wind detection:

Slope: the spectral slope, e.g., in dB per decade, obtained, for example, using regression of the bands from 200 to 1500 Hz.

RatioStd: the standard deviation of the difference between instantaneous and expected values of the ratio spatial feature, e.g., in dB, e.g., in the bands from 200 to 1500 Hz.

CoherStd: the standard deviation of the coherence spatial feature in the bands from 200 to 1500 Hz.

Note, for slope calculations, using the covariance, for the case of two inputs, one embodiment uses the definitions described above in the Section "Location information." Another embodiment uses the following definitions:

$$\text{Power}'_b = R_{b11} + R_{b22}$$

$$\text{Ratio}'_b = 10\log_{10} R_{b22}/R_{b11} \text{(used in the log domain for analysis)}$$

$$\text{Phase}'_b = \tan^{-1}(R_{b21})$$

$$\text{Coherence}'_b = \left(\frac{R_{b12}R_{b21}}{R_{b11}R_{b22}}\right)^{1/2} \text{(can also be used in the log domain for analysis)}$$

In one embodiment, only some of the B bands are used. In one embodiment, a number of bands, typically between 5 and 20, covering the frequency range from approximately 200 to 1500 Hz are used. Slope is the linear relationship between 10 $\log_{10}$(Power) and $\log_{10}$ (BandFrequency). RatioStd is the standard deviation of the Ratio expressed in dB (10 $\log_{10}$ $(R_{b22}/R_{b11})$) across this set of bands. In one embodiment, CoherenceStd is the standard deviation of Coherence expressed in $$\text{dB}\left(5\log_{10}\left(\frac{R_{b12}R_{b21}}{R_{b11}R_{b22}}\right)\right)$$

across the set of bands, while in another, a non-logarithmic scale is used.

For each band b, the contributions from Slope, Ratio, and Coherence are determined as follows:

$$SlopeContribution = \max\left(0, \frac{\text{Slope} - WindSlopeBias}{WindSlope}\right) = \max\left(0, \frac{\text{Slope} - 5}{-20}\right)$$

$$RatioContribution = RatioStd / WindRatioStd = RatioStd / 4$$

$$CoherContribution = CoherStd / WindCoherStd = CoherStd / 1.$$

In the equation for Slope Contribution, Slope is the spectral slope, obtained from the current frame of data, WindSlopeBias and WindSlope are constants empirically determined, e.g., from plots of the power, in one embodiment arriving at the values −5 and −20, to achieve a scaling of the Slope Contribution such that 0 corresponds to no wind, 1 represents a nominal wind, and values greater 1 indicating progressively higher wind activity.

In the equation for RatioContribution, RatioStd is obtained from the current frame of data and WindRatioStd is a constant empirically determined from Ratio data over time to achieve a scaling of RatioContribution with the values 0 and 1 representing the absence and nominal level of wind as above.

In the equation for CoherContribution, CoherStd is obtained from the current frame of data and WindCoherStd is a constant empirically determined from Coherence data over time to achieve a scaling of CoherContribution with the values 0 and 1 representing the absence and nominal level of wind as above.

In one embodiment, the overall wind level is then computed as the product Slope Contribution, RatioContribution, and CoherContribution and clamped to a sensible pre-defined level, for example 2.

This overall wind level is a continuous variable with a value of 1 representing a reasonable sensitivity to wind activity. This sensitivity can be increased or decreased as required for different detection requirements to balance sensitivity and specificity as needed. A small offset, e.g., 0.1 in one embodiment, is subtracted to remove some residual. Accordingly, in some embodiments, $$\text{WindLevel}=\min(2,\max(\text{SlopeContribution}\cdot\text{RatioContribution}\cdot\text{CoherContribution}-0.1))$$

where the "·" denotes multiplication.

The signal can be further processed with smoothing or scaling to achieve the indicator of wind required for different functions. In one embodiment, a 100 ms decay filter is used.

It should be understood that the above combination, being predominantly multiplication, is in some form equivalent to the "ANDing" function. In one embodiment, multiple detections are used based on each indicator, in the form of:

WindLevel=SlopeContributionInd AND RatioContributionInd AND CoherContributionInd where SlopeContributionInd, RatioContributionInd, and CoherContributionInd are the wind activity indicators based on Slope Contribution, Ratio Contribution, and CoherContribution, respectively.

Specifically, in one implementation, the presence of wind is confirmed only if all three features indicate some level of wind activity. Such an implementation achieves a desired reduction in "false alarms", since for example whilst the Slope feature may register wind activity during some speech activity, the Ratio and Coherence features do not.

In some embodiments, a filter may be used to filter the WindLevel signal issuing from the wind detector. Due to the nature of wind and aspects of the detection method, this value can vary rapidly. The filter is provided to create a signal more suitable for the control of the post-processing (and for suppressing wind) by providing a certain robustness by adding some hysteresis that captures the rapid onset of wind, but maintains a memory of wind activity for a small time after the initial detection. In one embodiment this is achieved with a filter having low attack time constant, so that peaks in the detected level are quickly passed through, and a release time constant of the order of 100 ms. In one embodiment, this can be achieved with simple filtering as $$\begin{aligned}\mathit{FilteredWindLevel} &= \mathit{WindLevel} \text{ if } \mathit{WindLevel} > \mathit{WindDecay}\cdot\mathit{FilteredWindLevel}\\ &= \mathit{WindDecay}\cdot\mathit{FilteredWindLevel} \text{ otherwise,}\end{aligned}$$

where WindDecay reflects a first order time constant such that if the WindLevel were to be calculated at an interval of T, WindDecay varies as exp(−T 0.100), resulting in a time constant of 100 ms.

Given the embodiment and scaling presented above for a wind detector, a suitable threshold for creating a binary indicator of wind activity would sensibly be in the range of 0.2 to 1.5. In one embodiment a value of 1.0 was used against FilteredWindLevel to create a single binary indicator of wind.

Applying the Gains

Referring back to the system of FIG. 1, system 100 includes suppressor element 131 to apply the (overall, post-processed) gain in B bands to simultaneously suppress noise, out-of-location signals, and in some embodiments, echoes from the banded mixed-down signal 108. Referring to method 200, step 227 includes simultaneously suppressing noise, out-of-location signals, and in some embodiments suppressing echoes from the banded mixed-down signal by applying the (overall, post-processed) gain in B bands.

Denote by $Y_n$, n=0, . . . , N−1, the N frequency bins of the mixed-down, e.g., beamformed inputs signals 108. Denote by $G'_b$, b=1, . . . , B, the B overall gains obtained after processing, and in those embodiments that include independent (additional) application of echo suppression, combining with the additional echo suppression gain.

In one embodiment, the B gains $G'_b$ are interpolated to construct N gains, denoted $G_n$, n=0, . . . , N−1. In one embodiment, $$G_n = \sum_{b'=1}^{B} w_{b',n}\cdot G'_b$$

where $w_{b,n}$ represents an overlapping interpolation window. In one embodiment, the interpolation window is a raised cosine. In alternate embodiments, another widow, such as a shape preserving spline, or other band-limited interpolation function is used. In one embodiment, $$\sum_{b'=1}^{B} w_{b',n'} = 0 \text{ for all } n.$$

The interpolated gain values $G_n$ are applied to the N frequency bins of the mixed-down, e.g., beamformed signal 108 to form the N output signal bins denoted $\text{Out}_n$, n=0, . . . , N−1.

$$\text{Out}_n=G_n\cdot Y_n,\ n=0,\ldots,N-1.$$

This is the process shown in FIG. 3C and carried out by element 131 and step 227.

Generating the Output

The output syntheses process of step 229 is, in the case that the output is in the form of time samples, a conventional overlap add and inverse transform step, carried out, e.g., by output synthesizer/transformer 133.

The output remapping process of step 229 is, in the case that the output is in the frequency domain, a remapper as needed for the following step, and carried out, e.g., by output remapper 133. In some embodiments, only time domain samples are output, in others only remapped frequency domain output is generated, while in yet other embodiments, both time domain output and remapped frequency domain output is generated. See FIGS. 3D and 3E.

A Processing Apparatus Including a Processing System

Figure 16:
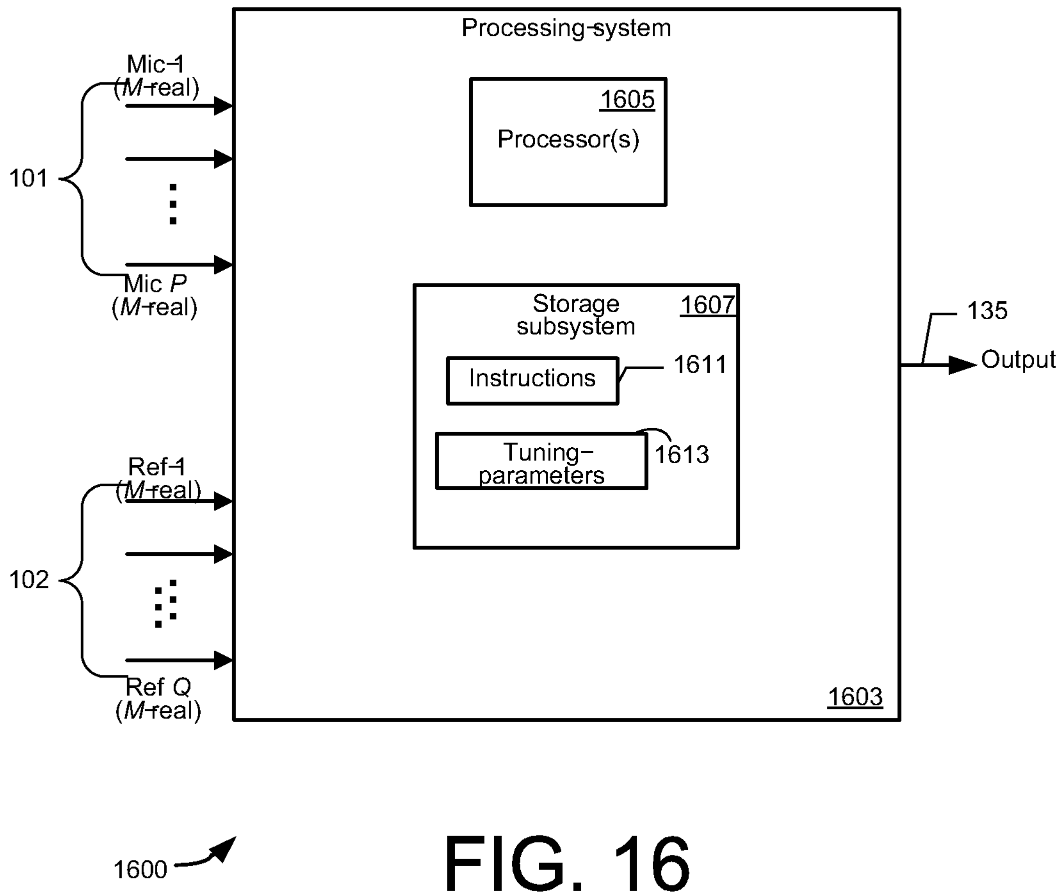
FIG. 16 shows a simplified block diagram of one processing apparatus embodiment that includes a processing system that has one or more processors and a storage subsystem, the processing apparatus for processing a plurality of audio inputs and one or more reference signal inputs according to an embodiment of the invention.

FIG. 16 shows a simplified block diagram of one processing apparatus embodiment 1600 for processing a plurality of audio inputs 101, e.g., from microphones (not shown) and one or more reference signals 102, e.g., from one or more loudspeakers (not shown) or from the feed(s) to such loudspeaker(s). The processing apparatus 1600 is to generate audio output 135 that has been modified by suppressing, in one embodiment noise and out-of-location signals, and in another embodiment also echoes as specified in accordance to one or more features of the present invention. The apparatus, for example, can implement the system shown in FIG. 1, and any alternates thereof, and can carry out, when operating, the method of FIG. 2 including any variations of the method described herein. Such an apparatus may be included, for example, in a headphone set such as a Bluetooth headset. The audio inputs 101, the reference input(s) 102 and the audio output 135 are assumed to be in the form of frames of M samples of sampled data. In the case of analog input, a digitizer including an analog-to-digital converter and quantizer would be present. For audio playback, a de-quantizer and a digital-to-analog converter would be present. Such and other elements that might be included in a complete audio processing system, e.g., a headset device are left out, and how to include such elements would be clear to one skilled in the art. The embodiment shown in FIG. 16 includes a processing system 1603 that is configured in operation to carry out the suppression methods described herein. The processing system 1603 includes at least one processor 1605, which can be the processing unit(s) of a digital signal processing device, or a CPU of a more general purpose processing device. The processing system 1603 also includes a storage subsystem 1607 typically including one or more memory elements. The elements of the processing system are coupled, e.g., by a bus subsystem or some other interconnection mechanism not shown in FIG. 16. Some of the elements of processing system 1603 may be integrated into a single circuit, using techniques commonly known to one skilled in the art.

The storage subsystem 1607 includes instructions 1611 that when executed by the processor(s) 1605, cause carrying out of the methods described herein.

In some embodiments, the storage subsystem 1607 is configured to store one or more tuning parameters 1613 that can be used to vary some of the processing steps carried out by the processing system 1603.

The system shown in FIG. 16 can be incorporated in a specialized device such as a headset, e.g., a wireless Bluetooth headset. The system also can be part of a general purpose computer, e.g., a personal computer configured to process audio signals.

Thus, a suppression system embodiments and suppression method embodiments have been presented. The inventors have noted that it is possible to eliminate significant parts of the target signal without any perceptual distortion. The inventors note that the human brain is rather proficient at error correcting (particularly on voice) and thus many minor distortions in the form of unnecessary or unavoidable spectral suppression would still lead to perceptually pleasing results. It is suspected that provided that the voice is sufficient for intelligibility, high level neurological hearing processes may map back to the perception of a complete voice audio stream. Thus, the inventors assume that voice and acoustic signals are far more disjoint in time and frequency than the typical Gaussian model, and if the output is for human perception, one can tolerate far more suppressive distortion than say a radio demodulator—thus the class of algorithms being described in this disclosure have been relatively unexplored. Therefore, embodiments of the present invention can lead to significant suppressive distortion when measured by some numerical scale, but provide perceptually pleasing results. Of course the present invention is not dependent on the correctness of any theory or model suspected to explain why the methods describe herein work. Rather, the invention is limited by the claims included herein, and their legal equivalents.

Unless specifically stated otherwise, as apparent from the following description, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

Note also that some expressions use the logarithm function. While base 10 log functions are used, those skilled in the art would understand that this is not meant to be limiting, and that any base may be used. Furthermore, those skilled in the art would understand that while equal signs were used in several of the mathematical expressions, constants of proportionality may be introduced in an actual implementation, and furthermore, that the ideas therein would still apply if some function monotonic with the behavior would be applied.

The methodologies described herein are, in some embodiments, performable by one or more processors that accept logic, e.g., instructions encoded on one or more computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device, and a network interface device.

In some embodiments, a non-transitory computer-readable medium is configured with, e.g., encoded with instructions, e.g., logic that when executed by one or more processors of a processing system such as a digital signal processing device or subsystem that includes at least one processor element and a storage subsystem, cause carrying out a method as described herein. Some embodiments are in the form of the logic itself. A non-transitory computer-readable medium is any computer-readable medium that is statutory subject matter under the patent laws applicable to this disclosure, including Section 101 of Title 35 of the United States Code. A non-transitory computer-readable medium is for example any computer-readable medium that is not specifically a transitory propagated signal or a transitory carrier wave or some other transitory transmission medium. The term "non-transitory computer-readable medium" thus covers any tangible computer-readable storage medium. In a typical processing system as described above, the storage subsystem thus includes a computer-readable storage medium that is configured with, e.g., encoded with instructions, e.g., logic, e.g., software that when executed by one or more processors, causes carrying out one or more of the method steps described herein. The software may reside in the hard disk, or may also reside, completely or at least partially, within the memory, e.g., RAM and/or within the processor registers during execution thereof by the computer system. Thus, the memory and the processor registers also constitute a non-transitory computer-readable medium on which can be encoded instructions to cause, when executed, carrying out method steps. Non-transitory computer-readable media include any tangible computer-readable storage media and may take many forms including non-volatile storage media and volatile storage media. Non-volatile storage media include, for example, static RAM, optical disks, magnetic disks, and magneto-optical disks. Volatile storage media includes dynamic memory, such as main memory in a processing system, and hardware registers in a processing system.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more processors operate as a standalone device or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a Personal Digital Assistant (PDA), a game machine, a cellular telephone, a Web appliance, a network router, switch or bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a data processing system, logic, e.g., embodied in a non-transitory computer-readable medium, or a computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment," "an embodiment," "some embodiments," or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Note that while the term power is used, as described in several places in this disclosure, the invention is not limited to use of power, i.e., the weighted sum of the squares of the frequency coefficient amplitudes, and can be modified to accommodate any metric of the amplitude.

All U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising element_A and element_B should not be limited to devices consisting of only elements element_A and element_B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, coupled to does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other but yet still co-operate or interact with each other.

In addition, use of the "a" or "an" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added to or deleted from methods described within the scope of the present invention.

We claim:

1. A system for processing audio input signals, comprising:

an input processor to accept a plurality of sampled audio input signals to form a mixed-down signal in the sample or frequency domain, and further to form a mixed-down banded instantaneous frequency domain amplitude metric of the input signals for a plurality of frequency bands, at least 90% of the bands having contribution from two or more frequency bins;

a banded spatial feature estimator to estimate banded spatial features from the plurality of sampled input signals;

a gain calculator to calculate a set of banded suppression probability indicators including a banded out-of-location signal probability indicator determined using two or more of the banded spatial features, and a banded noise suppression probability indicator, expressible for each frequency band as a noise suppression gain and determined using a banded estimate of noise spectral content based on the mixed-down banded instantaneous frequency domain amplitude metric of the input signals, the gain calculator further to combine the set of probability indicators to calculate a combined gain for each band of the plurality of frequency bands; and a suppressor to apply an interpolated final gain determined from the combined gains of the plurality of frequency bands to carry out suppression on the mixed-down signal to form suppressed signal data.

2. A system as recited in claim 1, wherein the estimate of noise spectral content is a spatially-selective estimate of noise spectral content.

3. A system as recited in claim 1, wherein the spatial features are determined from one or more banded weighted covariance matrices of the sampled input signals.

4. A system as recited in claim 3, wherein the one or more covariance matrices are smoothed over time.

5. A system as recited in claim 1, further comprising:

a reference signal input processor to accept one or more reference signals and to form a banded frequency domain amplitude metric representation of the one or more reference signals;

a predictor of a banded frequency domain amplitude metric representation of an echo, the predictor using adaptively determined coefficients, wherein the final gain incorporates at least one banded suppression probability indicator that includes echo suppression, the at least one banded suppression probability indicator determined using a banded echo spectral estimate determined from the output of the predictor.

6. A system as recited in claim 5, further comprising a coefficient updater to:

update the adaptively determined coefficients, using an estimate of the banded spectral frequency domain amplitude metric of the noise, previously predicted echo spectral content, and an estimate of the banded spectral amplitude metric of the mixed-down signal.

7. A system as recited in claim 6, further comprising:

a voice-activity detector with an output coupled to the coefficient updater, the voice-activity detector using the estimate of the banded spectral amplitude metric of the mixed-down signal, the estimate of banded spectral amplitude metric of noise, and the previously predicted echo spectral content, wherein the updating by the coefficient updater depends on the output of the voice-activity detector.

8. A system as recited in claim 5, wherein the output of the predictor is time smoothed to determine the echo spectral estimate.

9. A system as recited in claim 5, wherein the estimate of the banded spectral frequency domain amplitude metric of the noise used by the coefficient updater is determined by a leaky minimum follower with a tracking rate defined by at least one minimum follower leak rate parameter.

10. A system as recited in claim 5, wherein the gain calculator further calculates an additional echo suppression gain for each band.

11. A system as recited in claim 10, wherein the additional echo suppression gain is combined with other gains to form the combined gain for post-processing.

12. A system as recited in claim 10, wherein the additional echo suppression gain is combined after post-processing with the results of post-processing the combined gain to generate the final gain applied in the suppressor.

13. A system as recited in claim 5, wherein the adaptively determined coefficients are determined using a voice activity signal determined by a voice activity detector, an estimate of the banded spectral amplitude metric of the noise, an estimate of the banded spectral amplitude metric of the mixed-down signal, and previously predicted echo spectral content.

14. A system as recited in claim 1, wherein forming the down-mixed signal in the input processor is carried out prior to transforming.

15. A system as recited in claim 1, wherein the input processor includes input transformers to transform to frequency bins, a downmixer to form the mixed-down signal) in the sample or frequency bin domain, and a spectral banding element to form the mixed-down banded instantaneous frequency domain amplitude metric for the frequency bands.

16. A system as recited in claim 1, wherein the gain calculator is further to post-process the combined gain of the bands to generate a post-processed gain for each band, such that the interpolated final gain is determined from the post-processed gains of the bands.

17. A system as recited in claim 1, further comprising an output synthesizer and transformer to generate output samples, or an output remapper to generate output frequency bins.

18. A system as recited in claim 1, wherein the noise suppression probability indicator for each frequency band is expressible as a noise suppression gain function of the banded instantaneous amplitude metric for the band, wherein for each frequency band, a range of values of banded instantaneous amplitude metric values is expected for noise, and a second range of values of banded instantaneous amplitude metric values is expected for a desired input, and wherein the noise suppression gain functions for the frequency bands:

have a respective minimum value;

have a relatively constant value or a relatively small negative gradient in the range;

have a relatively constant gain in the second range; and have a smooth transition from the range to the second range.

19. A system as recited in claim 18, wherein the noise suppression gain functions for the frequency bands further have a smooth derivative.

20. A system as recited in claim 18, wherein the noise suppression gain functions for the frequency bands are each a sigmoid function or computational simplification thereof.

21. A system as recited in claim 18, wherein the noise suppression gain functions for the frequency bands have a negative gradient in the range.

22. A system as recited in claim 18, wherein the noise suppression gain functions for the frequency bands are each a modified sigmoid function expressible as a sum of a sigmoid function or computational simplification thereof and an additional term to provide the negative gradient in the range.

23. A system as recited in claim 18, wherein the instantaneous amplitude metric is power, and wherein the noise suppression gain functions for the frequency bands have a negative gradient in the range with an average gradient of −0.3 to −0.7 dB gain per dB input power.

24. A system as recited in claim 1, wherein the estimate of noise spectral content used to determine the noise suppression probability indicator is a spatially-selective estimate of noise spectral content determined using two or more of the spatial features.

25. A system as recited in claim 24, wherein the spatially-selective estimate of noise spectral content is determined using a leaky minimum follower.

26. A system as recited in claim 1, wherein the frequency domain amplitude metric is the frequency domain power.

27. A system as recited in claim 1, wherein the banding is such that the frequency spacing of the bands is non monotonically decreasing.

28. A system as recited in claim 27, wherein the spacing of the bands is log-like.

29. A method of operating a processing apparatus to suppress undesired signals including noise and out-of-location signals in audio input signals, the method comprising:

accepting in the processing apparatus a plurality of sampled audio input signals;

forming a mixed-down banded instantaneous frequency domain amplitude metric of the input signals for a plurality of frequency bands, the forming including transforming into complex-valued frequency domain values of the input signals or of a mixed down signal for a set of frequency bins; at least 90% of the bands having contribution from two or more frequency bins;

determining banded spatial features from the plurality of sampled input signals;

calculating a set of banded suppression probability indicators, including a banded out-of-location suppression probability indicator determined using two or more of the banded spatial features, and a banded noise suppression probability indicator expressible for each band as a noise suppression gain and determined using a banded estimate of noise spectral content determined based on the mixed-down banded instantaneous frequency domain amplitude metric of the mixed-down signal;

combining the set of banded probability indicators to determine a combined gain for each band of the plurality of frequency bands;

applying an interpolated final gain determined from the combined gains of the plurality of frequency bands to carry out suppression on the mixed-down signal to form suppressed signal data.

30. A method as recited in claim 29, wherein the estimate of noise spectral content is a spatially-selective estimate of noise spectral content.

31. A method as recited in claim 29, wherein the estimate of noise spectral content is a spatially-selective estimate of noise spectral content determined using two or more of the spatial features.

32. A method as recited in claim 29, wherein the spatial features are determined from one or more banded weighted covariance matrices of the sampled input signals.

33. A method as recited in claim 32, wherein the one or more covariance matrices are smoothed over time.

34. A method as recited in claim 29, wherein the forming of the mixed-down banded instantaneous frequency domain amplitude metric includes transforming the accepted inputs or a combination thereof to frequency bins, downmixing in the sample or frequency bin domain to form a mixed-down signal, and a spectral banding to form frequency bands.

35. A method as recited in claim 34, wherein the downmixing is carried out prior to the transforming.

36. A method as recited in claim 29, wherein the method further comprises carrying out post-processing on the combined gain of the bands to generate a post-processed gain for each band, such that the interpolated final gain is determined from the combined gain.

37. A method as recited in claim 36, wherein the post-processing is according to a classification of the input signals.

38. A method as recited in claim 29, wherein the noise suppression probability indicator for each frequency band is expressible as a noise suppression gain function of the banded instantaneous amplitude metric for the band, wherein for each frequency band, a range of values of banded instantaneous amplitude metric values is expected for noise, and a second range of values of banded instantaneous amplitude metric values is expected for a desired input, and wherein the noise suppression gain functions for the frequency bands:

have a respective minimum value;

have a relatively constant value or a relatively small negative gradient in the range;

have a relatively constant gain in the second range; and have a smooth transition from the range to the second range.

39. A method as recited in claim 38, wherein the noise suppression gain functions for the frequency bands have a smooth derivative.

40. A method as recited in claim 38, wherein the noise suppression gain functions for the frequency bands are each a sigmoid function or computational simplification thereof.

41. A method as recited in claim 38, wherein the noise suppression gain functions for the frequency bands have a negative gradient in the first range.

42. A method as recited in claim 38, wherein the noise suppression gain functions for the frequency bands are each a modified sigmoid function expressible as a sum of a sigmoid function or computational simplification thereof and an additional term to provide the negative gradient in the range.

43. A method as recited in claim 38, wherein the instantaneous amplitude metric is power, and wherein the noise suppression gain functions for the frequency bands are configured to have a negative gradient in the range with an average gradient of −0.3 to −0.7 dB gain per dB input power.

44. A method as recited in claim 29, wherein the accepting in the processing apparatus is of a plurality of sampled input signals, wherein the forming of the banded instantaneous frequency domain amplitude metric of the accepted input signals forms a mixed-down banded instantaneous frequency domain amplitude metric of the input signals for a plurality of frequency bands, wherein the method further comprises determining banded spatial features from the plurality of sampled input signals; and wherein the set of suppression probability indicators includes an out-of-location suppression probability indicator determined using two or more of the spatial features, such that the method simultaneously suppresses noise and out-of-location signals.

45. A method as recited in claim 44, wherein the estimate of noise spectral content is a spatially-selective estimate of noise spectral content determined using two or more of the banded spatial features.

46. A method as recited in claim 29, further comprising:

accepting one or more reference signals;

forming a banded frequency domain amplitude metric representation of the one or more reference signals; and predicting a banded frequency domain amplitude metric representation of an echo using adaptively determined echo filter coefficients, the filter coefficients determined using an estimate of the banded spectral amplitude metric of the noise, previously predicted echo spectral content, and an estimate of the banded spectral amplitude metric of the input signals, the filter coefficients updated based on the estimates of the banded spectral amplitude metric of the input signals and of the noise, and the previously predicted echo spectral content, wherein the final gain incorporates at least one banded suppression probability indicator that includes echo suppression, the at least one banded suppression probability indicator determined using the banded frequency domain amplitude metric representation of the echo.

47. A method as recited in claim 46, wherein determining the coefficients includes voice-activity detecting, and wherein the updating depends on the results of the voice-activity detecting.

48. A method as recited in claim 46, wherein the predicting includes time smoothing the results of the filtering.

49. A method as recited in claim 46, wherein the estimate of the banded spectral frequency domain amplitude metric of the noise used by the coefficient updater is determined by a leaky minimum follower with a tracking rate defined by at least one minimum follower leak rate parameter.

50. A method as recited in claim 49, wherein the minimum follower is gated by the presence of an echo estimate comparable to or greater than a previous estimate of the banded spectral frequency domain amplitude metric of the noise.

51. A method as recited in claim 49, wherein the at least one leak rate parameter of the leaky minimum follower are controlled by the probability of voice being present as determined by voice activity detecting.

52. A method as recited in claim 46, further comprising:

calculating an additional echo suppression gain and combining with one or more other determined suppression gains to generate the final gain.

53. A method as recited in claim 52, wherein the combining with the one or more other determined suppression gains is to form the first combined gain of the bands.

54. A method as recited in claim 53, wherein the method further comprises carrying out post-processing on the first combined gain of the bands to generate a first post-processed gain, and combining the first post-processed gain with the additional echo suppression gain to form the final gain.

55. A method as recited in claim 29, wherein the banding is such that the frequency spacing of the bands is non monotonically decreasing, and such that 90% or more of the bands have contribution from more than one frequency bin.

56. A method as recited in claim 55, wherein the spacing of the bands is log-like.

57. A method of operating a processing apparatus to suppress undesired signals, the undesired signals including noise, the method comprising:

accepting in the processing apparatus at least one sampled input signals;

forming a banded instantaneous frequency domain amplitude metric of the at least one input signal for a plurality of frequency bands, the forming including transforming into complex-valued frequency domain values of the at least one input signal or of a mixed down signal for a set of frequency bins; at least 90% of the bands having contribution from two or more frequency bins;

calculating a set of one or more suppression probability indicators, including a noise suppression probability indicator expressible for each frequency band as a noise suppression gain and determined using an estimate of noise spectral content based on the banded instantaneous frequency domain amplitude metric of the at least one input signal;

combining the set of probability indicators to determine a banded combined gain for each band;

applying an interpolated final gain determined from the combined gain to carry out suppression on the frequency domain values of the at least one input signal or of a mixed down signal to form suppressed signal data, wherein the noise suppression probability indicator for each frequency band is expressible as noise suppression gain function of the banded instantaneous amplitude metric for the band, wherein for each frequency band, a first range of values of banded instantaneous amplitude metric values is expected for noise, and a second range of values of banded instantaneous amplitude metric values is expected for a desired input, and wherein the noise suppression gain functions for the frequency bands are configured to:

have a respective minimum value;

have a relatively constant value or a relatively small negative gradient in the first range;

have a relatively constant gain in the second range; and have a smooth transition from the first range to the second range.

58. A method as recited in claim 57, wherein the estimate of noise spectral content is a spatially-selective estimate of noise spectral content.

59. A method as recited in claim 57, wherein the noise suppression gain functions for the frequency bands are further configured to have a smooth derivative.

60. A method as recited in claim 57, wherein the noise suppression gain functions for the frequency bands are each a sigmoid function or computational simplification thereof.

61. A method as recited in claim 57, wherein the noise suppression gain functions for the frequency bands have a negative gradient in the first range.

62. A method as recited in claim 57, wherein the instantaneous amplitude metric is power, and wherein the noise suppression gain functions for the frequency bands are configured to have a negative gradient in the range with an average gradient of −0.3 to −0.7 dB gain per dB input power.

63. A method as recited in claim 61, wherein the noise suppression gain functions for the frequency bands are each a modified sigmoid function expressible as a sum of a sigmoid function or computational simplification thereof and an additional term to provide the negative gradient in the range.

64. A method as recited in claim 57, wherein the accepting in the processing apparatus is of a plurality of sampled input signals, wherein the forming of the banded instantaneous frequency domain amplitude metric of the accepted input signals forms a mixed-down banded instantaneous frequency domain amplitude metric of the input signals for a plurality of frequency bands, wherein the method further comprises determining banded spatial features from the plurality of sampled input signals; and wherein the set of suppression probability indicators includes an out-of-location suppression probability indicator determined using two or more of the spatial features, such that the method simultaneously suppresses noise and out-of-location signals.

65. A method as recited in claim 64, wherein the estimate of noise spectral content is a spatially-selective estimate of noise spectral content determined using two or more of the banded spatial features.

66. A method as recited in claim 57, further comprising:

accepting one or more reference signals;

forming a banded frequency domain amplitude metric representation of the one or more reference signals; and predicting a banded frequency domain amplitude metric representation of an echo using adaptively determined echo filter coefficients, the filter coefficients determined using an estimate of the banded spectral amplitude metric of the noise, previously predicted echo spectral content, and an estimate of the banded spectral amplitude metric of the input signals, the filter coefficients updated based on the estimates of the banded spectral amplitude metric of the input signals and of the noise, and the previously predicted echo spectral content, wherein the final gain incorporates at least one banded suppression probability indicator that includes echo suppression, the at least one banded suppression probability indicator determined using the banded frequency domain amplitude metric representation of the echo.

67. A method as recited in claim 66, wherein determining the coefficients includes voice-activity detecting, and wherein the updating depends on the results of the voice-activity detecting.

68. A method as recited in claim 66, wherein the predicting includes time smoothing the results of the filtering.

69. A method as recited in claim 66, wherein the estimate of the banded spectral frequency domain amplitude metric of the noise used by the coefficient updater is determined by a leaky minimum follower with a tracking rate defined by at least one minimum follower leak rate parameter.

70. A method as recited in claim 69, wherein the minimum follower is gated by the presence of an echo estimate comparable to or greater than a previous estimate of the banded spectral frequency domain amplitude metric of the noise.

71. A method as recited in claim 69, wherein the at least one leak rate parameter of the leaky minimum follower are controlled by the probability of voice being present as determined by voice activity detecting.

72. A method as recited in claim 66, further comprising:

calculating an additional echo suppression gain and combining with one or more other determined suppression gains to generate the final gain.

73. A method as recited in claim 72, wherein the combining with the one or more other determined suppression gains is to form the first combined gain of the bands.

74. A method as recited in claim 73, wherein the method further comprises carrying out post-processing on the first combined gain of the bands to generate a first post-processed gain, and combining the first post-processed gain with the additional echo suppression gain to form the final gain.

75. A method as recited in claim 57, wherein the banding is such that the frequency spacing of the bands is non monotonically decreasing, and such that 90% or more of the bands have contribution from more than one frequency bin.

76. A method as recited in claim 75, wherein the spacing of the bands is log-like.

77. A method as recited in claim 57, further comprising applying output synthesis to generate output samples.

78. A method as recited in claim 57, further comprising: applying output remapping to generate output frequency bins.

79. A method as recited in claim 57, wherein the frequency domain amplitude metric is the frequency domain power.

80. A method of operating a processing apparatus to suppress undesired signals, the method comprising:

accepting in the processing apparatus a plurality of sampled input signals;

forming a mixed-down banded instantaneous frequency domain amplitude metric of the input signals for a plurality of frequency bands, the forming including transforming into complex-valued frequency domain values for a set of frequency bins; at least 90% of the bands having contribution from two or more frequency bins;

determining banded spatial features from the plurality of sampled input signals;

calculating a set of suppression probability indicators, including an out-of-location suppression probability indicator determined using two or more of the spatial features, and a noise suppression probability indicator expressible for each frequency band as a noise suppression gain and determined using an estimate of noise spectral content based on the mixed-down banded instantaneous frequency domain amplitude metric of the input signals;

accepting in the processing apparatus one or more reference signals;

forming a banded frequency domain amplitude metric representation of the one or more reference signals;

predicting a banded frequency domain amplitude metric representation of an echo using adaptively determined echo filter coefficients;

determining a plurality of indications of voice activity from the mixed-down banded instantaneous frequency domain amplitude metric using respective instantiations of a universal voice activity detection method, the universal voice activity detection method being controlled by a set of parameters and using an estimate of noise spectral content, the banded frequency domain amplitude metric representation of the echo, and the banded spatial features; wherein the set of parameters includes a parameter indicative of whether the estimate of noise spectral content is spatially selective or not; wherein which indication of voice activity an instantiation determines is controlled by a selection of the parameters; and combining the set of probability indicators to determine a combined gain for each band;

applying an interpolated final gain determined from the combined gain to carry out suppression on bin data of the mixed-down signal to form suppressed signal data, wherein different instantiations of the universal voice activity detection method are applied in different steps of the method.

81. A processing apparatus comprising:

one or more processors; and a computer-readable storage medium coupled to the one or more processors and comprising instructions to cause, when executed by at least one of the processors, the processing apparatus to carry out a method to suppress undesired signals including noise and out-of-location signals in audio input signals, the method comprising:

accepting in the processing apparatus a plurality of sampled audio input signals;

forming a mixed-down banded instantaneous frequency domain amplitude metric of the input signals for a plurality of frequency bands, the forming including transforming into complex-valued frequency domain values of the input signals or of a mixed down signal for a set of frequency bins; at least 90% of the bands having contribution from two or more frequency bins;

determining banded spatial features from the plurality of sampled input signals;

calculating a set of banded suppression probability indicators, including a banded out-of-location suppression probability indicator determined using two or more of the banded spatial features, and a banded noise suppression probability indicator expressible for each band as a noise suppression gain and determined using a banded estimate of noise spectral content determined based on the mixed-down banded instantaneous frequency domain amplitude metric of the mixed-down signal;

combining the set of banded probability indicators to determine a combined gain for each band of the plurality of frequency bands;

applying an interpolated final gain determined from the combined gains of the plurality of frequency bands to carry out suppression on the mixed-down signal to form suppressed signal data.

82. A processing apparatus as recited in claim 81, wherein the method further comprises carrying out post-processing on the combined gain of the bands to generate a post-processed gain for each band, such that the interpolated final gain is determined from the combined gain.

83. A processing apparatus as recited in claim 81, wherein the noise suppression probability indicator for each frequency band is expressible as a noise suppression gain function of the banded instantaneous amplitude metric for the band, wherein for each frequency band, a range of values of banded instantaneous amplitude metric values is expected for noise, and a second range of values of banded instantaneous amplitude metric values is expected for a desired input, and wherein the noise suppression gain functions for the frequency bands are configured to:

have a respective minimum value;

have a relatively constant value or a relatively small negative gradient in the range;

have a relatively constant gain in the second range; and have a smooth transition from the range to the second range.

84. A processing apparatus as recited in claim 81, wherein the accepting in the processing apparatus is of a plurality of sampled input signals, wherein the forming of the banded instantaneous frequency domain amplitude metric of the accepted input signals forms a mixed-down banded instantaneous frequency domain amplitude metric of the input signals for a plurality of frequency bands, wherein the method further comprises determining banded spatial features from the plurality of sampled input signals; and wherein the set of suppression probability indicators includes an out-of-location suppression probability indicator determined using two or more of the spatial features, such that the method simultaneously suppresses noise and out-of-location signals.

85. A processing apparatus as recited in claim 81, wherein the method further comprises:

accepting one or more reference signals;

forming a banded frequency domain amplitude metric representation of the one or more reference signals; and predicting a banded frequency domain amplitude metric representation of an echo using adaptively determined echo filter coefficients, the filter coefficients determined using an estimate of the banded spectral amplitude metric of the noise, previously predicted echo spectral content, and an estimate of the banded spectral amplitude metric of the input signals, the filter coefficients updated based on the estimates of the banded spectral amplitude metric of the input signals and of the noise, and the previously predicted echo spectral content, wherein the final gain incorporates at least one banded suppression probability indicator that includes echo suppression, the at least one banded suppression probability indicator determined using the banded frequency domain amplitude metric representation of the echo.

86. A processing apparatus comprising:

one or more processors; and a computer-readable storage medium coupled to the one or more processors and comprising instructions to cause, when executed by at least one of the processors, the processing apparatus to carry out a method to suppress undesired signals, the undesired signals including noise, the method comprising:

accepting in the processing apparatus at least one sampled input signals;

forming a banded instantaneous frequency domain amplitude metric of the at least one input signal for a plurality of frequency bands, the forming including transforming into complex-valued frequency domain values of the at least one input signal or of a mixed down signal for a set of frequency bins; at least 90% of the bands having contribution from two or more frequency bins;

calculating a set of one or more suppression probability indicators, including a noise suppression probability indicator expressible for each frequency band as a noise suppression gain and determined using an estimate of noise spectral content based on the banded instantaneous frequency domain amplitude metric of the at least one input signal;

combining the set of probability indicators to determine a banded combined gain for each band;

applying an interpolated final gain determined from the combined gain to carry out suppression on the frequency domain values of the at least one input signal or of a mixed down signal to form suppressed signal data, wherein the noise suppression probability indicator for each frequency band is expressible as noise suppression gain function of the banded instantaneous amplitude metric for the band, wherein for each frequency band, a first range of values of banded instantaneous amplitude metric values is expected for noise, and a second range of values of banded instantaneous amplitude metric values is expected for a desired input, and wherein the noise suppression gain functions for the frequency bands are configured to:

have a respective minimum value;

have a relatively constant value or a relatively small negative gradient in the first range;

have a relatively constant gain in the second range; and have a smooth transition from the first range to the second range.

87. A processing apparatus as recited in claim 86, wherein the method further comprises carrying out post-processing on the combined gain of the bands to generate a post-processed gain for each band, such that the interpolated final gain is determined from the combined gain.

88. A processing apparatus as recited in claim 86, wherein the noise suppression probability indicator for each frequency band is expressible as a noise suppression gain function of the banded instantaneous amplitude metric for the band, wherein for each frequency band, a range of values of banded instantaneous amplitude metric values is expected for noise, and a second range of values of banded instantaneous amplitude metric values is expected for a desired input, and wherein the noise suppression gain functions for the frequency bands:

have a respective minimum value;

have a relatively constant value or a relatively small negative gradient in the range;

have a relatively constant gain in the second range; and have a smooth transition from the range to the second range.

89. A processing apparatus as recited in claim 86, wherein the accepting in the processing apparatus is of a plurality of sampled input signals, wherein the forming of the banded instantaneous frequency domain amplitude metric of the accepted input signals forms a mixed-down banded instantaneous frequency domain amplitude metric of the input signals for a plurality of frequency bands, wherein the method further comprises determining banded spatial features from the plurality of sampled input signals; and wherein the set of suppression probability indicators includes an out-of-location suppression probability indicator determined using two or more of the spatial features, such that the method simultaneously suppresses noise and out-of-location signals.

90. A processing apparatus as recited in claim 86, wherein the method further comprises:

accepting one or more reference signals;

forming a banded frequency domain amplitude metric representation of the one or more reference signals; and predicting a banded frequency domain amplitude metric representation of an echo using adaptively determined echo filter coefficients, the filter coefficients determined using an estimate of the banded spectral amplitude metric of the noise, previously predicted echo spectral content, and an estimate of the banded spectral amplitude metric of the input signals, the filter coefficients updated based on the estimates of the banded spectral amplitude metric of the input signals and of the noise, and the previously predicted echo spectral content, wherein the final gain incorporates at least one banded suppression probability indicator that includes echo suppression, the at least one banded suppression probability indicator determined using the banded frequency domain amplitude metric representation of the echo.

91. A processing apparatus comprising:

one or more processors; and a computer-readable storage medium coupled to the one or more processors and comprising instructions to cause, when executed by at least one of the processors, the processing apparatus to carry out a method to suppress undesired signals, the method comprising:

accepting in the processing apparatus a plurality of sampled input signals;

forming a mixed-down banded instantaneous frequency domain amplitude metric of the input signals for a plurality of frequency bands, the forming including transforming into complex-valued frequency domain values for a set of frequency bins; at least 90% of the bands having contribution from two or more frequency bins;

determining banded spatial features from the plurality of sampled input signals;

calculating a set of suppression probability indicators, including an out-of-location suppression probability indicator determined using two or more of the spatial features, and a noise suppression probability indicator expressible for each frequency band as a noise suppression gain and determined using an estimate of noise spectral content based on the mixed-down banded instantaneous frequency domain amplitude metric of the input signals;

accepting in the processing apparatus one or more reference signals;

forming a banded frequency domain amplitude metric representation of the one or more reference signals;

predicting a banded frequency domain amplitude metric representation of an echo using adaptively determined echo filter coefficients;

determining a plurality of indications of voice activity from the mixed-down banded instantaneous frequency domain amplitude metric using respective instantiations of a universal voice activity detection method, the universal voice activity detection method being controlled by a set of parameters and using an estimate of noise spectral content, the banded frequency domain amplitude metric representation of the echo, and the banded spatial features; wherein the set of parameters includes a parameter indicative of whether the estimate of noise spectral content is spatially selective or not; wherein which indication of voice activity an instantiation determines is controlled by a selection of the parameters; and combining the set of probability indicators to determine a combined gain for each band;

applying an interpolated final gain determined from the combined gain to carry out suppression on bin data of the mixed-down signal to form suppressed signal data, wherein different instantiations of the universal voice activity detection method are applied in different steps of the method.

92. A non-transitory computer-readable medium comprising instructions to cause, when executed by at least one processor of a processing apparatus to carry out a method to suppress undesired signals including noise and out-of-location signals in audio input signals, the method comprising:

accepting in the processing apparatus a plurality of sampled audio input signals;

forming a mixed-down banded instantaneous frequency domain amplitude metric of the input signals for a plurality of frequency bands, the forming including transforming into complex-valued frequency domain values of the input signals or of a mixed down signal for a set of frequency bins; at least 90% of the bands having contribution from two or more frequency bins;

determining banded spatial features from the plurality of sampled input signals;

calculating a set of banded suppression probability indicators, including a banded out-of-location suppression probability indicator determined using two or more of the banded spatial features, and a banded noise suppression probability indicator expressible for each band as a noise suppression gain and determined using a banded estimate of noise spectral content determined based on the mixed-down banded instantaneous frequency domain amplitude metric of the mixed-down signal;

combining the set of banded probability indicators to determine a combined gain for each band of the plurality of frequency bands;

applying an interpolated final gain determined from the combined gains of the plurality of frequency bands to carry out suppression on the mixed-down signal to form suppressed signal data.

93. A non-transitory computer-readable medium as recited in claim 92, wherein the method further comprises:

accepting one or more reference signals;

forming a banded frequency domain amplitude metric representation of the one or more reference signals; and predicting a banded frequency domain amplitude metric representation of an echo using adaptively determined echo filter coefficients, the filter coefficients determined using an estimate of the banded spectral amplitude metric of the noise, previously predicted echo spectral content, and an estimate of the banded spectral amplitude metric of the input signals, the filter coefficients updated based on the estimates of the banded spectral amplitude metric of the input signals and of the noise, and the previously predicted echo spectral content, wherein the final gain incorporates at least one banded suppression probability indicator that includes echo suppression, the at least one banded suppression probability indicator determined using the banded frequency domain amplitude metric representation of the echo.

94. A non-transitory computer-readable medium comprising instructions to cause, when executed by at least one processor of a processing apparatus to carry out a method to suppress undesired signals including noise and out-of-location signals in audio input signals, the method comprising:

accepting in the processing apparatus at least one sampled input signals;

forming a banded instantaneous frequency domain amplitude metric of the at least one input signal for a plurality of frequency bands, the forming including transforming into complex-valued frequency domain values of the at least one input signal or of a mixed down signal for a set of frequency bins; at least 90% of the bands having contribution from two or more frequency bins;

calculating a set of one or more suppression probability indicators, including a noise suppression probability indicator expressible for each frequency band as a noise suppression gain and determined using an estimate of noise spectral content based on the banded instantaneous frequency domain amplitude metric of the at least one input signal;

combining the set of probability indicators to determine a banded combined gain for each band;

applying an interpolated final gain determined from the combined gain to carry out suppression on the frequency domain values of the at least one input signal or of a mixed down signal to form suppressed signal data, wherein the noise suppression probability indicator for each frequency band is expressible as noise suppression gain function of the banded instantaneous amplitude metric for the band, wherein for each frequency band, a first range of values of banded instantaneous amplitude metric values is expected for noise, and a second range of values of banded instantaneous amplitude metric values is expected for a desired input, and wherein the noise suppression gain functions for the frequency bands are configured to:

have a respective minimum value;

have a relatively constant value or a relatively small negative gradient in the first range;

have a relatively constant gain in the second range; and have a smooth transition from the first range to the second range.

95. A non-transitory computer-readable medium as recited in claim 94, wherein the method further comprises:

accepting one or more reference signals;

forming a banded frequency domain amplitude metric representation of the one or more reference signals; and predicting a banded frequency domain amplitude metric representation of an echo using adaptively determined echo filter coefficients, the filter coefficients determined using an estimate of the banded spectral amplitude metric of the noise, previously predicted echo spectral content, and an estimate of the banded spectral amplitude metric of the input signals, the filter coefficients updated based on the estimates of the banded spectral amplitude metric of the input signals and of the noise, and the previously predicted echo spectral content, wherein the final gain incorporates at least one banded suppression probability indicator that includes echo suppression, the at least one banded suppression probability indicator determined using the banded frequency domain amplitude metric representation of the echo.

96. A non-transitory computer-readable medium comprising instructions that cause, when executed by at least one processor of a processing apparatus, to carry out a method to suppress undesired signals including noise and out-of-location signals in audio input signals, the method comprising:

accepting in the processing apparatus a plurality of sampled input signals;

forming a mixed-down banded instantaneous frequency domain amplitude metric of the input signals for a plurality of frequency bands, the forming including transforming into complex-valued frequency domain values for a set of frequency bins; at least 90% of the bands having contribution from two or more frequency bins;

determining banded spatial features from the plurality of sampled input signals;

calculating a set of suppression probability indicators, including an out-of-location suppression probability indicator determined using two or more of the spatial features, and a noise suppression probability indicator expressible for each frequency band as a noise suppression gain and determined using an estimate of noise spectral content based on the mixed-down banded instantaneous frequency domain amplitude metric of the input signals;

accepting in the processing apparatus one or more reference signals;

forming a banded frequency domain amplitude metric representation of the one or more reference signals;

predicting a banded frequency domain amplitude metric representation of an echo using adaptively determined echo filter coefficients;

determining a plurality of indications of voice activity from the mixed-down banded instantaneous frequency domain amplitude metric using respective instantiations of a universal voice activity detection method, the universal voice activity detection method being controlled by a set of parameters and using an estimate of noise spectral content, the banded frequency domain amplitude metric representation of the echo, and the banded spatial features; wherein the set of parameters includes a parameter indicative of whether the estimate of noise spectral content is spatially selective or not; wherein which indication of voice activity an instantiation determines is controlled by a selection of the parameters; and combining the set of probability indicators to determine a combined gain for each band;

applying an interpolated final gain determined from the combined gain to carry out suppression on bin data of the mixed-down signal to form suppressed signal data, wherein different instantiations of the universal voice activity detection method are applied in different steps of the method.

* * * * *

UNITED STATES PATENT AND TRADEMARK OFFICE

CERTIFICATE OF CORRECTION

| | | |
|---|---|---|
| PATENT NO. | : 9,173,025 B2 | Page 1 of 1 |
| APPLICATION NO. | : 13/964037 | |
| DATED | : October 27, 2015 | |
| INVENTOR(S) | : Dickins et al. | |

It is certified that error appears in the above-identified patent and that said Letters Patent is hereby corrected as shown below:

Specification

In Column 12, line 17, please change "index 1" to --index $l$--

In Column 12, line 18, please change "1'th" to --$l$'th--

In Column 12, line 19, please change "l=0" to --$l$=0--

In Column 22, line 40, please change "N=128.512" to --N=128..512--

In Column 22, line 41, please change "N=64.256" to --N=64..256--

In Column 22, line 42, please change "8.32 ms" to --8..32 ms--

In Column 24, line 4, please change "may" to --array--

In Column 30, line 42, please change "time.●Echo, denoted $E_b'$ is the" to
--time.
Echo, denoted $E_b'$ is the--

In Column 31, line 52, after Y$min'$, please delete "in"

In Column 31, line 57, after Y$min'$, please delete "in"

In Column 31, line 58, after Y$min'$, please delete "in"

In Column 33, line 4, please change "integer 1" to --integer $l$--

In Column 33, line 6, please change "1=0." to --$l$=0.--

In Column 39, line 67, please change "1 represents" to --$l$ represents--

Signed and Sealed this
Sixteenth Day of August, 2016

Michelle K. Lee
*Director of the United States Patent and Trademark Office*